(12) United States Patent
Li et al.

(10) Patent No.: US 12,538,125 B2
(45) Date of Patent: Jan. 27, 2026

(54) PRE-TASK ASSIGNMENT TRUST EVALUATION IN DISTRIBUTED COMPUTING AND COMMUNICATION SYSTEMS

(71) Applicant: INTERDIGITAL PATENT HOLDINGS, INC., Wilmington, DE (US)

(72) Inventors: Xu Li, Plainsboro, NJ (US); Chonggang Wang, Princeton, NJ (US); Robert Gazda, Spring City, PA (US); Ulises Olvera-Hernandez, Saint-Lazare (CA); Samir Ferdi, Kirkland (CA); Rocco Di Girolamo, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 27 days.

(21) Appl. No.: 18/798,703

(22) Filed: Aug. 8, 2024

(65) Prior Publication Data
US 2025/0301317 A1 Sep. 25, 2025

Related U.S. Application Data

(60) Provisional application No. 63/567,729, filed on Mar. 20, 2024.

(51) Int. Cl.
*H04W 12/06* (2021.01)
*H04W 8/22* (2009.01)

(52) U.S. Cl.
CPC ............. *H04W 12/06* (2013.01); *H04W 8/22* (2013.01)

(58) Field of Classification Search
CPC ........ H04W 12/06; H04W 8/22; H04W 12/66
See application file for complete search history.

(56) References Cited

U.S. PATENT DOCUMENTS

2022/0210142 A1   6/2022   Sohail et al.

OTHER PUBLICATIONS

ETSI, "Permissioned Distributed Ledgers (PDL); architecture enhancements for PDL service provisioning in telecom networks," ETSI GS PDL 024 V0.0.4 (Jul. 2023).
International Telecommunication Union, "Series Y: Global Information Infrastructure, Internet Protocol Aspects, Next-Generation Networks, Internet of Things and Smart Cities; Future Networks; Overview of trust provisioning in information and communication technology infrastructures and services," ITU-T Y.3052 (Mar. 2017).

(Continued)

*Primary Examiner* — Theodore C Parsons
(74) *Attorney, Agent, or Firm* — Volpe Koenig

(57) ABSTRACT

A wireless transmit and receive unit (WTRU) may be configured to operate as task initiator (TI). The WTRU may send a request for a trust evaluation to a task management function (TMF), including a first candidate task participant (TP) and a first task and a second candidate TP and a second task. The WTRU may include trust indicators for the first candidate TP to perform the first task and for the second candidate TP to perform the second task. The TMF may perform the trust evaluation and determine a first estimated trust index (ETI) and a second ETI. Upon receiving the ETIs, the WTRU may determine an aggregated ETI. The WTRU may determine whether to assign the first task to the first candidate TP and the second task to the second candidate TP based on the aggregated ETI.

20 Claims, 28 Drawing Sheets

(56) References Cited

OTHER PUBLICATIONS

Third Generation Partnership Project, "Technical Specification Group Services and System Aspects; Service requirements for the 5G system; Stage 1 (Release 18)," 3GPP TS 22.261 V18.5.0 (Dec. 2021).
Third Generation Partnership Project, "Technical Specification Group Services and System Aspects; Service requirements for the 5G system; Stage 1 (Release 18)," 3GPP TS 22.261 V18.14.0 (Jun. 2024).
Third Generation Partnership Project, "Technical Specification Group Services and System Aspects; Service requirements for the 5G system; Stage 1 (Release 19)," 3GPP TS 22.261 V19.7.0 (Jun. 2024).
Third Generation Partnership Project, "Technical Specification Group Services and System Aspects; System Architecture for the 5G System; Stage 2 (Release 18)," 3GPP TS 23.501 V18.6.0 (Jun. 2024).
Third Generation Partnership Project, "Technical Specification Group Services and System Aspects; Procedures for the 5G System (5GS); Stage 2 (Release 19)," 3GPP TS 23.502 V19.0.0 (Jun. 2024).
Third Generation Partnership Project, "Technical Specification Group Services and System Aspects; Proximity based Services (ProSe) in the 5G System (5GS) (Release 18)," 3GPP TS 23.304 V18.0.0 (Dec. 2022).
Third Generation Partnership Project, "Technical Specification Group Services and System Aspects; System architecture for the 5G System (5GS); Stage 2 (Release 18)," 3GPP TS 23.501 V18.0.0 (Dec. 2022).
Third Generation Partnership Project, "Technical Specification Group Services and System Aspects; System architecture for the 5G System (5GS); Stage 2 (Release 19)," 3GPP TS 23.501 V19.0.0 (Jun. 2024).
Third Generation Partnership Project, "Technical Specification Group Services and System Aspects; Procedures for the 5G System (5GS); Stage 2 (Release 18)," 3GPP TS 23.502 V18.0.0 (Dec. 2022).
Third Generation Partnership Project, "Technical Specification Group Services and System Aspects; Procedures for the 5G System (5GS); Stage 2 (Release 18)," 3GPP TS 23.502 V18.6.0 (Jun. 2024).
Third Generation Partnership Project, "Technical Specification Group Services and System Aspects; Architecture enhancements for 5G System (5GS) to support network data analytics services (Release 18)," 3GPP TS 23.288 V18.6.0 (Jun. 2024).
Third Generation Partnership Project, "Technical Specification Group Services and System Aspects; Architecture enhancements for 5G System (5GS) to support network data analytics services (Release 18)," 3GPP TS 23.288 V18.2.0 (Jun. 2023).
Third Generation Partnership Project, "Technical Specification Group Services and System Aspects; Architecture enhancements for 5G System (5GS) to support network data analytics services (Release 18)," 3GPP TS 23.288 V18.4.0 (Dec. 2023).
Third Generation Partnership Project, "Technical Specification Group Services and System Aspects; Service requirements for the 5G system; Stage 1 (Release 19)," 3GPP TS 22.261 V19.5.0 (Dec. 2023).
Third Generation Partnership Project, "Technical Specification Group Services and System Aspects; Study on AI/ML Model Transfer Phase 2 (Release 19)," 3GPP TR 22.876 V19.1.0 (Sep. 2023).
Third Generation Partnership Project, "Technical Specification Group Services and System Aspects; Study on 5G System Support for AI/ML-based Services (Release 18)," 3GPP TR 23.700-80 V18.0.0 (Dec. 2022).
Third Generation Partnership Project, "Technical Specification Group Services and System Aspects; Proximity based Services (ProSe) in the 5G System (5GS) (Release 18)," 3GPP TS 23.304 V18.4.0 (Dec. 2023).
Third Generation Partnership Project, "Technical Specification Group Services and System Aspects; Proximity based Services (ProSe) in the 5G System (5GS) (Release 18)," 3GPP TS 23.304 V18.6.0 (Jun. 2024).
Third Generation Partnership Project, "Technical Specification Group Services and System Aspects; Proximity based Services (ProSe) in the 5G System (5GS) (Release 19)," 3GPP TS 23.304 V19.0.0 (Jun. 2024).
Third Generation Partnership Project, "Technical Specification Group Services and System Aspects; Policy and charging control framework for the 5G System (5GS); Stage 2 (Release 18)," 3GPP TS 23.503 V18.4.0 (Dec. 2023).
Third Generation Partnership Project, "Technical Specification Group Services and System Aspects; Policy and charging control framework for the 5G System (5GS); Stage 2 (Release 19)," 3GPP TS 23.503 V19.0.0 (Jun. 2024).
Third Generation Partnership Project, "Technical Specification Group Services and System Aspects; System Architecture for the 5G System; Stage 2 (Release 18)," 3GPP TS 23.501 V18.4.0 (Dec. 2023).
Third Generation Partnership Project, "Technical Specification Group Services and System Aspects; Procedures for the 5G System (5GS); Stage 2 (Release 18)," 3GPP TS 23.502 V18.4.0 (Dec. 2023).
Putra et al., "Towards Blockchain-based Trust and Reputation Management for Trustworthy 6G Networks," Arxiv.org (Aug. 16, 2022).
Shala et al., "Blockchain and Trust for Secure, End-User-Basd and Decentralized IoT Service Provision," IEEE Access, vol. 8, pp. 119961-119979 (Jun. 2020).

PRE-TASK ASSIGNMENT TRUST EVALUATION IN DISTRIBUTED COMPUTING AND COMMUNICATION SYSTEMS

CROSS-REFERENCE TO RELATED APPLICATIONS

This application claims the benefit of U.S. Provisional Application No. 63/567,729, filed Mar. 20, 2024, the contents of which are incorporated herein by reference.

BACKGROUND

An artificial intelligence (AI) system may learn and exploit the physical world, such as existing data sets, entity behavior, sensory information, to train AI models based on various learning schemes such as deep learning, federated learning, reinforcement learning, and/or a combination of them. The trained model may automatically discover useful knowledge, make decisions or have application-specific skills, such as driving a car. For example, a general AI pipeline of supervised learning may consist of multiple stages. A first stage may be a data preparation stage that may include data collection, data extraction, or data pre-processing. After data preparation, a training stage may be used based on a model and the data collected, where the AI model is continuously improved based on learning from the data collected. The learned model then goes through a validation stage, where testing and validating is performed in the learned AI model. Upon validation of the AI model, the validated AI model may be deployed to operate. The AI model may now be used for various application purposes.

SUMMARY

In order to deploy and operate distributed vertical applications or complex system features, processing capabilities of different devices may be combined as they work in collaboration to perform tasks that realize the application. In this distributed process, an application may divided in different tasks, which may be execute in parallel or sequentially. Moreover, different tasks of an application may be assigned to different devices.

A device may assume the role of a task participant (TP) or task initiator (TI). The TI is defined as an entity that assigns tasks to other devices, such as the TP. The devices then work together to realize the application.

A task-aware trust evaluation is defined as a type of evaluation where the results of the evaluation of a given device are based on the particular task the device will perform. The result of trust evaluation may be an estimated trust index (ETI). A TP may have different ETIs, each associated with a different task that is being assigned to the TP. Additionally, different TIs may have different preferences regarding how the trust of a TP may be evaluated. A trust evaluation pattern (TEP) specifies a detailed set of criteria on how trust evaluation should be performed.

A trust management function (TMF) is defined as an entity with functionality that enables the realization of a trust management layer in a system. The TMF provides task-aware trust evaluation of a TP to perform a task. Before the TI assigns a task to a TP, the TI may request the TMF for a trust evaluation of the TP to perform the task. The result of the trust evaluation may be an estimated trust index (ETI).

In a distributed system, a complex task may be modeled as an aggregation of several tasks. Each task may then be assigned by the TI to a different TP. Additionally, once a task is assigned to a TP, the TP may re-assign the assigned task to another TP. When the TMF performs a task-aware trust evaluation of a complex task, TMF may determine the ETI of each TP that is involved in performing the tasks associated with the complex tax. The resulting of the task-aware trust evaluation process may comprise an aggregation of the ETIs of each TP and their associated tasks, which may be represented by an aggregated ETI.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
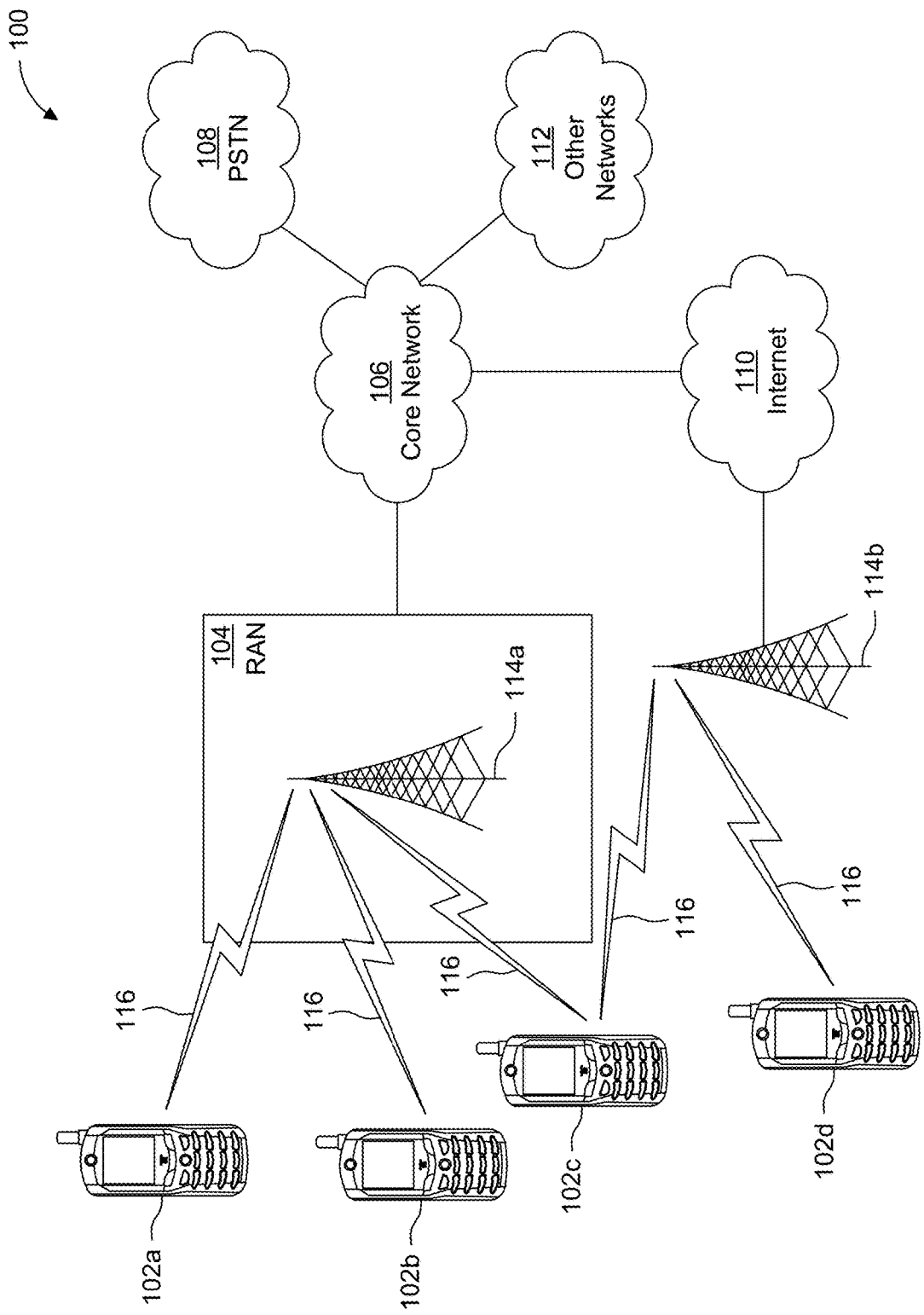
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
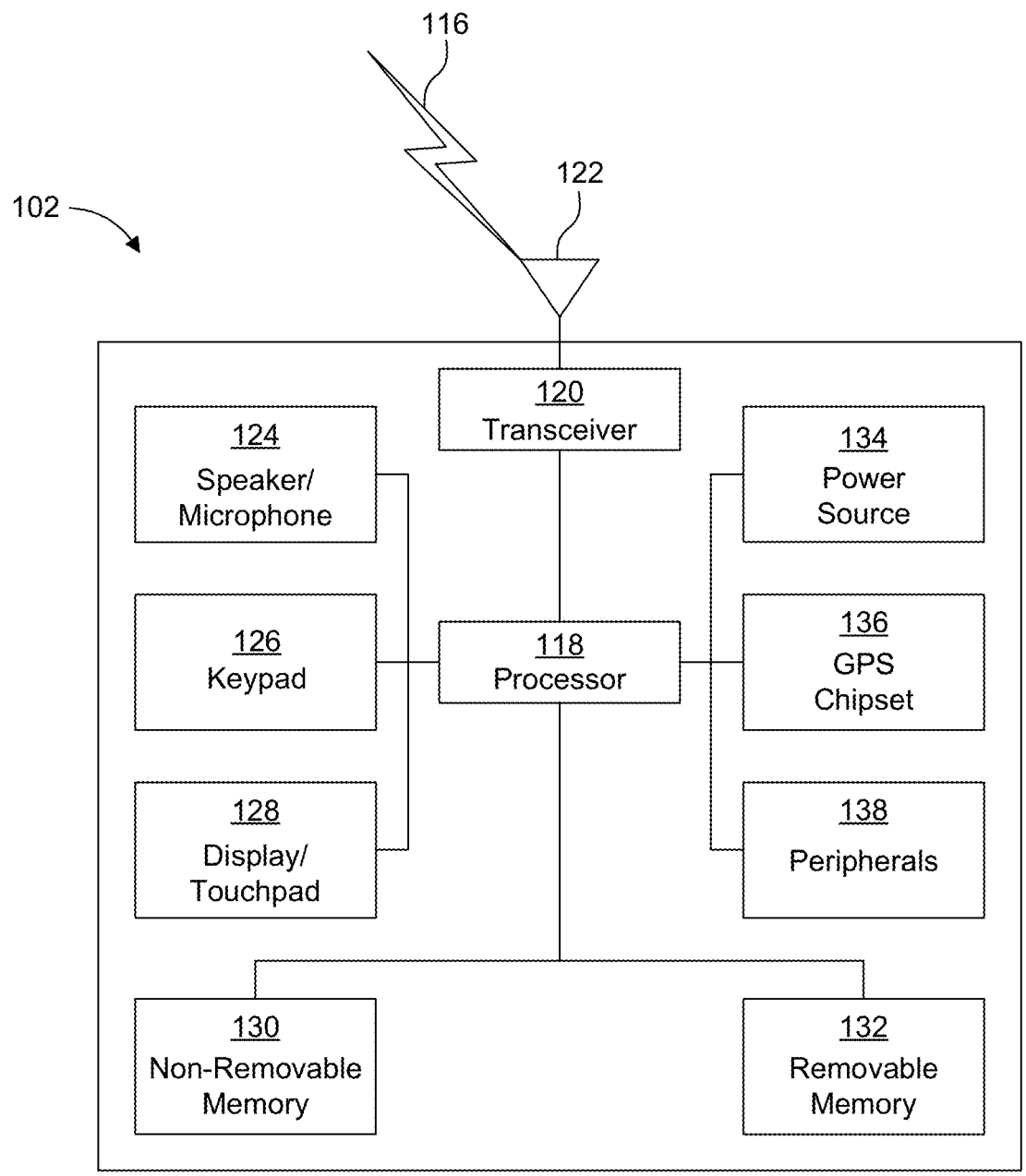
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
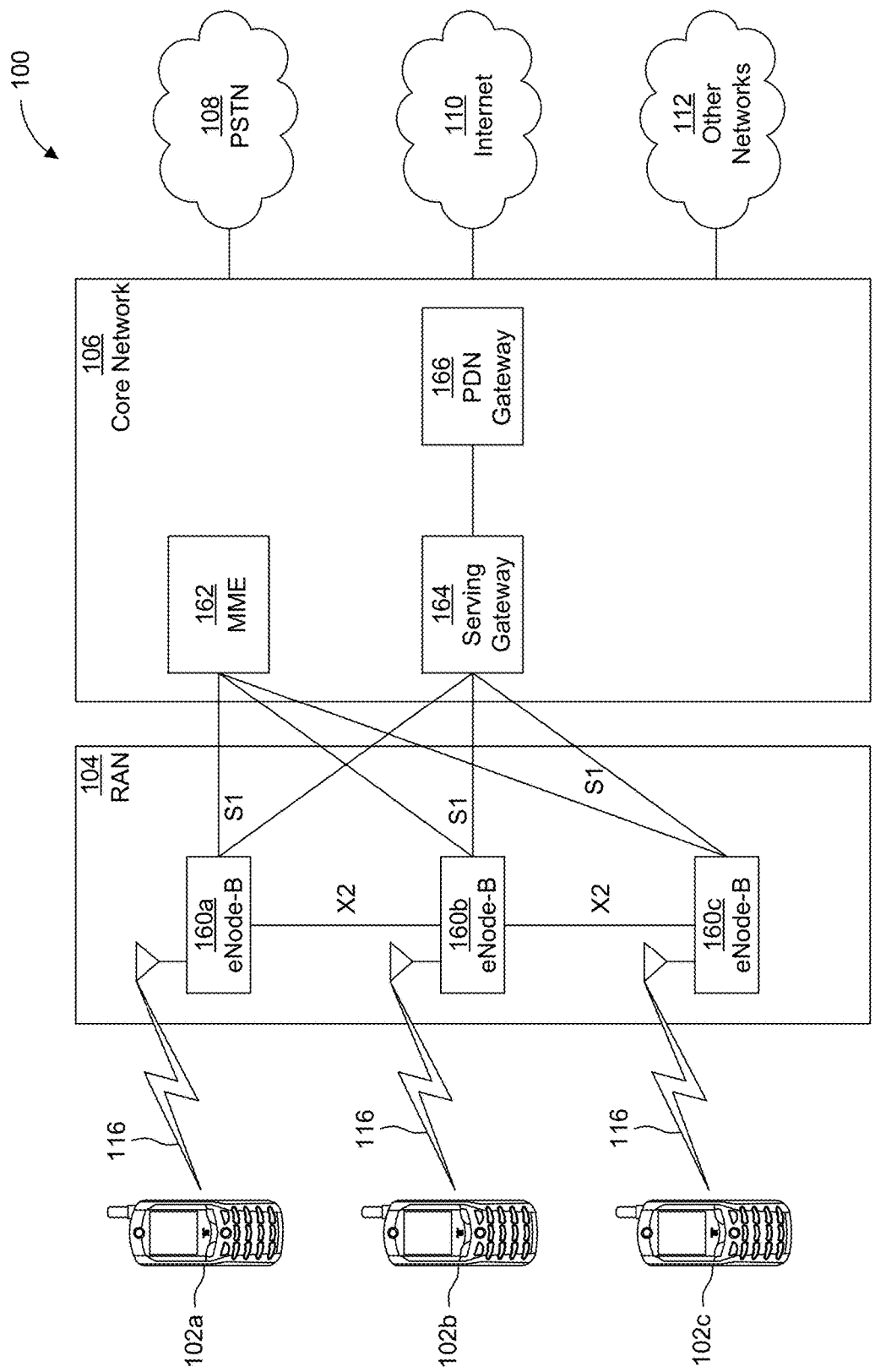
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
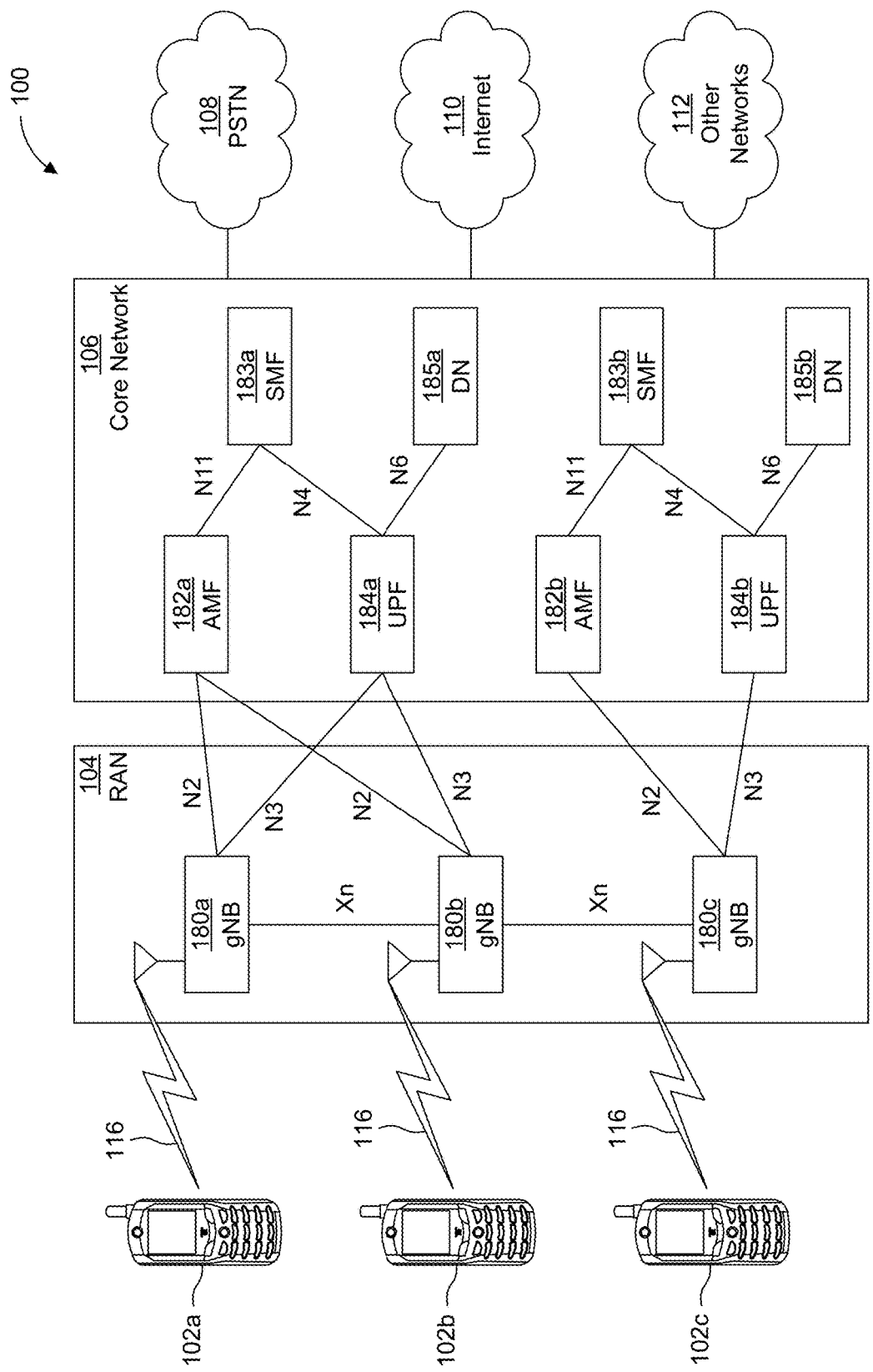
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following abbreviations may be used in the paragraphs that follow:

| | |
|---|---|
| 3D | Three Dimensional |
| 3GPP | 3$^{rd}$ Generation Partnership Project |
| 5G | 5$^{th}$ Generation |
| 5GC | 5G Core Network |
| 5GS | 5G System |
| 6G | 6$^{th}$ Generation |
| 6GC | 6G Core Network |
| 6GS | 6G System |
| AF | Application Function |
| AI | Artificial Intelligence |
| AMF | Access and Mobility Management Function |
| API | Application Programming Interface |
| AR | Augmented Reality |
| BCN | Blockchain Node |
| BSF | Blockchain Service Function |
| CAPIF | The Common API Framework |
| CM | Connection Management |
| DL | Downlink |
| DLAF | Distributed Ledger Anchor Function |
| DLE | Distributed Ledger Enabler |
| DLEF | Distributed Ledger Enabler Function |
| DLRF | Distributed Ledger Repository Function |
| DN | Data Network |
| E2E | End-to-End |
| ETI | Estimated Trust Index |
| ETSI | European Telecommunications Standards Institute |
| FL | Federated Learning |
| FQDN | Fully Qualified Domain Name |
| GMLC | Gateway Mobile Location Centre |
| GOT | Generic Operation Type |
| GPS | Global Position System |
| IMEI | International Mobile Equipment Identity |
| IP | Internet Protocol |
| ISG | Industry Specification Group |
| ML | Machine Learning |
| MNO | Mobile Network Operator |
| NEF | Network Exposure Function |
| NF | Network Function |
| NG-RAN | Next-Generation RAN |
| NRF | Network Repository Function |
| OA | Operation Assignment |
| P2P | Peer-to-Peer |
| PCF | Policy Control Function |
| PreTA | Pre-task-assignment |
| PostTA | Post-task-assignment |
| PDU | Protocol Data Unit |
| ProSe | Proximity-based services |
| RAN | Radio Access Network |
| RM | Registration Management |
| SA | Service Architecture |
| SC | Smart Contract |
| SEAL | Service Enabler Architecture Layer |
| SMF | Session Management Function |
| SUPI | Subscription Permanent Identifier |
| TEE | Trust Execution Environment |
| TE | Trust Evaluation |
| TEP | Trust Evaluation Pattern |
| TEPT | Trust Evaluation Pattern Template |
| TEPT-Ins | TEPT-Instance |
| TERR | Trust Evaluation Result Record |
| TERRRR | TERR Rank Record |
| TI | Task Initiator |
| TIDC | Trust Indicator |
| TIndex | Trust Index |
| TMF | Trust Management Function |
| TP | Task Participant |
| TPPT | TP Profile Template |
| TPPT-Ins | TPPT-Instance |
| UDM | Unified Data Management |
| UDR | Unified Data Repository |
| UDSF | Unstructured Data Storage Function |
| UE | User Equipment |
| UL | Uplink |
| UPF | User Plane Function |
| VAL | Vertical Application Layer |
| VIP | Very Important Person |
| XR | Extended Reality |
| ZTA | Zero-Trust-Architecture |

A Task is defined as the one task that may be involved with conducting one particular type of operation (either computing-related, communication-related, or data source-related). A task may be assigned to a TP for execution.

A Task Initiator (TI) is defined as an entity that initiates one or more tasks. Typically, in order to deploy and operate a distributed vertical application or a system feature, the TI may need to assign a number of tasks to different UEs/entities/devices, so that those UEs may work together to realize the distributed application or the system feature desired by the TI.

A Task Participant (TP) is assigned a number of tasks. In order to deploy and operate a distributed application or a system feature, the TI may need to assign a number of tasks to different UEs/entities/devices, which may be in the role of TPs.

In a TP registration procedure, a first entity (e.g., a UE) may send a first request (e.g., a 3GPP registration request) to a first network function (e.g., AMF). The first request may contain the identifier of the first entity (e.g., a UE ID plus a TP role indicator).

The TP may receive the first response (e.g., a registration accept) from the first network function (e.g., AMF). The first response may contain the identifier of a second network function (e.g., TMF) and a first information element (e.g., TPPT-1) where the first information element may collect information about the available data sources about the first entity.

The TP may fill the first information element and creates the second information element (e.g., TPPT-Ins-1). The TP may send a second request to the second network function (e.g., TMF). The second request may be relayed from the first network function to the second network function or be directly sent to the second network function. The second request may contain the identifier of the first entity (a UE ID plus a TP role ID) and the second information element which contains the information about the detailed capability information about the first entity and the available data sources related to the first entity.

The TP may receive a second response from the second network function. The second response may contain the identifier of the second information element, the approval of the second information element, and the blockchain address of the second information element. The second response may be relayed from the first network function to the first entity or be directly received from the second network function.

In a PreTA trust evaluation procedure, a first entity (e.g., UE-2). The TI may send a first request (e.g., a trust evaluation request) to a first network function (e.g., AMF). The first request may contain the identifier of the first entity (e.g., a UE ID plus a TI role indicator), the identifier of a first task (e.g., Task-1), and the type of the required trust evaluation (e.g., PreTA trust evaluation).

The TI may receive a first response from the first network function (e.g., AMF). The first response may contain the identifier of a second network function (e.g., TMF) and a first information element (e.g., TEPT-1) where the first information element may collect the trust evaluation pattern/criteria desired by or to be adopted by the first entity.

The TI may fill the first information element and creates a second information element (e.g., TEPT-Ins-1). The TI may send a second request to the second network function (TMF). The second request may be relayed from the first network function to the second network function or be directly sent to the second network function. The second request may contain the identifier of the first entity (a UE ID plus a TI role indicator), a trust evaluation type (e.g., PreTA trust evaluation), the identifier of a first task (e.g., Task-1), the second information element which contains the trust evaluation pattern/criteria desired by the first entity, and the identifier of a second entity (e.g., UE-1) whose trust needs to be evaluated by the first entity using the trust evaluation pattern/criteria included in the second information element;

The TI may receive a second response from the second network function (e.g., TMF). The second response may be relayed from the first network function to the first entity or be directly received from the second network function. The second response may contain the estimated trust index (ETI) of the second entity for performing the first task (e.g., Task-1). The TI may determine whether to assign the first task to the second entity for execution, based on the received estimated trust index (ETI) of the second entity.

An AI system may learn and exploit the physical world (such as existing data sets, entity behavior, sensory information, etc.) to train AI models based on various learning schemes such as deep learning, federated learning, reinforcement learning, and/or a combination of them. The trained model may automatically discover useful knowledge, make decisions or have application-specific skills (such as driving a car). For example, a general AI pipeline of supervised learning consists of multiple stages: 1) the data preparation stage that includes data collection and optional feature engineering/extraction used for training; 2) the training stage for learning an AI model; 3) the validation stage for testing and validating the learned AI model; 4) model deployment stage for deploying the validated AI model to a place where the model may be used; and 5) model application and operation stage for using the deployed AI model for various application purposes.

Typical AI model transfer requirements for three types of AI operations: 1) AI operation splitting between AI endpoints; 2) AI model/data distribution and sharing over 5G system (5GS); and 3) distributed/federated learning (FL) over 5GS. Intelligent transmission support for AI-based services in 5GS may be defined. The may focus on 5GS architectural and functional extensions so that service providers may leverage 5GS as the intelligent transmission platform to support AI-based services. Based on the requirements, possible architectural and functional extensions to support the application-layer AI operations may be defined, including QoS, policy enhancements to support application AI operational traffic while supporting regular 5GS user traffic. The 5GS may provide assistance to an AF and the UE for the AF and UE to manage the FL operations and model distribution/redistribution (e.g., FL members selection) to facilitate collaborative AI between the application clients running on the UEs (e.g., FL clients) and the application servers (e.g., the FL server). As a result, a set of general architecture principles, which may further affect the related procedures and architecture, may be defined. New functional and/or performance requirements may emerge. The use cases and potential service and performance requirements for distributed AI training/inference involving direct device connection may require distributed AI training/inference based on device-to-device connection and addressing charging and security aspects.

Trust Evaluation and Management

Trust may refer to a measurable belief that represents an accumulated value (e.g., about the quality/behavior/performance/characteristic of a network node, a UE, a service or any logical/physical entity) from history and the expected value for the future. Trust may be objective trust or subjective trust. The objective trust leverages the security mechanism, such as authentication, to validate an entity's identity. However, trust covers and is beyond security. For example, an entity passing the authentication may only mean the entity has successfully proved its identity, it still may not be fully trusted since the trust about the entity's behavior/characteristics may still be dynamically changing and the criteria for evaluating trust may also be subjective, e.g., based on user/personal experience/preference. Trust is an essential input for decision making and it is usually measured or calculated based on the history experience/records in the past, and it represents the expected value of quality, behavior, characteristics, and/or performance in the future.

A Trust Index may be obtained via a Trust Evaluation process. A trust index may be used to describe the trust of an entity. The trust index is an overall metric, which is often calculated based on the aggregation of one or more Trust Indicators (depending on the user's subjective trust evaluation criteria) using certain trust evaluation algorithms. The trust indicators may cover various aspects, such as security, privacy, resilience, performance, robustness, scalability, availability, accuracy, reliability, consistency, etc. During a trust evaluation process, various data about an entity may be collected and those data may be used as inputs to calculate various trust indicators, which in turn may be aggregated into an overall metric, e.g., the current trust index of the entity. Trust has various characteristics. For example, trust is dynamic, meaning that a given trust index may be applicable for a limited time period and may change as time goes on. Trust is also context-dependent, which may imply that the trust may have a significant change if the context gets changed. Trust may not be transitive in nature, but trust may be transitive in some particular contexts. Similarly, trust is an asymmetric relationship, meaning that a fact of entity A trusting entity B cannot deduce that entity B also trusts entity A. In addition, trust may also be subjective, which may imply for the same entity, different users may have different criteria/opinions/preferences regarding how to evaluate the trust of this entity and what kinds of trust-related aspects/indicators may be considered. The term Estimated Trust Index (ETI) is used herein to represent the trust index (to differentiate from TI, which refers to Task Initiator).

Blockchain Technology

Blockchain technology is a technology that jointly leverages and builds on top of a few existing techniques such as cryptography, hashing, Merkle tree, distributed ledgers, Peer-to-Peer (P2P) networking, and consensus protocols. However, blockchain technology innovatively integrates them together to enable a system that may provide advanced features such as decentralization, immutability, transparency, and security; blockchain system is referred to as the system using blockchain technology. Blockchain Nodes (BCN) may be connected via P2P links and form a mesh P2P network, over which transactions and blocks may be broadcasted among all blockchain nodes. A blockchain node may connect to multiple other blockchain nodes as its neighbors or neighboring blockchain nodes. Applications using and/or supported by a blockchain system may be referred to as blockchain applications. A blockchain system is underpinned by underlying blockchain networks which may be composed of many participating blockchain nodes. Each blockchain node hosts one or more blockchains (a form of distributed ledgers) and participates in the blockchain system. For example, blockchain nodes broadcast blockchain transactions and blocks among each other using peer-to-peer networking; blockchain nodes also perform consensus protocols with each other to reach distributed trust and consensus without relying on a centralized party. A blockchain transaction may be a digital representation of a real-world transaction, a digital record of physical assets, a digital record of a physical event, a digital record of any action in an information system, a digital payment, and/or a digital smart contract; a block groups multiple blockchain transactions together.

Figure 2:
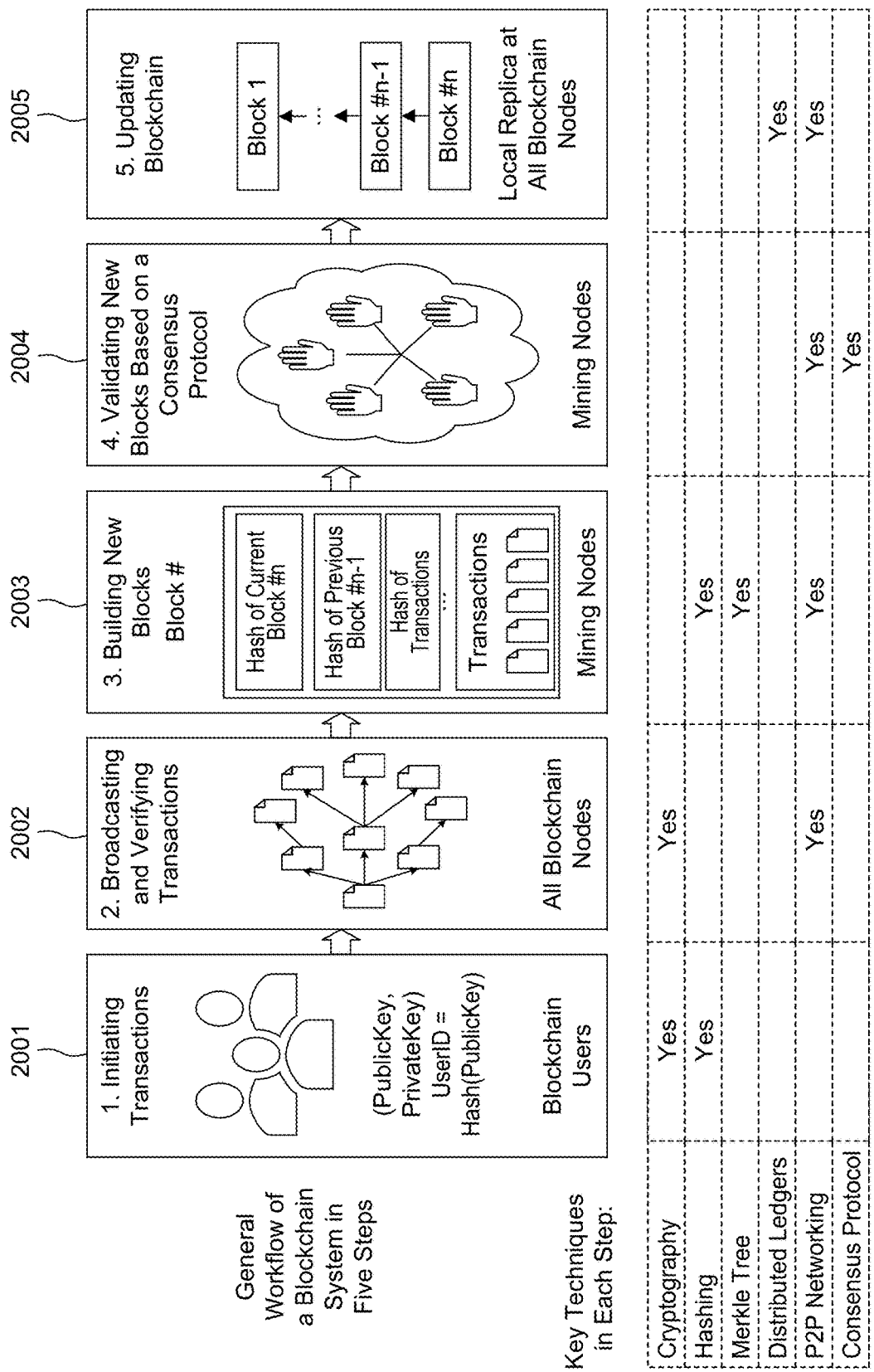
FIG. 2 depicts an example of a general workflow of a blockchain system.

FIG. 2 depicts an example of a general workflow of a blockchain system.

The general blockchain system may comprise five steps.

In the first step 2001, users may initiate transaction. In this step, each participating user generates new transactions independently. Each user has a user or account identifier, which is in general a hash of the user's public key. Each new transaction may be signed using the user's private key. After a new transaction is generated, the user may send it to the blockchain network.

In the second step 2002, the blockchain network may verify the transactions. Broadcasting and Verifying Transactions. A new transaction may be first received by some blockchain nodes, which may verify its integrity using the user's public key, which is included in the transaction. After the verification and if the new transaction is valid, it may be relayed and broadcasted within the blockchain network. Eventually, all blockchain nodes may receive and have a copy of any newly generated and valid transactions.

In the third step 2003, blockchain mining nodes may generate new blocks. In this step, some blockchain nodes (referred to as Mining Nodes or Full Nodes) start to group many newly generated and pending transactions together to generate a new block. The new block may consist of a block header and a block body. The block header generally includes a hash of the current block, a hash of the previously-confirmed block (e.g., the last block on an existing blockchain), and a hash of all included transactions (e.g., Merkle tree). Depending on the consensus protocol, the block header may contain additional information. The block body contains the content of all included transactions. Each mining node independently attempts to create a new block.

In the fourth step 2004, mining nodes may use a consensus-based protocol to validate new blocks. In this step, mining nodes independently attempt to create a new block. They run the same consensus protocol (e.g., Proof-of-Work in the Bitcoin system) and reach an agreement on who (e.g., a winner) is allowed to insert a block into the existing blockchain. The winner of the consensus protocol may send its newly generated block to the blockchain network. This new block may be broadcasted and let all mining nodes receive it and verify it.

In the fifth step, 2005, the blockchain is updated. After the newly generated block is verified, it is successfully appended to the existing blockchain, since it contains a hash of the previous block (e.g., the last block of the existing blockchain).

Use Case: Remote Personal Experience Evaluation for Adventure Park

It is foreseen that UEs (such as various wearable devices/equipment and smartphones located in the network edge) may not be acting as a "consumer" for consuming data/services provided by service providers in the network. For instance, 6G UEs may be expected to be more powerful and may also act as a 6G service provider for various data/computing/communication resources to other UEs.

A promising use case related to remote personal experience evaluation is considered. This may be a typical use case in a future system such as a 6G system.

In the last few years, Lisa has been involved in a personal data profiling program, which recorded her real-time health status (based on readings from wearable sensors) and her subjective experience ratings when participating in various social events or fun activities. For example, when Lisa was riding a roller coaster, wearable medical sensors may collect her heart rate and blood pressure in real time. In the meantime, Lisa's phone recorded various movement-related data about the roller coaster using on-board sensors (such as accelerometer, GPS, gyroscope, and gravitational sensor) to record the maximum acceleration/altitude/weightlessness feeling experienced by Lisa. Lisa also recorded her personal ratings about the ride, such as feeling very excited, not excited at all, too nervous, etc. All of those data and information were used for training a customized AI/ML model (called AI/ML Model-1) for evaluating Lisa's personal experience evaluation for roller coasters.

Lisa is attending a touristy group to visit a city and she just finished her lunch in a restaurant. The tourist guide proposes to the group members to visit a new adventure park in the afternoon, which is three miles away. It seems that the park has a lot of new roller coasters. Since Lisa is an enthusiast for the adventure park, she plans to make a casual decision (e.g., on the spur of the moment) whether to take the tourist guide's suggestion. However, Lisa may not be sure whether this new park may give her a fantastic experience. Lisa does not think online reviews are very useful to her. Therefore, Lisa may decide to first use Model-1 to conduct a personal experience estimation before making the decision. In this process, Lisa needs to identify some data sources, e.g., some visitors who are currently riding the roller coasters in the park. The UEs of those visitors are expected to create various sensory information (e.g., the maximum acceleration/altitude/weightlessness experienced by the visitors taking those roller coasters) and that information is the data input for Model-1 (specifically trained for Lisa).

To save communication costs, Lisa needs to deploy Model-1 close to data sources (e.g., visitors/UEs currently riding the roller coasters in the park) for communication cost saving since the data inputs (various sensory information collected from visitors' UEs) for Model-1 may be in a large size. As a result, Lisa needs to find a UE(s) in the park that has powerful computing resources for hosting and operating Model-1. However, due to privacy issues, Lisa only plans to deploy part of Model-1 to UE(s) in the adventure park. For example, certain layers of Model-1 used for pre-processing low-level feature extraction may be deployed to UE(s) in the park but some layers representing sensitive/privacy information (such as high-level feature extraction and classifier specifically trained for Lisa) may still be kept by Lisa (or deployed in Lisa's cloud space). For easy illustration, it is assumed that Model-1 is divided into two parts, Part-X may be deployed remotely (e.g., in the park) while Part-Y may be kept in Lisa's cloud space. The data inputs collected from the adventure park may first be injected into Part-X and the output of Part-X may be further sent to Part-Y for further processing.

The reality is that Lisa has no official relationship/affiliation with visitors' UEs in the park (which may act as different roles such as a data source, or a computing node for hosting Lisa's AI/ML model). UEs that may help Lisa may be personal smartphones, wearable devices such as AR glasses, etc. To conduct a remote personal experience evaluation for Lisa, one or more UEs in the park may be involved and those UEs may work together and are expected to conduct the following type of operations:

Operation Type-1—Communication-related operations. For example, one UE (e.g., UE-1) may provide its communication resources to retrieve part of Model-1 (e.g., Part-X) from an AI/ML model repository as designated by Lisa and deliver Part-X to another UE (e.g., UE-2) which host and operate Part-X. In addition to model downloading, UE-1 may also help to collect the intermediate output of Part-X (as the input to Part-Y) from UE-2 and upload them to Part-Y in Lisa's cloud space for further processing.

Operation Type-2—Computing-related operations. For example, UE-2 is responsible for operating Part-X of Model-1, which uses data collected from UEs of visitors who are currently riding roller coasters. Part-X may yield some intermediate outputs, which may be sent to Part-Y for further processing.

Operation Type-3—Data source-related operations. For example, one or more UEs (e.g., UE-3) of visitors (who are currently riding roller coasters) may generate/capture various sensory information related to the roller coasters (the maximum acceleration/altitude/weightlessness feeling/etc.), which may be the inputs for Part-X of Model-1.

In this use case, Lisa or her UE (as TI) may rely on multiple UEs to collaborate together to conduct remote personal experience evaluation of roller coasters in a park. During this process, a given UE (as a TP) may be assigned one or more tasks for performing certain operation(s).

Many future applications or native system features may be realized in a distributed way, e.g., multiple UEs may be assigned different tasks so that those UEs work together to realize a application or a system feature.

However, in reality, UEs (as TPs or TIs) may not be in the same trust domain, or they may not have stable behavior/performance, or they may not act as commercial resource/service providers with "pre-assumed" level of trust (e.g., a company is trusted based on their reputation). Also, there is no guarantee that TPs are always willing to work diligently to perform tasks assigned by TIs. Therefore, before a TI assigns a task to a TP, it is necessary for the TI to judge/estimate whether the TP may be trusted to perform the desired operations required by the task. It may be determined that the TP does not have a good level of expected trust, and the TI may choose not to assign the task to the TP and/or the TI may select another TP. Alternatively, the TI may still choose to assign the task to the TP but may use the task's results with greater care. This saves unnecessary operational overhead and deployment costs.

Overall, the trust of TPs may significantly affect the successful operation of distributed applications or system features. Technical issues associated with the trust evaluation and management involved in the task assignment and task operation include, for example:

Issue-1: Pre-task-assignment (PreTA) trust evaluation is defined as a process when TI needs to judge/estimate a TP's potential trust for performing a task "before" the TI may decide to assign the task to the TP. This process is essential because the TP may not be expected to have sufficient trust for performing the task, in which case the TI may not assign the task to the TP for execution. This may significantly reduce the task assignment and deployment overhead and save considerable wireless system and device resources (e.g., communication, computing, energy, etc.). However, TI is often not capable of estimating/judging whether a TP may be trusted for performing a Task since that Task has not been assigned to TP yet and no data/knowledge is available as a reference describing how this TP may perform the task.

Issue-2: Existing trust evaluation approaches may not be task-aware and historical trust information/knowledge cannot easily be re-used as a valuable reference. Also, individual TIs may have different criteria regarding how the trust of a TP should be determined or evaluated. For example, in existing solutions, a single trust index is used to describe the trust of an entity. However, an entity may have different levels of trust for executing different types of tasks/operations. For example, an entity may have a high-trust for performing communication-related operations, but may only have a low-trust for performing computing-related operations, etc. In the meantime, the trust of a TP may be decided by various trust indicators (e.g., security, privacy, resilience, etc.) but different TIs may have their own preference regarding which trust indicators may be essential and which may not be important. For example, if a new Task-1 (to be assigned to TP-1 by TI-1) and another Task-2 (already assigned to TP-1 by TI-2) may be involved with the same type of operations, the trust measurement of TP-1 for performing Task-2 (using TI-2's specific trust evaluation criteria) may not have any reference value for TI-1 to decide whether the new Task-1 shall be assigned to TP-1 for execution since TI-1 and TI-2 adopt different sets of trust evaluation criteria.

In one example, a user may deploy and operate an AI/ML model for predictions. In order to realize this application, the following operations may be involved:

The data needs to be generated (e.g., by various sensors) and collected.

The collected data needs to be input into an AI/ML model.

The AI/ML model may process the collected data and produce prediction results.

The prediction results need to be submitted to another entity for further processing.

Figure 3:
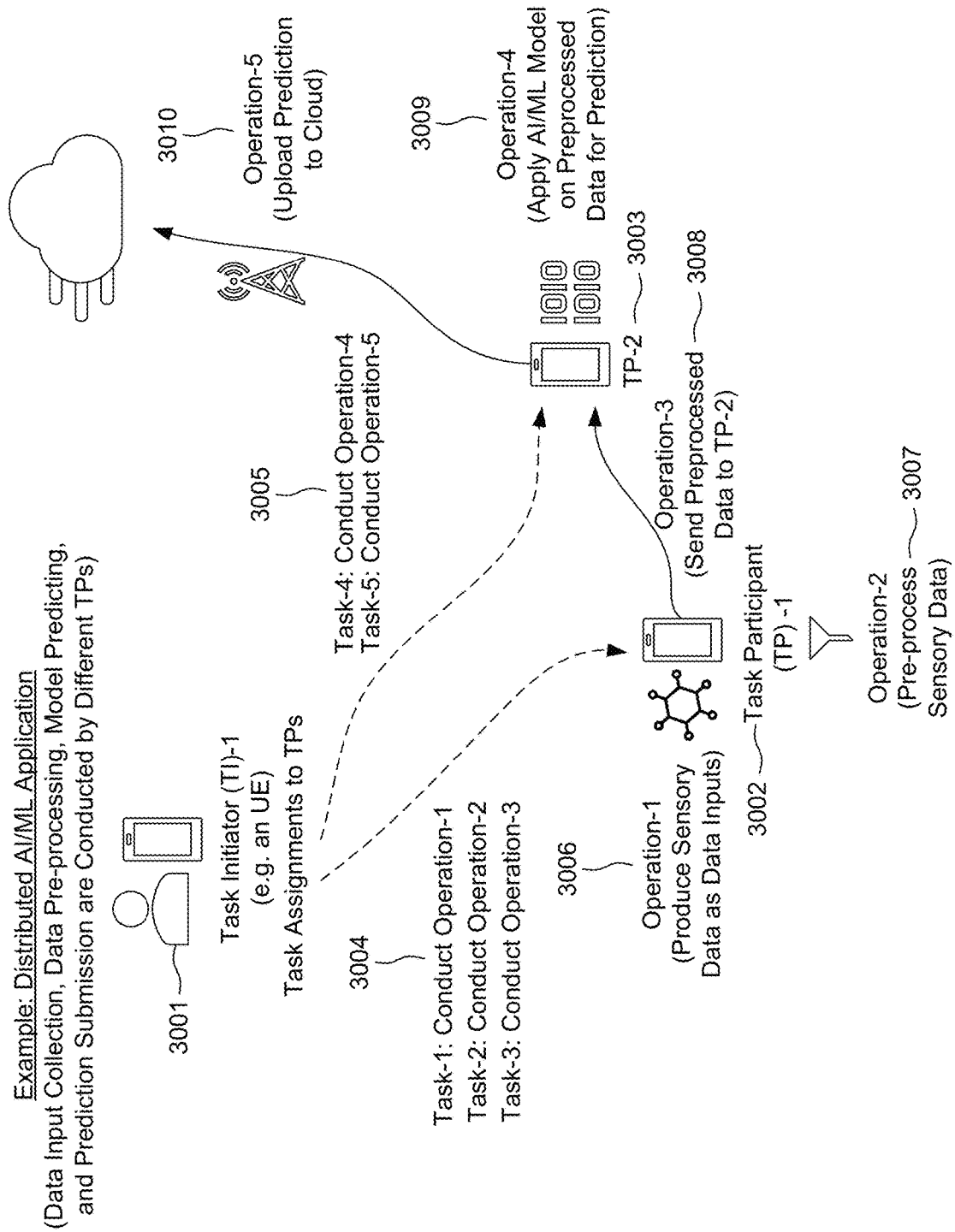
FIG. 3 depicts an example of task assignment for deploying and operating a distributed AI/ML application.

FIG. 3 depicts an example of task assignment for deploying and operating a distributed AI/ML application.

A TI 3001 may find multiple TPs, TP-1 3002 and TP-2 3003. The TPs may collaboratively conduct the above operations. TI 3001 may assign different tasks 3004, 3005 to multiple UEs (UEs operating as TPs) and each of them is responsible for conducting one or more task(s).

A Task describes what a specific type of operation needs to be done. One task may be assigned to one TP, but one TP may be assigned more than one task. A task requires a TP to conduct a type of operation. Operations may generally be categorized into one of three Generic Operation Types (GOTs):

GOT-1: Communication-related GOT-1 operations involve data transmission and communication. The data being transmitted may be any type of data.

GOT-2: Computing-related GOT-2 operations involve any type of data computing or processing.

GOT-3: Data source-related GOT-3 operations involve data generation or capture, e.g., using various sensors/cameras.

Each GOT may further have GOT sub types. A GOT sub type describes the details regarding what exact operations may be conducted for a task. For example, a "GOT sub-type" parameter may further indicate that the specific computing operations may be image analysis/processing.

GOT operations may be application specific (e.g., to support a specific type of vertical application, such as an AI/ML application, an AR/XR application, etc.), or may be applicable to cases where GOT operations may be related to native operations/processing (e.g., a GOT operation may represent a UE-to-Network Relay operation as supported by 3GPP Proximity Services (ProSe)). Examples presented may be utilized to facilitate the understanding of the concepts being presented; examples are non-limiting.

An entity that generates or initiates a task is defined as a Task Initiator (TI). TI may be a human user, a UE/device/gateway, a software application (installed on a UE, a network entity, a mobile base station, or a network server), or a network function in the 3GPP core network, or an Application Function, or any non-3GPP UE/device behind a 3GPP UE, etc.

A TI may assign a task to an entity (e.g., a UE, a device, a gateway, a mobile vehicle, a road-side unit, etc.) so that this entity may conduct the desired operation required by the task. Such an entity is the role of Task Participant (TP).

Each task (e.g., the tasks 1-5 3004, 3005) may be modeled or described as the following tuple: Task={task identifier, involved TI, involved TP, GOT type, GOT sub-type, task description/instruction}, wherein The "task identifier" is the identifier of the task, which may be assigned by a TI.

The "involved TI" parameter identifies which entity initiates this task. For example, this parameter may include a new TI identifier, which may be composed of a traditional UE identifier (e.g., SUCI) plus a TI role identifier.

The "involved TP" parameter identifies which entity needs to execute this task. For example, this parameter may include a new TP identifier, which may be composed of a traditional UE identifier (e.g., SUCI) plus a TP role identifier.

The "GOT type" parameter describes what specific type of operations the involved TP needs to conduct. A given task may be associated with a particular GOT. However, a TI may want a TP to conduct two different GOT operations, in which case it may create two individual tasks and assign them to the TP for execution.

The "GOT sub-type" parameter describes the next level of details regarding what exact operations may be conducted. For example, in GOT-1 operations, the GOT sub-type parameter may indicate the specific communication operation is the UE-to-Network Relay operation supported by 3GPP ProSe.

The "task description/instruction" parameter describes how the task should be conducted, including but not limited to: what resources to be used for executing the task, when the tasks should be executed (e.g. task execution can be triggered by an event, or based on a schedule, etc.), what software/interfaces should be used, etc. For example, if a task requires GOT-1 operations, the task description may advise what kinds of communication-related operations shall be conducted, e.g., whether to pull certain data from another entity, or whether to send certain data to another entity, what kinds of communication medium should be used for data communication (e.g., via Wi-Fi or cellular link), when to conduct those operations (e.g., schedule), or any other instructions. Another example, if a task requires GOT-2 operations, the task description may describe what kinds of requests/data may be received and how to process the received data, e.g., a TP may need to use a specific software module/libraries/algorithm to process the received data/requests, etc.

As shown in FIG. 3, TI-1 3001 may create five tasks 3004, 3005 and each task may involve a TP conducting a certain type of operation. One example solution may be that TI-1 3001 may assign Tasks 1-3 3004 to TP-1 3002 and assign Tasks 4-5 3005 to TP-2 3003. As a result, TP-1 3002 may first use its onboard sensors to generate the needed data 3006, corresponding to Operation-1, which is a GOT-3 operation. Then, TP-1 3002 may preprocess the data 3007, corresponding to Operation-2, which is a GOT-2 operation, so that it may be ready for use as input into an AI/ML model. After that, TP-1 3002 may deliver the preprocessed data to TP-2 3008, corresponding to Operation-3, which is another GOT-1 operation. Once TP-2 3003 obtains the data, it may input the data into an AI/ML model, which may process the data and produce a prediction result 3009, corresponding to Operation-4, which is a GOT-2 operation. Finally, TP-2 3003 may submit the prediction result to a remote entity 3010, corresponding to Operation-5, which is a GOT-1 operation. In this example, it may be seen that although Operation-2 and Operation-4 have the same GOT type, e.g., GOT-2, they have different GOT sub types (Operation-1 is related to sensory data pre-processing while Operation-2 is related to AI/ML model predication).

Task-Aware Trust Evaluation and Trust Evaluation Pattern (TEP)

Compared to existing trust evaluation approaches (a TP is only associated with a single trust index), a more granular approach is described, e.g., a task-aware trust evaluation, meaning that a given trust index of a TP describes the trust of TP for performing a particular task or a particular type of operation (e.g., a particular type of operation required by a task). For simplicity, the term "performing or executing the operations required by Task-1" may be simply described as "performing Task-1". When a TP is assigned multiple tasks, this TP may have multiple and different trust indexes for each of the assigned tasks, respectively. In other words, when evaluating the trust of a TP, it needs to specify what task is involved.

Figure 4:
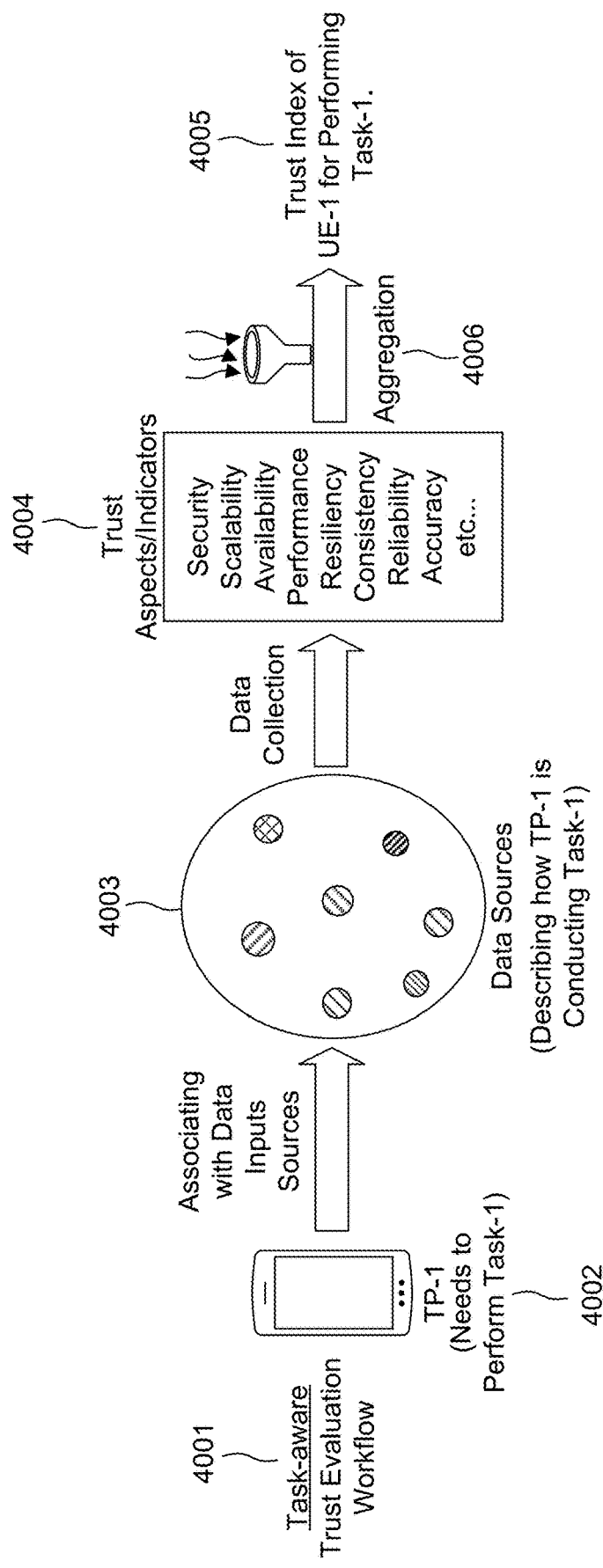
FIG. 4 depicts an example of a task-aware trust evaluation workflow.

FIG. 4 depicts an example of a task-aware trust evaluation workflow.

First, various data sources may be identified that may produce data reflecting how TP-1 4001 may perform Task-1 4002. For example, the available data sources 4003 may either be TP-1 4001 itself (e.g., a UE), or may be other entities, such as the serving base station of TP-1 4001, the NFs in the core network, etc. In the meantime, the trust evaluation desired by a TI (initiating Task-1) (not shown in the figure) may involve different trust aspects, referred to as Trust Indicators 4004. Those trust indicators 4004 may be calculated based on the data inputs collected from available data sources 4003. Finally, the Trust Index of TP-1 for performing Task-1 4005 may be determined based on the aggregation of different trust indicators 4006.

Since trust evaluation may be subjective, different TIs may have different opinions/preferences regarding how the trust of a TP shall be evaluated. A Trust Evaluation Pattern (TEP) is a specific instance that specifies a detailed set of criteria regarding how trust evaluation should be performed. Each TI may create its own TEP based on the personalized need, or the system may define some standard or popular TEP(s) for TI to select. A TEP may specify the following details:

Several types of trust indicators may be considered. For example, some TIs may like to consider reliability as a key trust indicator, while other TIs may not consider reliability during their trust evaluations or at the same importance level.

Several algorithms may be adopted for calculating trust indicators and/or the trust index.

During calculation of trust indicators or a trust index, the values of certain parameters may be fully customized, and different TIs may have different preferences regarding how to set values for those parameters. For example, one TI may assume a TP is available for performing the desired operations (required by a task) for more than 70% (defined as a customized threshold value) of the entire time, such a TP may be regarded as having a good availably. However, another TI may view a TP having a good availability if this TP may be available for performing the task during 85% or 90% of the entire time, etc. Another example is, when aggregating different trust indicators to calculate the final trust index of a TP, one TI may decide that the trust indictor "availability" takes 15% weight while another TI may decide that availability may only take 5% weight.

Trust Management Function (TMF)

TMF may perform PreTA trust evaluation in order to help a TI to estimate a TP's potential trust for performing a task "before" the TI may decide to assign this task to the TP. Compared to existing trust evaluation approaches (a TP is only associated with a single trust index), TMF adopts a more granular trust evaluation approach (e.g., task-aware trust evaluation), e.g., a TP may have multiple trust indexes and a given trust index of a TP describes the trust of that TP for performing a particular task. TMF may provide PreTA trust evaluation for task assignments related to a wireless native system feature (e.g., to deploy a NF to a UE) but also provide PreTA trust evaluation for task assignment related to vertical applications (e.g., to realize collaborative AR processing by deploying tasks across multiple UEs).

In a basic scenario, TMF may not be responsible for TP identification, e.g., TP identification may be decided by TI itself or decided by an existing TP discovery function. After TI identifies a candidate TP for performing a task, the role of TMF may help the TI to evaluate whether the candidate TP has the desired trust for performing the task. In an advanced scenario, TMF may be integrated with an existing TP discovery function, meaning that TMF may handle both TP identification and TP trust evaluation, e.g., TMF may provide "one-stop-shopping service" to TI.

The major functionalities or features of TMF may be described as follows:

Feature-1: TP Registration. A given TP (e.g., a UE/device/entity), or called Registering TP, may register itself to TMF for acting as a TP and let TMF manage/measure its trust. The TP may be assigned various tasks by different TIs. TMF may help TIs to evaluate the TP's trust regarding whether the TP may be trusted to perform a particular task.

Figure 5:
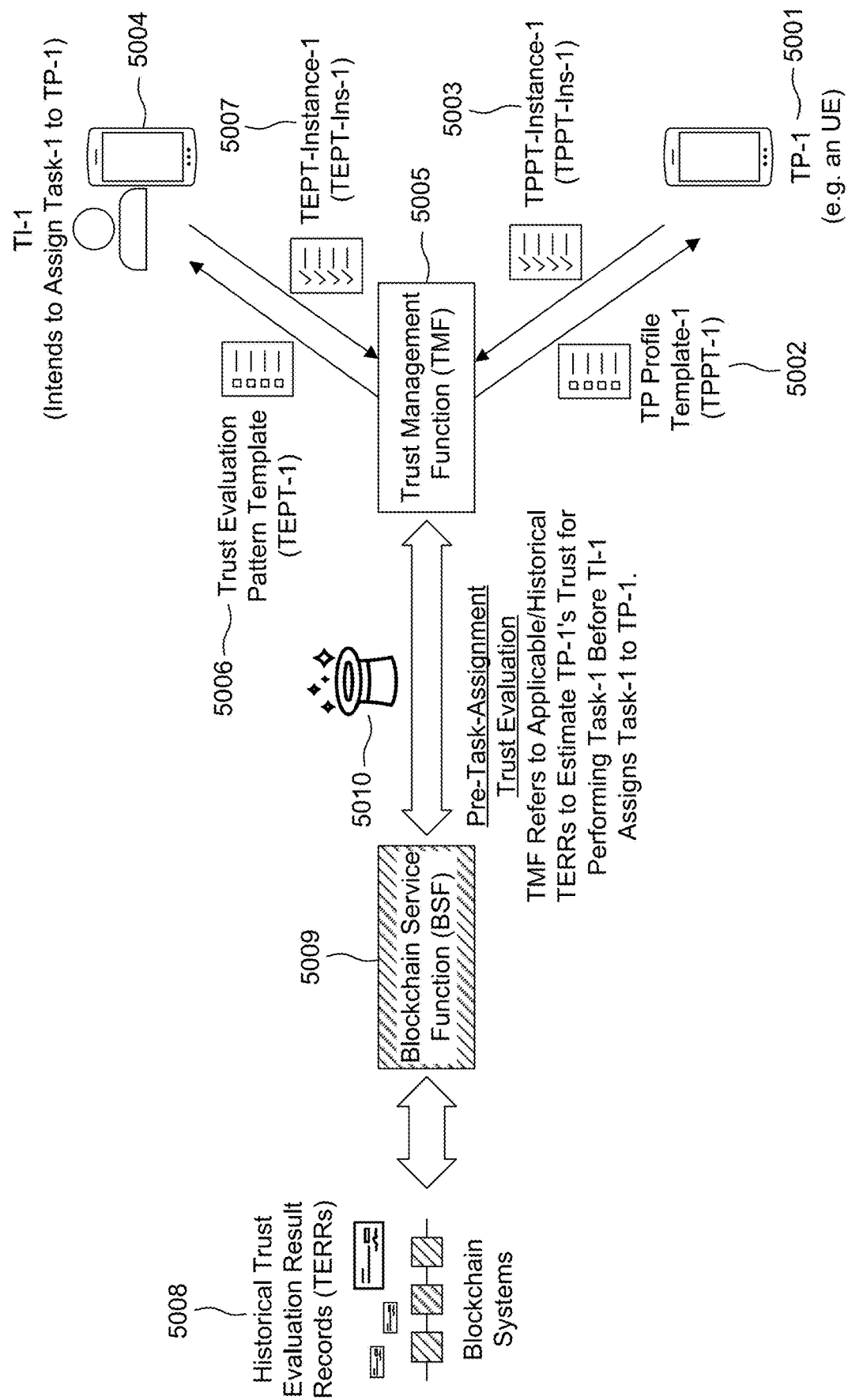
FIG. 5 depicts an overview of a task-aware Trust Management Function (TMF)

FIG. 5 depicts an overview of a task-aware Trust Management Function (TMF).

As shown in FIG. 5, the registering TP, TP-1 5001, may perform a TP registration to TMF and TMF may ask the registering TP to fill in a standard TP Profile Template (TPPT) 5002. A TPPT aims to collect various useful information about the registering TP regarding its various capabilities, as well as what GOT (e.g., GOT-X, X may be 1, 2, or 3) type of operations that may be supported by the registering TP. TPPT also collects useful information from the registering TP regarding what kinds of data sources may be available and how to collect useful data, which describes how the registering TP is performing a particular task. Such data may be the essential inputs for the trust evaluation, which aims to drive the trust index of this TP. The registering TP may fill in its information in TPPT, which leads to the creation of a TPPT-Instance (TPPT-Ins). The registering TP 5001 may return the created TPPT-Ins 5003 to TMF to complete its TP registration.

Pre-Trust evaluation of TP-1 may be conducted by TMF. A TI 5004 may intend to assign a task to a TP-1 5001. However, before the TI 5004 determines whether to assign the task to the TP-1 5001, the TI 5004 may want to know whether TP-1 may be trusted to perform the task.

The TI 5004 may send a trust evaluation request to TMF 5005 to ask TMF 5005 to estimate the trust of the TP. In this process, TMF may ask the TI to fill in a Trust Evaluation Pattern Template (TEPT) 5006. A TEPT lists trust indicators that may be evaluated and how to evaluate them. In an example, for a given trust indicator, the TEPT may define what kinds of data inputs need to be collected for calculating this trust indicator. A TEPT may also list a batch of candidate algorithms for a TI to select, which may be used to calculate trust indicators or the final trust index. Overall, given a TEPT received from TMF, the TI first may select specific trust indicators it would like to be considered, based on TI's own preferences, for the trust evaluation. The TI may also need to determine parameter configurations, such as the weights of trust indicators (for calculating the trust index), what kinds of calculation algorithms the TI would like to adopt, etc. Once the TI selects and fills in a TEPT, a TEPT-Instance (TEPT-Ins) is created 5007. A TEPT-Ins represents a complete Trust Evaluation Pattern (TEP) or trust evaluation criteria desired by the TI, which may be sent to TMF.

TMF 5005 may use the TEPT-Ins received from the TI to initiate PreTA trust evaluation. In particular, TMF may leverage historical Trust Evaluation Result Records (TERRs) 5008 stored in a blockchain system, in blockchain service function (BSF) 5009. A TERR may contain an evaluation result regarding the trust of a TP for performing a historical task in the past. For example, when the TP was performing a task, Post-task-assignment (PostTA) trust evaluation is conducted, which happens "after" the TI assigns a task (e.g., Task-1) to a TP for execution and it aims to measure the TP's practical trust for performing an assigned task.

TERRs may be created during the PostTA trust evaluation process. TMF may identify relevant TERRs, which may provide a valuable reference to estimate the potential trust of TP (desired by the TI) for performing the task required by the TI. During this process, with the usage of standardized TEPTs, TMF is able to compare the similarities of TEPs adopted by different TIs and to decide which TERRs (e.g., TERR-1) provide a valuable reference for estimating the trust of the TP desired by the TI for performing the task. For example, TERR-1 may be applicable for estimating the trust of the TP for performing a task (e.g., Task-1) if it meets certain conditions, for example: 1) the involved TP of TERR-1 is the same TP desired by the TI or a TP similar to the TP desired by the TI; 2) the involved GOT operation of TERR-1 is the same as the GOT operation required by Task-1; 3) the adopted TEP of TERR-1 is same/similar to the TEP desired by the TI (as described in a TEPT-Ins created by the TI); 4) the task difficulty or task complexity and the task execution context of the task associated with TERR-1 is similar to those characteristics of Task-1.

The TMF may discover multiple applicable TERRs from the blockchain system and aggregate them in order to produce an Estimated Trust Index (ETI) of TP-1 5010. Different procedures of PreTA trust evaluation may be defined, which may be applicable to different scenarios. The ETI is an estimation of whether the TP desired by the TI may be trusted to perform Task-1 required by the TI and may be sent to TI. As a result, the TI may take the ETI into consideration and make an official decision on whether to assign the Task-1 to the desired TP.

The roles such as TI, TP, TMF may be logical roles. A given entity/device/UE may take one or more logical roles at the same time. Therefore, although for easy illustration, different roles may be taken by different entities when introducing solutions, all solutions may also be applicable to any possible case where an entity acts two or more roles. For example, a given entity may act as a both a TI and a TMF.

A blockchain technology is used as a generic example to represent much broader distributed ledger technology; in other words, blockchain technology and distributed ledger technology may be used synonymously or interchangeably in this invention. As such, the all aspects presented may also be applicable to any specific blockchain technology and/or distributed ledger technology.

All solutions described may also be applicable to the scenarios where blockchain or distributed ledger technology may not be used. If that is the case, all information elements, or data (such as TPPT-Ins, TEPT-Ins, TERRs, etc.) may be maintained in a storage repository or maintained by the TMF locally. Additionally, Blockchain System(s), Blockchain Service Function, and/or BSF may be replaced with Repository Function.

TMF Landscape and Deployment Options in a 3GPP System

TMF is a new function that realizes the Trust Management Layer, which may provide trust management support to both the upper application layer (e.g., the application layer functions in the UE or in the data network) and the lower connectivity layer (e.g., various network functions in the network or hosted by UE).

Figure 6:
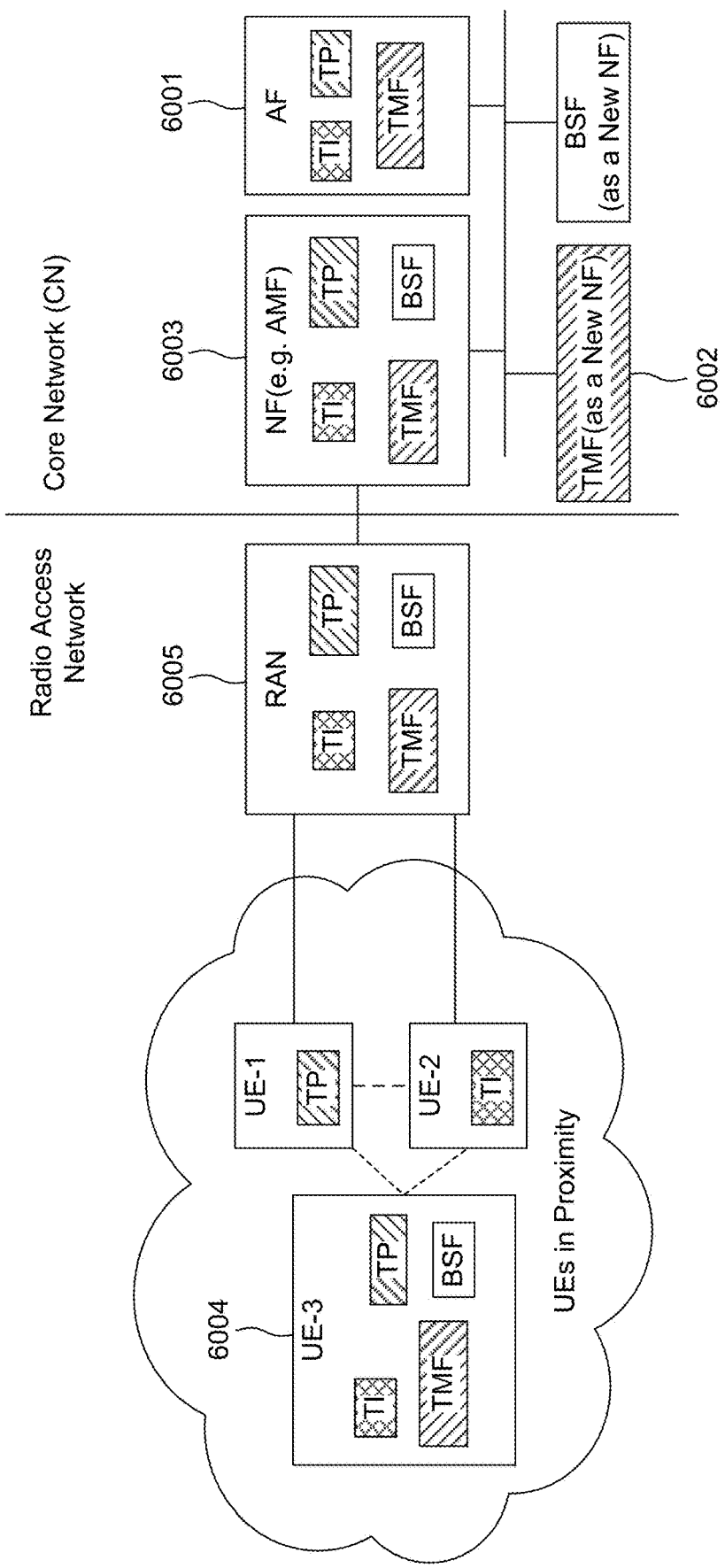
FIG. 6 depicts examples of centralized TMF deployment options.

FIG. 6 depicts examples of centralized TMF deployment options.

For example, TMF may be a new AF 6001 or a new NF 6002 in the 3GPP core network or TMF may be realized by an existing NF 6003, such as AMF, AUSF or NWDAF. Alternatively, TMF may also be deployed in a decentralized approach in the sense that multiple TMF(s) may be deployed within a wireless system. For example, a UE 6004 may take the role of a TMF, or TMF may be deployed on a gateway or base station 6005.

A TI may be an entity inside the 3GPP system, which may initiate a task. For example, TI may be an AF or a NF in the core network. TI may also be a base station, a gateway, an edge application, or a UE. Alternatively, a TI may be an entity outside the 3GPP system, e.g., a vertical application hosted on a UE.

TP may be any entity that has computing/communication/sensing capabilities. Typically, when a feature or an application is realized in a decentralized approach, most of the involved TPs may come from the network edge. For example, a TP may be a base station, a gateway, an edge application, or a UE. However, if needed, any NF or AF may also act as a TP.

The trust can be defined as an aggregated or umbrella metric, which may cover many aspects, e.g., a trust index may be calculated or measured based on various trust aspects, such as security, privacy, reliability, agility, accuracy, scalability, resiliency, availability, consistency, etc. However, the solutions described herein may be applicable to any scenario where a certain metric (not just the trust) needs to be evaluated and measured.

In one example, trust may be defined in a narrow setting, e.g., trust may only be related to security-related aspects, such as authentication/authorization, privacy, confidentiality, etc. Other aspects (such as reliability, performance, agility, accuracy, scalability, resiliency, availability, consistency) are regarded as peer indicators of trust. A new system-wide metric may be defined, such as quality of service, or quality of experience. This new metric may be measured or derived based on trust and one or more peer indicators of trust, such as performance, availability, accuracy, etc. In particular, the TMF may be used for conducting evaluations and deriving/measuring the system-wide metric.

In another example, various social goals may be considered, which could be a new class of evaluation criteria or key values, or key social indicators. Examples of these indicators or values include trust, sustainability, inclusiveness/pervasiveness, culture connection, digital connection, diversity, self-sovereignty, adequacy, cleanness, steadiness, accountability, traceability, and efficiency. The solutions described herein may be used to evaluate, measure, or monitor these new classes of evaluation criteria (or key values or key social indicators). For example, in the case where sustainability needs to be evaluated or monitored, the TMF could perform as a sustainability management function and the procedures of TMF could be leveraged to evaluate/measure/monitor the sustainability of wireless systems.

Blockchain Service Function (BSF) is a main portal for interacting with distributed ledger or blockchain systems. Typically, the node acting as a BSF may be a blockchain node (e.g., a full blockchain node, or a mining node) belonging to a specific underlying blockchain network. BSF may be implemented as a new NF in the 3GPP core network, or realized as part of existing NF, such as UDR. BSF may also be deployed on a base station, a gateway, or a UE in the field. In addition, when blockchain or distributed ledger technology may not be used, a general storage service function may be defined, which may provide storage-related functionality using non-blockchain-based storage medium.

Figure 7:
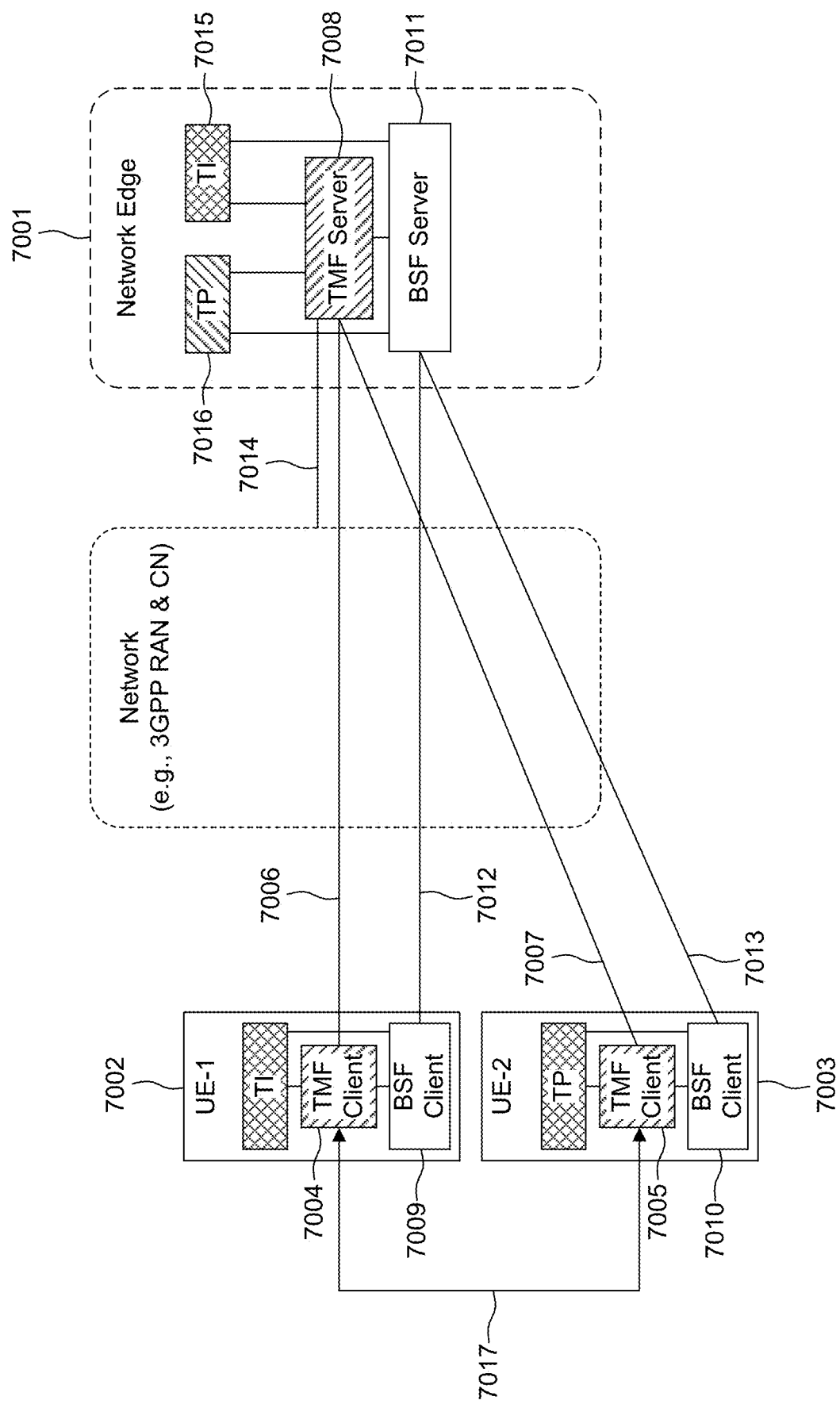
FIG. 7 depicts examples of TMF deployment options using a client/server architecture.

FIG. 7 depicts examples of TMF deployment options using a client/server architecture.

In this example, the TMF server may be at the edge of the network 7001. Each UE 7002, 7003 may host a TMF client 7004, 7005 which may allow the UEs to interact 7006, 7007 with a TMF server 7008 on the network side. Each UE may also host a TI application, or a TP application, or both. Each UE may also host a BSF client 7009, 7010. On the network side, a TMF server 7008 and a BSF server 7011 may be deployed. Accordingly, UEs may use BSF client 7009, 7010 to interact 7012, 7013 with the BSF server 7011. The TMF server 7008 may interact with various entities or functions inside the 3GPP system 7014. A TI application 7015 or a TP application 7016 may also be deployed on the network side, and they may directly interact with the TMF server 7008 and BSF server 7011. In addition, different UEs may also use their TMF clients to conduct UE-to-UE interactions 7017.

Figure 8:
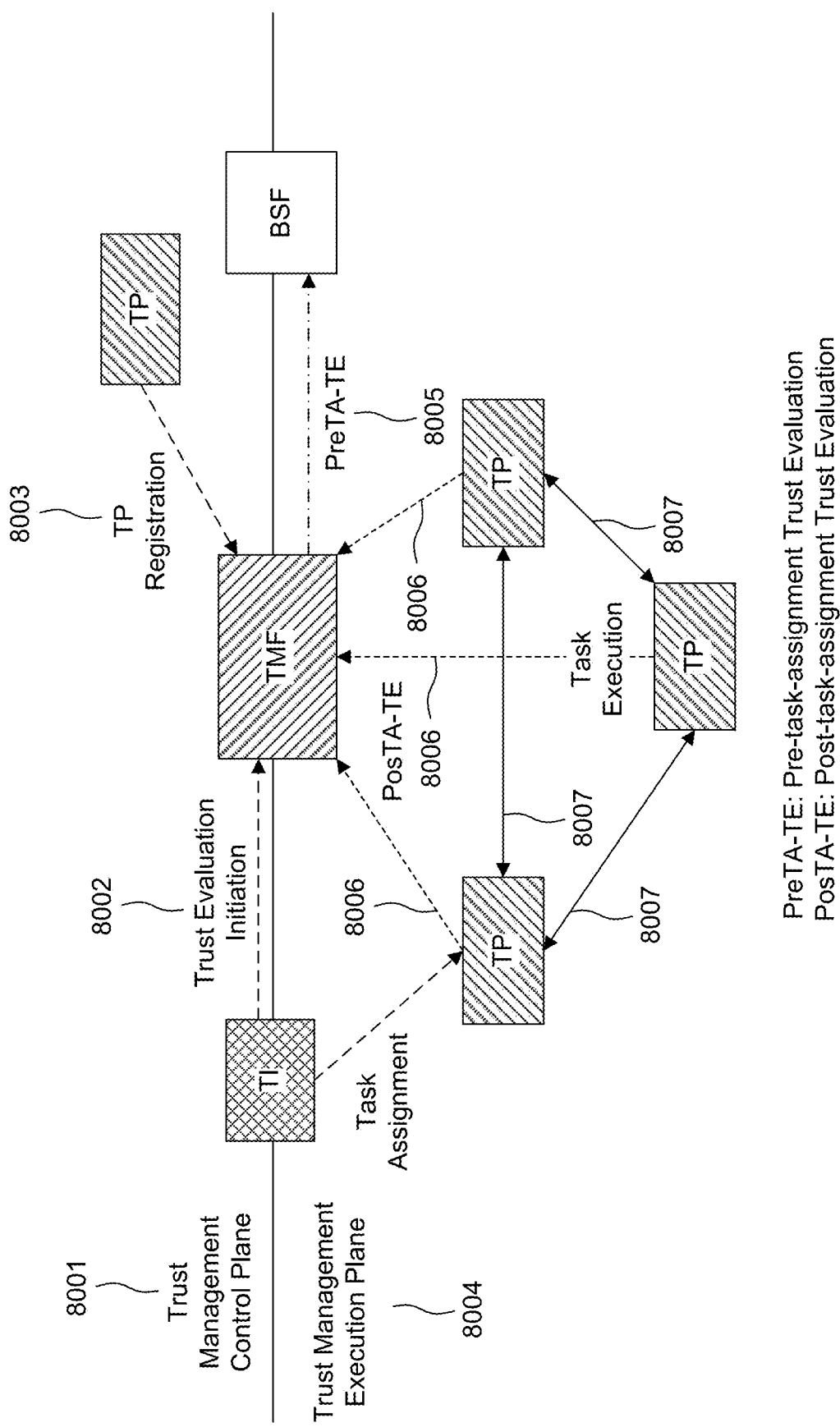
FIG. 8 illustrates an example of TMF operating as a Trust Layer in the 3GPP network.

FIG. 8 illustrates an example of TMF operating as a Trust Layer in the 3GPP network.

A Trust Layer may have two operation planes. The first operation plane is the Trust Management Control Plane 8001. In this plane, operations may be related to system setup or configuration management, such as trust evaluation initiated by TI 8002, TP registration to TMF initiated by TP 8003, TMF discovery, etc. The second operation plane is the Trust Management Execution Plane 8004. Once various trust-related jobs are initiated over the trust management control plane 8001, they may be executed in the trust management execution plane 8004. For example, the jobs may include pre-task assignment (PreTA) trust evaluation (PreTA-TE) 8005 and post-task assignment (PostTA) trust evaluation (PostTA-TE) 8006 during task execution 8007.

Definition of Various New Information Elements

A number of new information elements related to PreTA trust evaluation are described. Below is a summary describing how those information elements are used, which is also illustrated in FIG. 5.

The purpose of TPPT may collect information about a TP: During TP registration, a registering TP may receive a TPPT from a TMF. The registering TP may fill the TPPT, creating a TPPT-Ins, to indicate its information and what kinds of data may be collected from the registering TP to evaluate its trust.

The purpose of TEPT may collect information from a TI and to define a set of specific trust evaluation criteria for evaluating a task: A TI may assign a task to a TP, in which case the TI may request a TMF to initiate PreTA trust evaluation procedure. During the procedure, TI may receive a TEPT from TMF. TI may fill the TEPT, which creates a TEPT-Ins. The TEPT-Ins may describe the customized TEP desired by the TI regarding how trust shall be evaluated for the task. Once a TI creates a TEPT-Ins, it may be returned to the TMF. TMF may execute trust evaluation for TI on targeted TP(s) by referring to the instructions described in the TEPT-Ins.

A TERR is a record of past trust evaluation and it has two uses: 1) to reflect the latest trust evaluation of a TP for performing a specific task at the time when this TERR was generated; 2) provides a useful reference for TMF when conducting PreTA trust evaluation for future task assignments.

Information Elements Related to Task Participant (TP)

TMF may provide a TPPT to a registering TP in order to collect useful information about TP, e.g., its various capabilities, etc. Once the TP may fill in a TPPT, a TPPT Instance (TPPT-Ins) is formed.

An example of a TP Profile Template (TPPT) is illustrated in Table 1.

Table 1: Example of TP Profile Template (TPPT)

TABLE 1

| Item Name | Example of Description |
|---|---|
| Example of TP Profile Template (TPPT) | |
| Part 0: Headers of TPPT (Created by TPPT Creator) | |
| TPPT identifier | This is to indicate the identifier of this TPPT, e.g., TPPT-1 |
| TPPT creator | This is to indicate the creator of this TPPT. For example, the creator could be the identifier of TMF, e.g., TMF-1, or a network operator or administrator. |
| TPPT version | This is to indicate the version of this TPPT, e.g., version 1.2. |
| Part 1: Basic Information About TP (A TP may fill in Part 1 in order to indicate its information related to its capabilities, characteristics, etc.) | |
| TPPT Instance Identifier | This is to indicate the identifier of a TPPT instance which is to be generated once the TP fills in this TPPT. Note that, when a TP is filling a TPPT, if this row is blank or if this row is not present, it means the TP needs to generate an identifier for the TPPT-Ins to be created, and such an identifier needs to be validated by TMF soon in order to make sure it is globally unique. However, when a TP is filling a TPPT but this row is not blank, it means TMF has pre-decided a globally-unique identifier for the TPPT-Ins to be created. In addition, after a TPPT-Ins is created, its identifier will appear in the header of the TPPT-Ins. |
| TP identifier | This is to indicate the identifier of a TP, which is filling in this template for registering as a TP, such as TP-1. |
| Type of TP | This is to indicate the type of TP, such as smart phones, laptops, IoT devices, machines, routers, base stations, etc. |
| Hardware specification | This is to indicate the hardware specifications of the TP, such as computing-related (CPU, memory, storage, GPU, etc.), and communication-related (cellular, Wi-Fi, Bluetooth, Near Field Communication, etc.), etc. |
| Software specification | This is to indicate the software environment of the TP, such as Operating System (OS), installed software libraries, software frameworks, etc. |
| Sensing capability specification | This item is to show what types of data can be sensed or captured by the TP using on-board sensing capabilities. For example, a smartphone may install many types of sensors (light sensor, motion sensor, etc.). For each type of sensor, the following information may be included, such as sensory type, sample quality, sampling schedule/rate, sample size, etc. |
| Security-related capabilities | This item is to indicate what kinds of security-related capabilities this TP can support (e.g., whether this TP can use certain integrity protection algorithms to protect the messages, etc.) or whether this TP has desired characteristics (e.g., whether this TP has already been authenticated by the wireless system, etc.). The security may cover various aspects such as privacy, confidentiality, authentication, integrity, etc. Those aspects are also the trust indicators, which may be used for calculating the trust index of this TP. |

TABLE 1-continued

Example of TP Profile Template (TPPT)

| Item Name | Example of Description |
|---|---|
| Other characteristics | This is to indicate any other characteristics, including but not limited to affiliation name, device brand, battery volume, mobility-related information (e.g., whether this TP is a mobile entity or not. TP may also indicate a moving area), etc. |
| Supported GOT list | This is to indicate a list of GOT operations that the TP would like to contribute to task execution. For example, a TP may have powerful computing and communication resources, and therefore TP-1 would like to support GOT-1 type of operations and GOT-2 type of operations.<br>In addition, it is possible that a TP may not want to support a particular type of GOT operation (such as computing-related operations) even if this TP has such a capability/capacity. In other words, it is up to the TP to decide which kinds of GOT operations it would like to support for task execution. |
| Supported GOT sub type list | For a given type of GOT operations supported by TP, the registering TP may also like to further indicate some specific GOT sub-type(s), e.g., some of application-specific capabilities that can be supported by the TP, which could refer to any vertical technology, such as AI/ML, AR/VR/XR, metaverse, etc. Taking an AI/ML application as an example, a smart phone may have installed a pre-trained foundation model (e.g., a large language model) and such a smart phone (as a TP) may indicate it can support GOT-1 operations, and more in particular, AI/ML-related capabilities/operations. Other related information such as the model version and size may also be described in this parameter. |
| Part 2: Available Runtime Data Describing Task Execution | |
| (A TP may fill in Part 2 in order to indicate what kinds of runtime data related to task execution can be collected) | |
| Runtime Data that Can Be Collected from TP Itself | A given task often requires a TP to perform a specific type of operation. During the task execution, various runtime data can be captured, which describes how a TP is performing a task. Such data is useful for measuring the actual trust index of the TP for performing a specific task.<br>This item is to indicate what type of runtime data that TP itself is willing to provide. Accordingly, when a TP is executing a task, TMF may periodically collect runtime data from a TP or the TP may proactively report runtime data to the TMF. |
| Runtime Data That Can be Collected from Other Entities | In addition to TP itself, runtime data can also be provided by other data sources, such as various entities in the serving network of the TP, which may include various NFs in the 3GPP core network or the serving RAN nodes, etc.<br>TP may indicate what kinds of data can be collected from those sources. In the meantime, TP needs to make sure certain access rights shall be appropriately granted to TMF so that TMF can collect data from those data sources. |
| Runtime Data Collection Instructions | This part is to indicate the detailed instructions regarding how to collect runtime data from TP itself or from other entities (as listed in the previous two data items). |

Typically, after a TP may fill a TPPT, a TPPT-Ins may be formed. An example of a TPPT-Ins is shown in Table 2.
Table 2: Example of TPPT-Instance (TPPT-Ins)

TABLE 2

Example of TPPT- Instance (TPPT-Ins)

| Item Name | Example of Description |
|---|---|
| Part 0: Headers of TPPT-Ins<br>(Created by a TP) | |
| TPPT Instance identifier | TPPT-Ins-1 |
| The identifier of associated TPPT (e.g., this TPPI-Ins is created based on which TPPT) | TPPT-1 |
| The identifier of registered TMF | It is possible that in the system there could be multiple TMFs. This parameter is to indicate this TPPT-Ins is managed by which TMF instance, e.g., TMF-1. |
| Part 1: Basic Information About TP<br>(Part 1 is filled by TP) | |
| TP identifier | TP-1, or any other types of identifiers, such as SUCI, IMEI, FQDN, etc. |
| Type of TP | Smartphone |
| Hardware specification | Qualcomm SM8550-AC Snapdragon 8 Gen 2; 32G RAM, 512GB internal storage.<br>3GPP 5G interface; Wi-Fi; Bluetooth; 3GPP D2D<br>Optional |
| Software specification | Android 13, One UI 5.1; TensorFlow Lite |

TABLE 2-continued

Example of TPPT- Instance (TPPT-Ins)

| Item Name | Example of Description |
|---|---|
| Sensing capability specification | Forward camera<br>Motion Sensors<br>Environment Sensors<br>Position Sensors<br>Etc. |
| Security-related capabilities | This item is to indicate what kinds of security-related capabilities this TP can support.<br>Communication-related:<br>Authentication-related: The registering TP (e.g., TP-1 as indicated in the "TP identifier" parameter) has already been authenticated by the wireless system and/or TMF.<br>Confidentiality: The TP may have security keys for securing the messaging, which are required during the execution of a task. Also, the TP has the capability to apply ciphering algorithms to conduct confidentiality protection on all the messaging, which is required during the execution of a task.<br>Integrity: The TP has the capability to apply a certain protection algorithm to protect the integrity of messaging and/or to verify signatures generated under the same protection algorithm, which are required during the execution of a task.<br>Etc.<br>Computing-related:<br>The TP has already installed the desired antivirus software with the most recent updates.<br>The TP has installed a Trust Execution Environment (TEE)<br>Etc.<br>Note that, when a TP indicates the above information, it has several ways to justify the truth of the information:<br>The TP may provide certain proofs about whether it has a certain capability. For example, the TP may send some example messages to TMF in order to demonstrate this TP could conduct integrity-protection or confidentiality protection on the messages.<br>The TP may also indicate one or more endorsers to make an endorsement to it. For example, the previous Tls that have worked with the TP could be potential endorsers.<br>TPPT-Ins could be recorded in the blockchain system, which is immutable. Therefore, the TP may declare that if anything listed above is a false statement, a certain penalty may be applied. |
| Other characteristics | Affiliated organization name, such as Organization-ABC.<br>Serving mobile operator name, such as Verizon,<br>Device manufacture name, such as Samsung.<br>Etc. |
| Supported GOT list | GOT-1 operations (communication-related)<br>GOT-2 operations (computing-related) |
| Supported GOT sub type list | GOT-1 sub type operations: such as 3GPP D2D communication.<br>GOT-2 sub type operations: The TP has AI specific capabilities and can run generative AI models such as Google Gemini Nano-1 (containing 1.8 billion parameters).<br>Part 2: Available Runtime Data Describing Task Execution<br>(Part 2 of TPPT-Ins is filled by TP) |
| Runtime Data that Can Be Collected from TP Itself | The TP (indicated in the "TP identifier" parameter) may be able to provide two sets of information for each supported GOT operation: one set is general status information and the other set is task-specific information.<br>The TP is willing to provide the following information (as examples):<br>Communication-related:<br>General Status information:<br>Current connectivity status<br>Current cellular signal strength<br>Current serving base station<br>Current total uplink bandwidth resources allocated to the TP<br>Current total uplink bandwidth consumed by the TP<br>Current total downlink bandwidth resources allocated to the TP<br>Current total downlink bandwidth consumed by the TP<br>Etc.<br>Task-specific information (assuming the TP is currently executing GOT-1 operations required by a particular task, e.g., Task-1):<br>What communication interface is currently being used for executing Task-1<br>The current uplink data rates consumed by Task-1<br>The current downlink data rates consumed by Task-1<br>The total uploading data sizes in the last five minutes (that is related to Task-1)<br>The total downloading data sizes in the last five minutes (that is related to Task-1)<br>How many transmission requests related to Task-1 got accepted/rejected/delayed in the last five minutes.<br>Etc. |

TABLE 2-continued

Example of TPPT- Instance (TPPT-Ins)

| Item Name | Example of Description |
|---|---|
| | Computing-related: |
| | General Status information: |
| | Current CPU/memory capacity |
| | Current CPU/memory workload |
| | Current available storage |
| | Current installed software |
| | Current running status of the installed software |
| | Etc. |
| | Task-specific information (assuming this TP is currently executing the GOT-2 operations required by Task-1): |
| | CPU/memory resources allocated to Task-1 |
| | The average processing time cost for each computing request related to Task-1 |
| | How many computing requests related to Task-1 got accepted/rejected/delayed in the last five minutes. |
| | Etc. |
| | Sensing-related: |
| | General Status information: |
| | Current working status of sensors |
| | Task-specific information (assuming this TP is currently executing the GOT-3 operations required by Task-1): |
| | The sample rate of a particular sensor that is used for executing Task-1 |
| | The number of data samples generated by a particular sensor, which are used for executing Task-1 |
| | The average size of a data sample that is used for executing Task-1 |
| | Etc. |
| | Characteristic or context-related: |
| | Current location (indoor, outdoor, GPS coordinates, etc.) |
| | Planned routes or moving speed |
| | Latest work schedule |
| | Current environmental factors, such as temperature, humidity, light, etc. |
| | Current battery level |
| | Whether TP-1 is currently leveraging edge computing resources provided by a near-by edge node, etc. |
| | Etc. |
| Runtime Data That Can be Collected from Other Entities | The TP (indicated in the "TP identifier" parameter) is willing to share other runtime data with TMF, which can be provided not only by itself but also by other entities, such as the serving 5G gNB base station or various NFs in the core network. TMF may leverage existing 3GPP procedures to collect useful information for trust evaluation purposes. |
| | The below are some of the examples regarding what kinds of data can be collected from which NFs: |
| | Data Source 1: AMF |
| | Number of UEs in an area of interest (which is helpful to know UE's current context) |
| | UE CM/RM State |
| | Etc. |
| | Data Source 2: UDM |
| | Wireless subscriber information |
| | Etc. |
| | Data Source 3: SMF |
| | PDU Session status |
| | Etc. |
| | Data Source 4: GMLC |
| | Current location |
| | Etc. |
| | Data Source 5: UPF |
| | Current UL/DL data rate o |
| | Etc. |
| Runtime Data Collection Instructions | Below is an example of how to collect data from AMF: |
| | Data Source 1: AMF |
| | Instructions: Namf_EventExposure_Subscribe may be used to collect data from AMF. |
| | Etc. |

Information Elements Related to Trust Evaluation Pattern

A TEPT is used to define a specific TEP regarding how to evaluate the trust of a TP for performing a particular type of GOT operation defined by a task. An example of TEPT parameters is illustrated in Table 3.

Table 3: Example of Trust Evaluation Pattern Template (TEPT)

TABLE 3

Example of Trust Evaluation Pattern Template (TEPT)

| Item Name | Example of Description |
|---|---|
| | Part 0: Headers of TEPT (Created by TEPT Creator) |
| TEPT identifier | This is to indicate the identifier of this TEPT, e.g., TEPT-1 |
| TEPT creator | This is to indicate the creator of this TEPT. For example, the creator could be the identifier of TMF, e.g., TMF-1, or another entity such as a network operator or administrator. |
| TEPT version | This is to indicate the version of this TEPT, e.g., version 1.0. |
| Applicable GOT | This is to indicate this TEPT is applicable to which type of operations, such as GOT-2. In this case, it means that this TEPT can only be used to evaluate the trust of a TP for performing a task that involves GOT-2 operations. |
| Applicable GOT subtype | This is an optional parameter used for narrowing down the applicable scope of this TEPT. When this parameter is included in a TEPT, it indicates that this TEPT is only applicable to a specific sub type of GOT operations. For example, in case the "Applicable GOT" parameter is GOT-2, this parameter could further be set with the value of "image processing/analysis or other AI/ML-related operations". In this case, it means this TEPT can only be used to evaluate the trust of a TP for performing a task involving image processing/analysis operations. |
| TEPT Instance Identifier | This is to indicate the identifier of a TEPT instance that is to be generated. Note that, when a TI receives a TEPT, if this row is blank or if this row is not present, it means the TI needs to generate an identifier for the TEPT-Ins to be created, and such an identifier will be validated by TMF soon in order to make sure it is globally unique. However, if this row is not blank, it means TMF has pre-decided a globally-unique identifier for the TEPT-Ins to be created by the TI. In addition, after a TEPT-Ins is created, this identifier will appear in the header of the created TEPT-Ins. |
| | Part 1: Instructions Regarding How to Derive Various Trust Indicators |
| | Part 1 may need to handle both non-security-related trust indicators and security-related trust indicators. Non-security-related trust indicators (such as scalability, availability, robustness, etc.) may be obtained through calculation based on certain collected runtime data inputs. To handle non-security-related trust indicators, Part 1 has three objectives: Objective-1: Part 1 lists a number of trust indicators (e.g., which trust indicators the TI would like to take into consideration for its desired trust evaluation). Objective-2: For each trust indicator, Part 1 also describes how a given trust indicator can be determined (e.g., what data inputs need to be collected, what calculation algorithm shall be used, etc.). For a given trust indicator, the TI may fully adopt the standard solution listed in Part 1, which is recommended by TMF. Or, if the standard solution originally listed in Part 1 is not preferred by the TI, the TI could propose its own solution, which could override the original standard solution listed in Part 1. Objective-3: For each trust indicator desired by a TI, Part 1 also aims to collect customized parameter settings from the TI, e.g., the customized threshold values to be used in the trust indicator calculation algorithm. In comparison, security-related trust indicators may be obtained in a different way. For example, a TP may only need to declare certain statements or make some demonstrations about its security capabilities in its corresponding TPPT-Ins, such as authentication status, integrity protection capability, etc. While in a TEPT, for a given security-related trust indicator, Part 1 only indicates that in order to verify or validate a target TP reaches a certain level of score (e.g., high/middle/low) on a particular security-related trust indicator, what kinds of proof or declaration statements shall be identified/validated from the TPPT-Ins of this TP. Assuming the trust indicator A (denoted as TIDC_A) is a non-security-related trust indicator (e.g., A could refer to availability, scalability, agility, etc.), TIDC_A is usually derived based on runtime data collection. Therefore, the following guideline is defined, which instructs how TIDC_A can be calculated. |
| Focus of TIDC_A | This is to indicate what specific aspect is focused by TIDC_A. TIDC_A can refer to any non-security-related trust indicator, such as scalability, availability, robustness, etc. |
| Indication of whether TIDC_A should be considered. | This row is related to Objective-1. If TI selects this row, it means that the TI would like to consider TIDC_A for its desired trust evaluation. Note that, regarding how to configure the remaining information elements that are listed below and are related to TIDC_A, two cases are possible: For each of the remaining rows that are related to TIDC_A, one or more standard solution candidates (e.g., defined by TMF) could be listed. In this case, TI just needs to select the desired one based on its own needs. More than that, TI could make certain modifications if needed. For each of the remaining rows that are related to TIDC_A, TI discards all the standard solution candidates originally listed in this TEPT. Instead, TI will fill in its own personalized details, e.g., to override the existing contents in those rows. |

TABLE 3-continued

Example of Trust Evaluation Pattern Template (TEPT)

| Item Name | Example of Description |
|---|---|
| | The later rows related to TIDC__A are related to Objective-2. |
| Needed data inputs of TIDC__A | This is to indicate in order to calculate TIDC__A, what kinds of data shall be collected. For example, assuming TIDC__A = "availability", certain runtime data can be collected from TP-1 or other data sources. Those runtime data could reflect whether TP-1 can have good availability for performing specific GOT operations (as indicated in the "Applicable GOT" parameter of this TEPT).<br>Overall, the needed data inputs used for evaluating the trust indicator TIDC__A may be any type of data. For example, a needed data input could be any available data listed in the "Runtime Data that Can Be Collected from TP Itself" or "Runtime Data That Can be Collected from Other Entities" parameters of a TPPT-Ins (defined in Table 2).<br>The difference which that here, the TEPT aims to list the data sources that are "required" for calculating a particular trust indicator (e.g., TIDC__A) about a TP. In comparison, the TPPT-Ins defined in Table 2 aims to list the "available" data about a TP that can be collected for trust evaluation. |
| Applied calculation algorithms/methods of TIDC__A | This is to indicate once the needed data inputs are collected, how to use them for calculating TIDC__A. In other words, This parameter is to show the mathematical definition of how to evaluate and calculate the value of TIDC__A based on one or more data inputs listed in the "Needed data inputs of TIDC__A" parameter. TIDC__A could be a numerical value, such as (0-100), or a rank-based value, such as low/middle/high.<br>For example, when TIDC__A represents the availability of a TP for performing GOT-2 operations, the availability of the TP can be calculated by analyzing data inputs describing how many requests got accepted or rejected by the TP in the last hour.<br>TI may indicate a list of preferred algorithms in a priority order so that TMF may choose one to adopt. Also, TI may indicate where to download the algorithm(s) in case TMF currently does not have a specific algorithm but wants to download and use it. |
| Parameter value settings for TIDC__A | This row is related to Objective-3. Even if different TIs adopt the same standard calculation algorithm for calculating TIDC__A (recommended by TMF), different TIs may still have variant opinions on parameter settings, such as thresholds adopted in those algorithms.<br>Still taking the same example, when TIDC__A represents the availability of a TP for performing GOT-2 operations, the availability of the TP can be calculated by analyzing data inputs describing how many requests got accepted or rejected by the TP in the last hour. In this example, a TI may feel if 85% (as a popular threshold value proposed by TMF) of requests associated with task got accepted by the TMF immediately, then the TP is regarded as having a "high" availability for performing GOT-2 operations. In comparison, another TI may would like to set this threshold value to 90%.<br>The priority of the request may be considered when calculating the value of TIDC__A. The reason is that requests associated with the same task may have different priorities, e.g., some requests may have higher priorities (e.g., time-critical or mission-critical requests) or some of requests to be processed are sent from a critical or VIP entity. Accordingly, a request having a higher priority (assuming a priority indicator can be included in the request) may have a larger impact/weight when calculating TIDC__A than a medium/low-priority request. |
| Assuming the trust indictor B (denoted as TIDC__B) is a security-related trust indicator (e.g., B could refer to security, privacy, integrity, etc.), TIDC__B is usually derived based on certain proof or declaration. | |
| Focus of TIDC__B | This is to indicate what specific aspect is focused by TIDC__B. TIDC__B can refer to a security-related trust indicator, such as authentication, integrity, etc. |
| Indication of whether TIDC__B should be considered. | If TI selects this row, it means that the TI would like to consider TIDC__B for its desired trust evaluation. |
| Required proofs or declarations for evaluating TIDC__B | This is to indicate what kinds of proofs and declarations shall be identified/validated in order to demonstrate a TP reaches a certain level of score (e.g., high/middle/low) on TIDC__B.<br>For example, for a given targeted TP, one or more proof or declarations can be identified from the corresponding TPPT-Ins of the TP:<br>Declaration-1: The TP has already been authenticated by its serving wireless network operator.<br>Declaration-2: The TP has also been authenticated by its affiliation organization, e.g., via Microsoft authentication service.<br>Note that, the TPPT-Ins of the TP may contain additional information regarding the proof of the truth of those declarations (See the "Security-related capabilities" parameter in the TPPT-Ins). In addition, this item may further define some criteria, e.g., If only declaration-1 can be identified from TP's TPPT-Ins, then TP's score or rank on authentication is considered as "medium". If both Declaration-1 and Declaration-2 can be identified, then TP's score on authentication is considered as "high".<br>    For each non-security Trust Indicator C (e.g., Scalability) . . .<br>        (Similar instructions will be defined as Trust Indicator A)<br>    For each non-security Trust Indicator D (e.g., Residency) . . .<br>        (Similar instructions will be defined as Trust Indicator A)<br>                . . . |

TABLE 3-continued

Example of Trust Evaluation Pattern Template (TEPT)

| Item Name | Example of Description |
|---|---|
| Part 2: Instructions Regarding How to Derive Trust Index | |
| Applied calculation algorithms of Trust Index (TIndex) | This is to indicate once the trust indicators are calculated, how those trust indicators can be aggregated to generate a trust index. For example, one popular approach is to use the weighted average algorithm, in which each trust indicator may take a certain weight.<br>TI may indicate a list of preferred algorithms in a priority order so that TMF may choose one to adopt. Also, TI may indicate where to download the algorithm(s) in case TMF currently does not have a specific algorithm but wants to download and use it. |
| Parameter value settings for TIndex | This is to indicate how to set values for certain parameters in the calculation algorithm of TIndex.<br>For example, it is assumed weighted average algorithm is used to calculate the trust index of a TP. In this example, three trust indicators (TIDC_A, TIDC_B, and T_IDC_C) have been calculated. However, different TIs may have personalized opinions regarding how to set the weights of those indicators, e.g., some TIs may tend to assign more weights to TIDC_A while other users may tend to assign more weights to TIDC_B or TIDC_C. |

TEPT Instance (TEPT-Ins)

Once receiving a TEPT from TMF, a TI may review and fill in the TEPT to specify its own preference regarding how trust shall be evaluated, and a TEPT Instance (TEPT-Ins) is created by the TI. A TEPT-Ins represents a particular TEP desired by the TI, which specifies e.g., what specific trust indicators may be focused by the TI (e.g., trust indicators that are important to TI-1), what kinds of data may be needed for evaluating those trust indicators and the overall trust index, etc. The TEPT-Ins may be sent to TMF and TMF may follow the guidelines described in TEPT-Ins in order to conduct the trust evaluation for the TI.

An example of TEPT-Ins is illustrated in Table 4, which is created by a specific TI-1.

Table 4: Example of TEPT Instance (Created by TI-1)

TABLE 4

Example of TEPT Instance (Created by TI-1)

| Item Name | Example of Description |
|---|---|
| Part 0: Headers of TEPT-Ins | |
| TEPT-Ins identifier | TEPT-Ins-1 |
| TEPT-Ins creator | TI-1 |
| Identifier of the associated TEPT | TEPT-1 |
| Applicable GOT | GOT-2 (computing-related operations)<br>In other words, this TEPT-Ins can be used to evaluate the trust of a TP for performing a task when the task involves GOT-2 operations. |
| Applicable GOT subtype | Blank. |
| Part 1: Instructions Regarding How to Derive Various Trust Indicators | |
| A summary of trust indicators focused by this TEPT-Ins (e.g., selected by TI-1) | This is to indicate what specific trust indicators are focused by this TEPT-Ins, which is based on TI's selection. In other words, it is possible that the original TEPT may include ten trust indicators for a TI to select. However, a TI may only want to consider four trust indicators during the trust evaluation, such as:<br>TIDC_A = Availability<br>TIDC_B = Security<br>TIDC_C = Scalability<br>TIDC_D = Reliability<br>For a Trust Indicator A (denoted as TIDC_A), the following evaluation solution is defined: |
| Focus of TIDC_A | E.g., Availability |
| Indication of whether TIDC_A should be considered. | Checked.<br>It means that the trust indicator TIDC_A is considered in this trust evaluation pattern. |
| Needed data inputs of TIDC_A | The creator of this TEPT-Ins (e.g., TI-1) indicates that the standard solution included in the same row of the corresponding TEPT-1 (which was recommended by TMF) can be re-used.<br>For example, assuming TIDC_A is to evaluate the availability of a TP for performing GOT-2 operations, a standard solution recommended by TMF is that TIDC_A can be measured based on, among all GOT-2 requests allocated to the TP for processing, how many requests got accepted by the TP immediately, and how many got rejected or no response in the last hour. |
| Applied calculation algorithms of TIDC_A | The creator of this TEPT-Ins indicates that the standard solution included in same row of the corresponding TEPT (e.g., TEPT-1 as indicated in the "Identifier of the associated TEPT" parameter) can be re-used. |

TABLE 4-continued

Example of TEPT Instance (Created by TI-1)

| Item Name | Example of Description |
|---|---|
| Parameter value settings for TIDC_A | The creator of this TEPT-Ins indicates that it wants to propose a customized solution for this row.<br>Still using the previous example (e.g., TIDC_A refers to availability), The creator of this TEPT-Ins may set the values for the following two thresholds (which are two standard parameters used in the calculation algorithm of TIDC_A):<br>The threshold for high-availability = 75: It means that for a given task adopting this TEPI-Ins, if 75% of requests associated with the task got accepted and processed by a TP immediately, then it can be regarded that this TP has a "high" availability for performing the task, i.e., the GOT-2 operations required by the task (as indicated in the "Applicable GOT" parameter).<br>The threshold for medium-availability = 50: If 50-75% of requests associated with the task got accepted and processed by a TP immediately, then it can be regarded that this TP has a "medium" availability for performing the task, i.e., GOT-2 operations required by the task.<br>Otherwise, If less than 50% of requests associated with the task got accepted by a TP immediately, then it can be regarded that this TP has a "low" availability for performing the task.<br>Also, request priority may also be taken into account when calculating the value of TIDC_A, e.g., a request having a higher priority (assuming a priority indicator can be included in the request) may have a larger impact/weight when calculating TIDC_A than a medium/low-priority request.<br>For Trust Indicator B, Trust Indicator C, Trust Indicator D, the similar information is included (similar to Trust Indicator A) |
| ... <br> ... | ... <br> ... |
| Part 2: Instructions Regarding How to Derive Trust Index | |
| Applied calculation algorithms of TIndex | The creator of this TEPT-Ins indicates that the standard solution included in the same row of the corresponding TEPT (e.g., TEPT-1 as indicated in the "Identifier of the associated TEPT" parameter) can be re-used, e.g., weighted average algorithm will be adopted. |
| Parameter value settings for TIndex | Assuming that the weighted average algorithm is used for integrating all the trust indicators for calculating TIndex, the weights of different trust indicators shall be decided.<br>In this example, it is assumed that the creator of this TEPT-Ins has its own parameter setting for the weights, which are listed below:<br>TIDC_A (Availability) weight = 0.4<br>TIDC_B (Security) weight = 0.4<br>TIDC_C (Scalability) weight = 0.1<br>TIDC_D (Reliability) weight = 0.1 |

Information Elements Related to Trust Evaluation Result

Trust Evaluation Result Record (TERR)

When a task is being executed by a TP, the practical trust of the TP may be evaluated by TMF (during the PostTA trust evaluation). The output of the trust evaluation is a Trust Evaluation Result Record (TERR), which contains the latest trust index of the TP and other useful information regarding how this trust index was produced. An example of TERR is illustrated in Table 5. TERR may be recorded in a blockchain system or maintained by TMF.

Table 5: Example of Trust Evaluation Result Record (TERR)

TABLE 5

Example of Trust Evaluation Result Record (TERR)

| Item Name | Example of Description |
|---|---|
| TERR identifier | This is to indicate the identifier of this TERR. |
| TERR creator | This is to indicate the creator of this TERR, which is also the executor of the corresponding trust evaluation job. For example, the creator could be a TMF, e.g., TMF-1. In other words, TMF-1 is responsible for conducting the trust evaluation job and yields a TERR. |
| The identifier of involved TP | This is to indicate this TERR is related to which TP, e.g., TP-1 (as the involved TP). |
| The identifier of associated TPPT-Ins. | This is to indicate the identifier of the associated TPPT-Ins. |
| The identifier of associated TEPT-Ins. | This is to indicate the identifier of the associated TEPT-Ins. |
| Involved GOT | This is to indicate this TERR is related to which type of GOT operations, such as GOT-2, meaning that the trust index included in this TERR is to describe the trust of a TP (e.g., TP-1) for performing GOT-2 operations. |

TABLE 5-continued

Example of Trust Evaluation Result Record (TERR)

| Item Name | Example of Description |
| --- | --- |
| Involved GOT sub-type | This is to give more detailed information regarding what the specific operation is involved. For example, if the involved GOT is GOT-1 (communication-related), the GOT sub-type operation may refer to a D2D communication. Another example, if the involved GOT is GOT-2 (computing-related), the GOT sub-type operation may refer to image analysis/processing. |
| The identifier of the associated task | This is to indicate this TERR is to describe the trust of a TP (e.g., TP-1) when the TP is executing which task (e.g., Task-1). |
| TERR creation time | This is to indicate when this TERR was created. This information also indicates the freshness of the trust evaluation result contained in this TERR. |
| The resource requirement for performing the associated task (required by the corresponding TI) | This is to indicate how many resources shall be allocated to Task-1 (the associated task of this TERR) in order to guarantee a normal operation of Task-1. This parameter is to reflect the execution/processing complexity of Task-1. This information may be collected from the corresponding TI (e.g., TI-1) of the involved TP (e.g., TP-1). If involved GOT is GOT-1 (e.g., communication-related), the resources may refer to communication-related resources (such as needed uplink/downlink bandwidth). If involved GOT is GOT-2 (e.g., computing-related), the resources may refer to computing-related resources (such as needed CPU/memory resources). If involved GOT is GOT-3 (e.g., sensing-related), the resources may refer to sensing-related resources (such as needed wake time or on-duty time for sensors). |
| The actual amount of resource being allocated (collected from the corresponding TP) | This is to indicate how many resources were actually allocated to Task-1 (the associated task of this TERR) by the involved TP (e.g., TP-1). This information may be collected from the involved TP of this TERR (e.g., TP-1) by TMF. |
| The potential workload of the associated task (specified by the corresponding TI) | This is to indicate the potential workload of Task-1. This information may be collected from the corresponding TI (e.g., TI-1) of the involved TP (e.g., TP-1). For example, when TP-1 is performing the Task-1 (the associated task of this TERR), multiple requests may need to be processed. One of approaches to model the workload of Task-1 is to measure the amounts/size of requests that have been received by TP-1 and need to be processed by executing Task-1. |
| The actual workload of the associated task (collected from the corresponding TP) | This is to indicate the actual workload of Task-1. This information may be collected from the involved TP of this TERR (e.g., TP-1) by TMF. |
| The current task execution context | This is to indicate the current task execution context when this TERR was created. For example, this parameter may refer to two task execution contexts: 1) The current capacity of TP-1 (e.g., the associated TP of this TERR) for performing the involved GOT operations (as indicated in the "Involved GOT" parameter); and 2) The current workload of TP-1 for performing the involved GOT operations. If the involved GOT is GOT-1 (e.g., communication-related), this parameter may indicate e.g., the current total uplink/downlink bandwidth/capacity allocated to TP-1 (e.g., by the serving base station) and the current uplink/downlink bandwidth that were already consumed by TP-1 (e.g., workload). Note that, both of the two execution contexts may be dynamically changing. On one hand, the bandwidth capacity of TP-1 may change over time since the serving base station may dynamically allocate different amounts of bandwidth to TP-1 depending on whether the serving cell is busy or not. On the other hand, the communication workload of TP-1 may also change over time since TP-1 may execute multiple communication-related tasks at the same time. If involved GOT is GOT-2 (e.g., computing-related), this parameter may indicate e.g., the current total CPU/memory resource capacity of TP-1 (which may also change depending on e.g., whether TP-1 may leverage a near-by edge computing server) and the current CPU/memory resources already consumed by TP-1(e.g., workload). |
| Data collection time cost | This is to indicate in order to calculate this TERR, how much time TMF has taken to collect the needed data inputs. |
| Data collection size | This is to indicate the size of the input data collected for calculating this TERR. This reflects the trust evaluation overhead. |
| Data input storing location | This is to indicate where the collected data required for trust evaluation is stored (e.g., held by TMF or stored in an offline storage, etc.) or has already been deleted after creating this TERR. If the collected data has not been deleted, those data may be further leveraged by TMF to conduct big-data analysis or data mining. |

TABLE 5-continued

Example of Trust Evaluation Result Record (TERR)

| Item Name | Example of Description |
|---|---|
| Results of trust indicators | The final trust evaluation result, e.g., the trust index, is often calculated by aggregating multiple trust indicators. This item stores intermediate calculation results, e.g., the result of each trust indicator. |
| Final trust evaluation result | This stores the final trust evaluation result, e.g., the latest trust index of a TP. |

An example of TERR is illustrated in Table 6.
Table 6: Example of TERR

TABLE 6

Example of TERR

| Item Name | Example of Description |
|---|---|
| TERR identifier | TERR-1 |
| TERR creator | TMF-1 |
| The identifier of involved TP | TP-1 |
| The identifier of associated TPPT-Ins. | TPPT-Ins-1 |
| The identifier of associated TEPT-Ins. | TEPT-Ins-1 |
| Involved GOT | GOT-1 |
| Involved GOT sub-type | Uploading data to a serving gNB |
| The identifier of the associated Task | Task-1 |
| TERR creation time | 8/19/2023 14:00:00 |
| The resource requirement for performing the associated task (required by the corresponding TI) | Basic uplink bandwidth requirement for performing Task-1: 10 Mbps<br>Basic downlink bandwidth requirement for performing Task-1: 30 Mbps |
| The actual amount of resource being allocated (collected from the corresponding TP) | Actual allocated uplink bandwidth for performing Task-1: 9 Mbps<br>Actual allocated downlink bandwidth for performing Task-1: 26 Mbps |
| The potential workload of the associated task (specified by the corresponding TI) | The corresponding TI (e.g., TI-1) of the involved TP (e.g., TP-1) may indicate the potential workload of Task-1, e.g., how many requests associated with Task-1 need to be processed by TP-1 during e.g., one hour, and in each of time internal (e.g., every ten minutes), how much requests are expected to be received and processed by TP-1. In particular, the processing of those requests is the actual execution of Task-1.<br>As an example, the following information may be indicated:<br>The total time duration of Task-1. This is to indicate the execution time length of Task-1, e.g., TP-1 needs to execute Task-1 for one hour, or until receiving a task termination command.<br>An estimated workload schedule. For example, assuming Task-1 is to be executed for one hour, TI-1 may indicate for each 20-minute time interval, how many requests are expected to be received by TP-1 for processing:<br>The first 20-min: 20 requests to be received/processed in maximum, the average data size to be processed in each request is 3 MB (the maximum data size of the request will not exceed 10 MB).<br>The second 20-min: 60 requests to be received/processed in maximum, the average data size to be processed in each request is 5 MB (the maximum data size of the request will not exceed 7 MB).<br>The third 20-min: 10 requests to be received/processed, the average data size to be processed in each request is 1 MB.<br>Etc. |
| The actual workload of the associated task (collected from the corresponding TP) | Using the same example, the actual workload of Task-1 is as follows:<br>The total time duration of Task-1 is 60 min.<br><br>An actual workload schedule:<br>The first 20-min: 14 requests have been received/processed, and the average data size in each request is 2 MB.<br>The second 20-min: 53 requests have been received/processed, and the average data size in each request is 7 MB.<br>The third 20-min: 12 requests have been received/processed, and the average data size to be processed in each request is 1 MB.<br>Etc. |

TABLE 6-continued

Example of TERR

| Item Name | Example of Description |
|---|---|
| The current task execution environment | Total current uplink bandwidth capacity of TP-1: 100 Mbps<br>Total current uplink bandwidth consumed by TP-1: 40 Mbps<br>Total current uplink bandwidth consumed by Task-1: 10 Mbps<br>Total current downlink bandwidth capacity of TP-1: 300 Mbps<br>Total current/used downlink bandwidth consumed by TP-1: 100 Mbps<br>Total current downlink bandwidth consumed by Task-1: 28 Mbps |
| Data collection time cost | 20 seconds |
| Data collection size | 5 MB |
| Data input storing location | Maintained by TMF-1 |
| Results of trust indicators | It is assumed that TEPT-Ins-1 is used to evaluate whether a TP-1 can be trusted for performing GOT-1 operations by considering three trust indicators, such as agility/scalability/reliability.<br>The results of those three trust indicators and their corresponding weights are:<br>Agility = 60 (0-100 scale), weight = 0.33<br>Scalability = 75 (0-100 scale), weight = 0.33<br>Reliability = 90 (0-100 scale), weight = 0.33 |
| Final trust evaluation result | Trust index = 75 or medium (according to the trust index calculation algorithm as defined in TEPT-Ins-1, which aggregated three trust indicators) |

Terr Rank Record (TerrRR)

A TERRRR contains an accuracy rank of a TERR. During PreTA trust evaluation, a TI may ask TMF for help to estimate a TP's trust by analyzing historical TERRs for the TP. However, it is possible that over time, the trust index included in historical TERRs may not be always accurate since the trust may be dynamically changing. Accordingly, a TERR accuracy ranking mechanism is needed so that inaccurate historical TERRs may be avoided by TMF for future PreTA trust evaluations. An example of TERR accuracy ranking is described as follows (e.g., the solutions do not limit to a specific type of a TERR accuracy ranking mechanism and any TERR accuracy ranking mechanism may be adopted): it is assumed that a TI decides to assign a task to a TP since TMF estimated that the TP has a good trust expectation for performing the task based on historical TERRs (e.g., TERR-1 is one of them). Accordingly, when the TP is performing the task, TMF may conduct a PostTA trust evaluation on this TP and produce new TERRs periodically (e.g., TERR-2 is one of them), which describe the actual trust of the TP over time. TMF may compare the difference between the two trust indexes included in old historical TERRs (e.g., TERR-1) and TERR-2 to see whether the trust indexes are aligned or not. If they are aligned, it may mean that the historical TERR-1 did provide accurate reference values during the previous PreTA trust evaluation, which enabled the TI to decide to assign the task to the TP for execution. Otherwise, if the trust index included in TERR-1 has a significantly difference compared to that included in TERR-2, it may indicate that TERR-1 have already lost its reference value since the TP's trust may change dynamically. As a result, TERR-1 should not be leveraged by TMF for future PreTA trust estimations. Overall, TMF may create a TERR Rank Record (TERRRR) to report its rank on the accuracy/freshness/usefulness of a TERR.

An example of TERRRR parameters is illustrated in Table 7.

Table 7: Example of TERR Rank Record (TERRRR)

TABLE 7

Example of TERR Rank Record (TERRRR)

| Item Name | Example of Description |
|---|---|
| TERRRR identifier | This is to indicate the identifier of this TERRRR, e.g., TERRRR-1. |
| The identifier of associated TERR | This is to indicate the identifier of the associated TERR, e.g., TERR-1, e.g., the rank included in this TERRRR is related to the trust index contained in which TERR. |
| Final trust evaluation result included in the associated TERR | This stores the final trust evaluation result, e.g., a trust index contained in the associated TERR |
| TERRRR creator | This is to indicate the creator of this TERRRR, such as TMF-1. |
| The identifier of involved TP | This is to indicate this TERRRR is related to which TP, e.g., TP-1. |
| TERRRR creation time | This is to indicate when this TERRRR was created. |
| Reported score/rank | This is to show the score or rank on the accuracy of the trust index contained in the associated TERR. It could be defined as a low/medium/high accuracy/freshness level or defined as a confidence level (scale 0-1). |

An example of TERRRR is illustrated in Table 8.

Table 8: An Example of TERRRR

TABLE 8

An Example of TERRRR

| Item Name | Explanation |
|---|---|
| TERRRR identifier | TERRRR-1. |
| The identifier of associated TERR | TERR-1. |
| Final trust evaluation result included in the associated TERR | Trust index = 75 or medium |

TABLE 8-continued

An Example of TERRRR

| Item Name | Explanation |
|---|---|
| TERRRR creator | TMF-1 |
| The identifier of involved TP | TP-1. |
| TERRRR creation time | 8/28/17:30 2023 |
| Reported score/rank | "High accuracy" or confidence level: 0.85 (0-1 scale). In this example, the trust index = 75 contained in TERR-1 has a high accuracy (ranked by TMF-1). |

TP Registration to TMF

An entity, such as a UE, may intend to act as a TP and would like to let a TMF conduct trust evaluation or any other trust management on it, this entity (as a registering TP) may register to the TMF by indicating useful information about itself, such as its capability information, what type(s) of GOT operations it may perform, and what kinds of runtime data about itself may be collected (which reflects how this entity may perform a task), etc. Knowing this information enables the TMF to conduct trust evaluation or other trust management on this TP.

Figure 9:
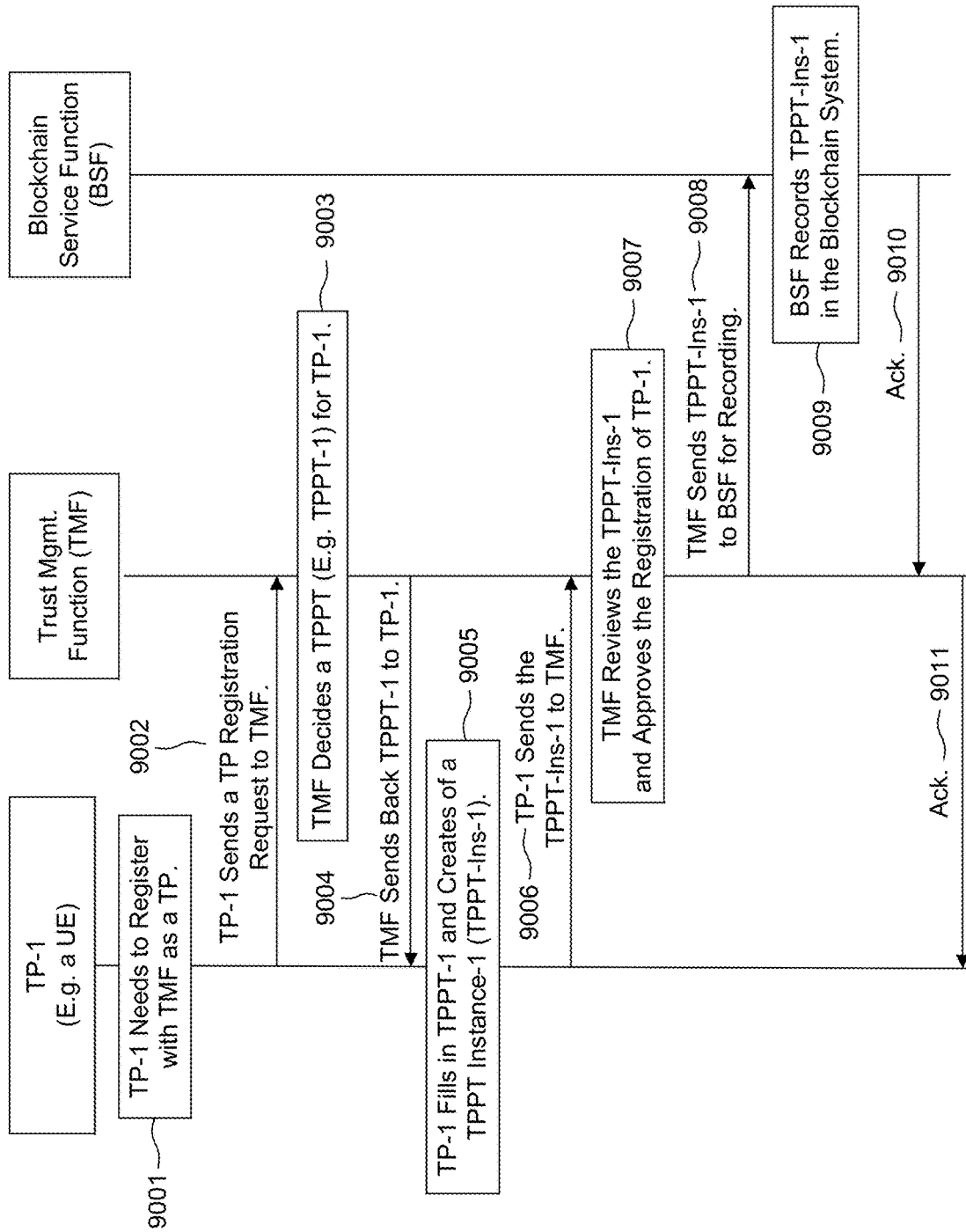
FIG. 9 illustrates an example of a call flow of a TP registration to TMF.

FIG. 9 illustrates an example of a call flow of a TP registration to TMF.

TP-1 may register with a TMF as a TP 9001. For example, the network operator or a task assignment function, or a task orchestrator may indicate to TP-1 that in order to participate in distributed tasks, its trust shall be evaluated and managed by a TMF.

TP-1 may send a TP registration request to TMF 9002. In this request, TP-1 may indicate its willingness to act as a TP and would like the TMF to manage its trust for performing certain tasks. Example of parameters included in this step are: an identifier of TP-1; an indication of its willingness to act as a TP; a location of TP-1, such as its current GPS location, residing area; a planned mobility path; an identifier of a desired TPPT.

During the TP registration, TP-1 may need to fill in a TPPT in order to provide useful information about itself to TMF so that TMF may conduct trust evaluation or management on TP-1. If TP-1 knows which TPPT it may fill in, it may indicate such an identifier to TMF so that TMF may return the desired TPPT (such as TPPT-1) to TP-1 during step 4. However, if this parameter is not present in this request, it may mean that TMF may select an appropriate TPPT for TP-1.

TMF may check whether TP-1 is authorized to use services provided by TMF. For example, in the 3GPP system, TMF may check the subscription data of TP-1 (by contacting UDM) in order to make sure TP-1 may use TMF. If TP-1 is allowed to use TMF, TMF may select a TPPT (e.g., TPPT-1) for TP-1 9003. For example, TPPT-1 may be pre-configured with TMF by the network operator or administrator.

TMF may send TPPT-1 to TP-1 9004. In particular, it is worth noting that a given TPPT may contain specific parameters since not all of the parameters defined in Table 1 may be mandatory. As an alternative implementation choice, the parameters defined in Table 1 may be sent as a list of individual parameters in this step. For example, mandatory parameters defined in Table 1 and one or more optional parameters may be contained in the request sent to TP-1 during this step.

TP-1 may fill in TPPT-1 9005. Overall, TPPT-1 aims to collect useful information from TP-1, such as what kinds of GOT operations TP-1 may support, and what kinds of data may be collected for evaluating the trust of TP-1. For example, TP-1 may indicate that it may support more than one type of GOT operation (as described in the "Applicable GOT" parameter in Table 1). Once TP-1 may fill in the TPPT-1, the filled TPPT-1 becomes a TPPT-Ins (denoted as TPPT-Ins-1). The identifier of TPPT-Ins-1 may be decided using any of the following approaches:

When TMF sent TPPT-1 to TP-1 9004, it may have pre-filled a globally-unique TPPT-Ins identifier in TPPT-1, which was decided by TMF 9003. In this case, TP-1 may use it as the identifier of the TPPT-Ins-1 to be created.

TP-1 may create an identifier for TPPT-Ins-1 by itself. TP-1 may choose not to set a TPPT-Ins identifier during this step and rely on TMF to decide a globally-unique identifier to the TPPT-Ins-1.

TP-1 may send TPPT-Ins-1 to TMF 9006. In particular, it is worth noting that a given TPPT-Ins may contain specific parameters since not all of the parameters defined in Table 2 may be mandatory. In addition to that, one or more optional parameters defined in Table 2 may also be included in TPPT-Ins-1. As an alternative implementation choice, the parameters defined in Table 2 may be sent as a list of individual parameters in this step. For example, mandatory parameters and one or more optional parameters defined in Table 2 may be contained in the request sent to TMF during this step.

TMF reviews TPPT-Ins-1 and may check the related policy rules 9007 to decide whether TP-1 is eligible as a TP or whether data needed for trust evaluation may be collected. For example, a policy may indicate that certain types of data must be collected from TP-1, otherwise its trust cannot be evaluated. TMF may find that such data is not available in TPPT-Ins-1, TMF may not be able to evaluate and manage the trust of TP-1 (If so, TMF may send an unsuccessful registration response to TP-1 during step 10). In comparison, if TPPT-1 meets all the related policies and rules, TMF may approve the registration of TP-1. In addition, If TP-1 created an identifier for TPPT-Ins-1 by itself, during this step, TMF may need to determine whether such an identifier is globally unique or not. If not, TMF may modify the identifier to make it globally unique. If TP-1 did not create an identifier for TPPT-Ins-1, TMF may assign a globally unique identifier to TPPT-Ins-1 during this step.

TMF may send TPPT-Ins-1 to BSF for recording 9008. BSF is the service portal for entities (such as TMF/TIs/TPs) to interact with underlying blockchain systems. Typically, if TMF has the knowledge about the underlying blockchain system(s) to be used, it may indicate to BSF about the name of the blockchain system (and/or the name of the chain) to be used. In case TMF has certain blockchain capabilities, TMF may even generate blockchain transactions by itself (which may include TPPT-Ins or other information elements described). Then, the transactions may be sent to BSF for recording. The BSF may be a full and mining node in the underlying blockchain system, and may execute certain consensus protocols for recording those transactions on the desired chain. Alternatively, it is also possible that TMF may not have any blockchain capability. As such, TMF may send the original information element(s) (such as TPPT-Ins-1) to the BSF. BSF may further transform information elements into blockchain transactions on behalf of TMF and store them in the underlying blockchain system.

BSF records TPPT-Ins-1 in the blockchain system as a blockchain transaction 9009. Optionally, the TPPT-Ins-1 (or any other information elements described) may also be locally maintained by TMF, in which case the BSF may not be involved.

BSF may send an acknowledgement to TMF by indicating that TPPT-Ins-1 has already been recorded 9010. TMF may send an acknowledgement to TP-1 by indicating that TP-1 has successfully registered with TMF 9011, including one or more of the following parameters: an indication that TP-1 has successfully registered with TMF; a globally-unique identifier of TPPT-Ins-1; a blockchain address of TPPT-Ins-1.

At a later time, it is possible that TP-1 may want to update its TPPT-Ins-1. If that is the case, the request included in step 6 may be re-used as a TPPT-Ins update request, in which a new version of TPPT-Ins-1 may be included (all steps after step 6 may be also re-used). Alternatively, TP-1 may indicate the identifier of TPPT-Ins-1 and only send the updated contents of TPPT-Ins-1 to TMF. In addition, another approach to TMF registration is that TP-1 may directly publish the filled TPPT-Ins-1 to the blockchain system via BSF. Then, TP-1 may indicate a link or a blockchain address of its TPPT-Ins-1 to TMF. TMF may check the contents of TPPT-Ins-1 stored in the blockchain system and decide whether to approve the registration of TP-1.

In one example, a TP may be implemented as a 3GPP UE (e.g., UE-1). TMF may be implemented as a new 3GPP network function in the core network, or its functionality may be added to an existing NF. BSF may be a new 3GPP network function in the core network, or its functionality may be added to an existing NF such as an UDR.

Figure 10:
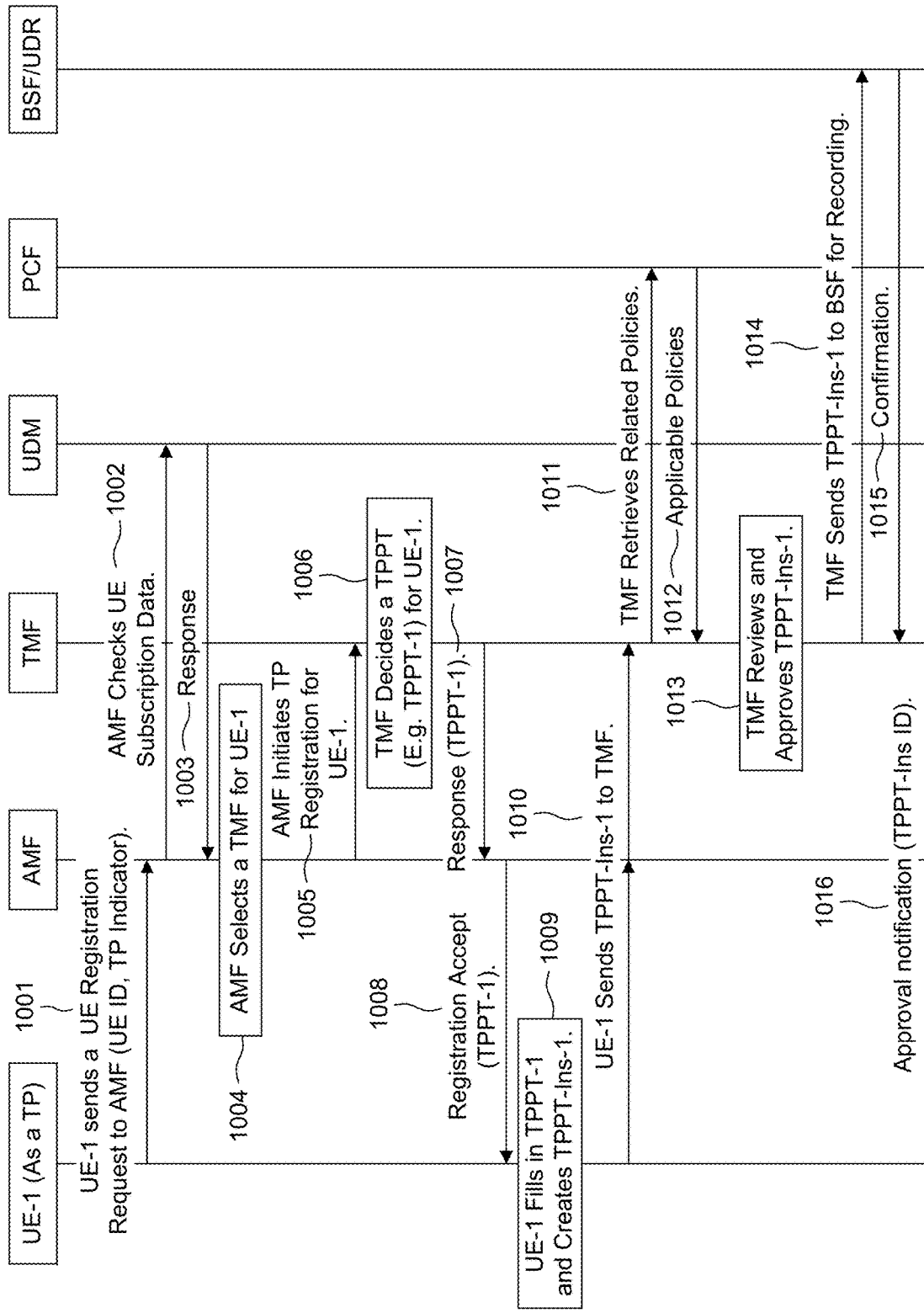
FIG. 10 illustrates an example of a call flow for a registration procedure when TMF is implemented as a core network function.

FIG. 10 illustrates an example of a call flow for a registration procedure when TMF is implemented as a core network function.

UE-1 may send a Registration Request message to its serving AMF 1001. In addition to existing parameters defined in the 3GPP UE registration request, new parameters may be included for TP registration with TMF, for example a TP indicator, which is an indication that UE-1 would like to act as a TP and would like TMF to manage its trust.

The AMF may receive the Registration Request message and may perform regular UE registration including primary authentication. If the primary authentication passes, AMF may send a request a UDM to check if the UE is allowed to use trust management services provided by TMF 1002. The AMF may send, to the UDM, all the parameters included in Registration Request message.

The UDM may check the UE-1's subscription data and may send a response to the AMF by indicating whether UE-1 is allowed to use the services provided by TMF 1003. If UE is not allowed to use TMF, the AMF may only complete the basic UE registration for UE-1 and may not register UE-1 with TMF.

The 3GPP system may have multiple TMFs in the system. For example, a TMF instance may be deployed on a UE, on a base station, or as an edge application server. Alternatively, TMF may also be implemented as a new NF in the core network. In this case, each TMF instance may register to a repository (e.g., NRF in 5GC). Each TMF may be assigned to serve trust management requests from different locations/areas/groups If UE-1 is allowed to use the services provided by TMF, the AMF may select an appropriate TMF instance for UE-1 1004. After selection, AMF may also store such information in UDM for future usage.

AMF may send a TP registration request to TMF on behalf of UE-1 1005. The parameters included in Registration Request message may be included in this request. TMF may decide a TPPT (e.g., TPPT-1) for UE-1 1006. TMF may send a response to AMF, in which the selected TPPT-1 is included 1007.

The AMF may send a Registration Accept message to UE-1 1008. In addition to containing existing registration-accept-related parameters, the Registration Accept message may contain TPPT-1 and the identifier of the selected TMF. The Registration Acceptance message indicates that UE-1 has successfully registered to the 3GPP network, but more processing may still be needed in order to set up registration with TMF for trust management.

UE-1 may fill in TPPT-1 and creates a TPPT-Ins-1 1009. UE-1 may send a request to TMF with the TPP-Ins-1 1010. This request may be sent as a NAS message and relayed by the AMF to the TMF. As an alternative, UE-1 may directly send the request to TMF (e.g., in a future wireless systems supporting direct UE service-based communication with Network Functions). Example of parameters sent may include one or more of: a TP ID, which may be a UE ID plus a TP Role ID (or a role indicator); a Role ID may indicate that UE-1 is acting as a TP; or a copy of TPPT-Ins-1.

TMF may send a request to PCF to retrieve TP registration related policies 1011. In this request, the TMF may include TP ID in the message. PCF may find TP registration policies applicable to UE-1, and then the policies may be returned to TMF 1012.

TMF may check whether TPPT-Ins-1 meets the corresponding requirements or is compliant with the policies/rules retrieved from PCF. If so, TMF may approve TPPT-Ins-1 1013. For example, a policy may be that a TP (such as UE-1) provides a minimum set of runtime data, which may be used by TMF for trust evaluation. Accordingly, if TMF finds that the available data listed in TPPT-Ins-1 does not satisfy minimum set of data required by the policy, TMF may not approve the TP registration of UE-1.

If TPPT-Ins-1 meets all the requirements and is approved by TMF, TMF may send a request to BSF for recording TPPT-Ins-11014. In this request, the following one or more of the following information may be included:

A blockchain system ID, which describes what underlying blockchain system shall be used. If blockchain system is not used, a general storage system or repository identifier may be indicated.

A chain ID, which describes which chain should be used to store TPPT-Ins-1. If blockchain system is not used, a general storage table/file identifier may be indicated.

A copy of TPPT-Ins-1. Alternatively, in case the original version of TPPT-Ins-1 is in a large size and may only be stored locally at TMF, a hash value of TPPT-Ins-1 may be included in this request, e.g., only the hash of TPPT-Ins-1 may be recorded in the blockchain system. The same approach also applies to other types of information elements.

BSF may create one or more blockchain transactions, in which TPPT-Ins-1 may be included. Then, those transactions may be stored on a blockchain desired by TMF. After that, BSF may send a confirmation to TMF by indicating that TPPT-Ins-1 has already been recorded 1015. TMF may further send a response to UE-1 by indicating that its TPPT-Ins-1 has been approved and TP registration with TMF is successful 1016. TMF may further indicate to UE-1 about the blockchain address of TPPT-Ins-1.

In the example in FIG. 10, UE-1 communicates with TMF via AMF. Alternatively, UE-1 may communicate with TMF (or other NFs) directly, i.e., not via AMF. For example, in case UE-1 is a Service-Based Architecture (SBA) UE, UE-1 may communicate with NFs (such as TMF) using its SBI interface.

In another example, the TMF may be embodied as a new Service Enabler Architecture Layer (SEAL) service. In particular, a TP may be implemented as a Vertical Application Layer (VAL) client hosted on a 3GPP UE (e.g., UE-1). Alternatively, a TP may be implemented as a Vertical Application Layer (VAL) server hosted on an entity/node on the network side.

The TMF may be realized using a client/server architecture, with the server deployed, for example, at the network edge. Each UE may host a TMF client which may interact with a TMF server on the network side. For example, a VAL client (as a TP) may rely on the TMF client hosted on the same UE in order to interact with the TMF server, which is the major entity to provide various trust management functions or features as described.

The BSF may be realized using a client/server architecture with the server deployed, for example, at the network edge. Each UE may host a BSF client (if needed) which may allow this UE to interact with a BSF server on the network side. For example, a VAL client (as a TP) may rely on the BSF client hosted on the same UE in order to interact with the BSF server, which is the major entity to provide various blockchain capabilities (such as submitting new transactions or access existing transactions to an underlying blockchain system). Alternatively, if the UE is not configured to have blockchain capability (e.g., BSF client may not be installed on the UE), the UE may rely on TMF to conduct all the blockchain interactions. For example, the TMF server may directly interact with the BSF server (as the example shown in FIG. 9).

Figure 11:
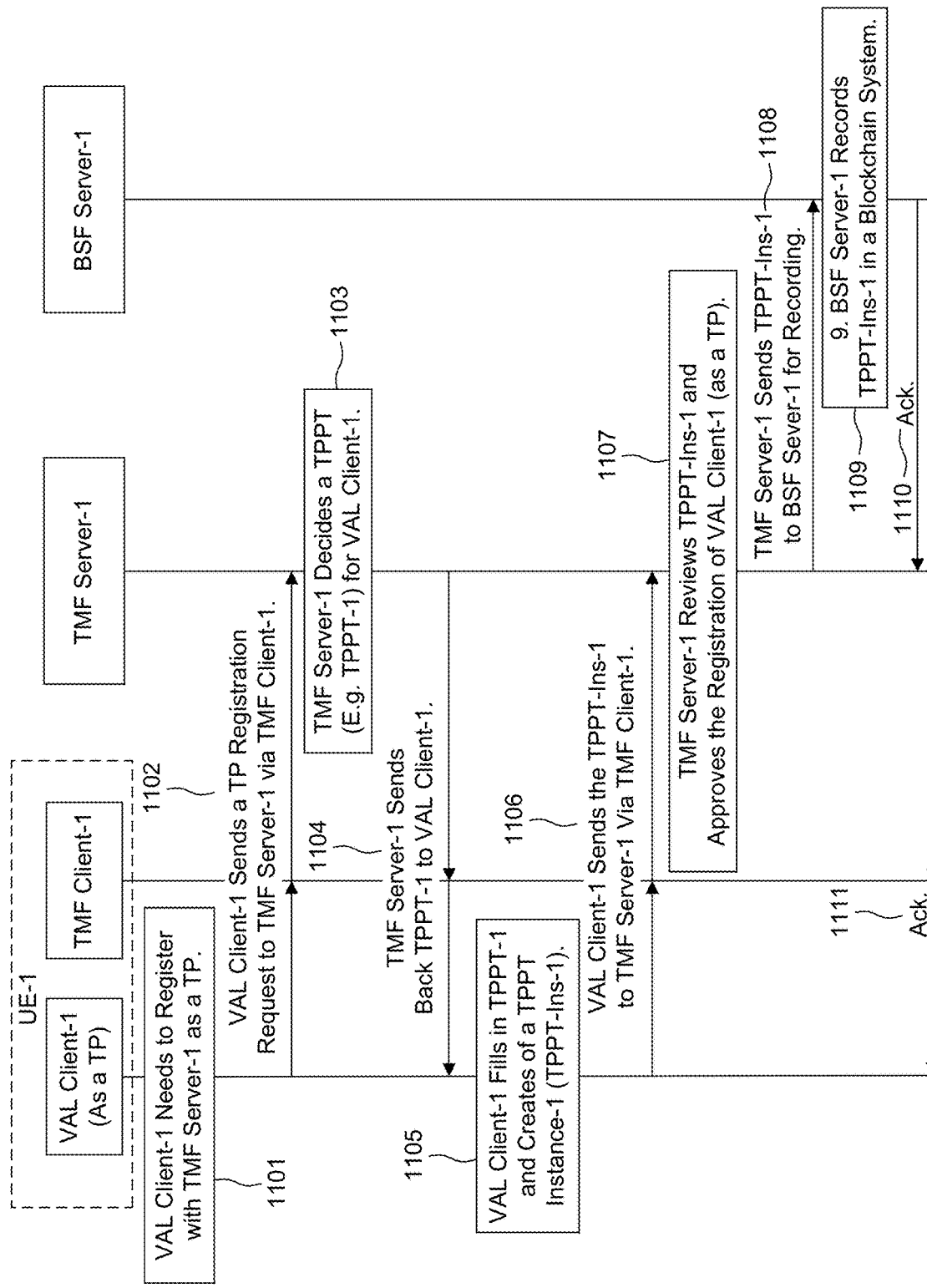
FIG. 11 illustrates an example of a call flow for a registration procedure when using a client/server architecture.

FIG. 11 illustrates an example of a call flow for a registration procedure when using a client/server architecture. All steps in FIG. 11, 1101 to 1111, are equivalent to the corresponding steps described in FIG. 9, 9001 to 9011.

ETSI Industry Specification Group (ISG) on Permissioned Distributed Ledger (PDL) describes PDL architecture, PDL services, and PDL for vertical domains such as telecom networks. ETSI PDL functions may be used in the 3GPP networks for provisioning PDL services. A Distributed Ledger Anchor Function (DLAF) may handle the control plane-related processing. For example, the DLAF may receive a request from a 3GPP entity (such as a UE or an NF, which may be regarded as a PDL service consumer) for PDL service provisioning. In order to serve the service provisioning request, a DLAF may identify or instantiate a Distributed Ledger Enabler (DLE) on a network node.

A Distributed Ledger Repository Function (DLRF) may also be defined in this architecture. The Distributed Ledger Enabler Function (DLEF) stores all the needed software/code/toolkit/libraries that may be needed for instantiating a DLE. For example, when DLAF may decide to instantiate a DLE on a given network node, DLAF may suggest the node to download the necessary software from the DLEF. DLE may be regarded as a data plane function. On one hand, DLE may receive and execute commands from DLAF and interfaces with PDL service consumers. On the other hand, DLE acts as a member node of one or more underlying DLT networks. For example, DLE may composite ledger/blockchain transactions/blocks and send them to other peer nodes in the DLT network. DLE may also operate a consensus protocol to participate consensus process. DLAF may monitor the status of deployed PDL services and conduct lifecycle management or maintenance on DLEs when needed.

Based on this ETSI architecture, a TP may be implemented using ETSI PDL, a TMF may be implemented as a DLAF, and a BSF may be implemented as a DLE. The TP may be implemented as a PDL request originator (e.g., PDL service consumer).

PreTA Trust Evaluation Using TMF

PreTA trust evaluation is used when a TI plans to assign a task to a candidate TP. Before task assignment, TI may initiate a PreTA trust evaluation and ask TMF to estimate the trust of the candidate TP for performing the task. Based on the estimated trust level of a TP, TI may decide on whether to assign the task to the selected TP for execution.

Three different scenarios are considered:

In Scenario-1, it is assumed that TI has identified a desired TP candidate using any existing approach. TI now may assign a task to the TP. However, before the TI assigns the task to the TP, the TI consults with TMF to conduct a PreTA trust evaluation to determine whether the TP may be sufficiently trusted to perform the task. The TI provides to the TMF its preferences and criteria on how the trust of a TP may be evaluated. The TMF may use the provided criteria.

Scenario-2 assumes that TI does not have its own preferences regarding how it wants to evaluate the trust of the TP and may want to leverage existing TEPs used by other entities, e.g., TMF or other TIs. In Scenario 2, when the TI may send a trust evaluation request to TMF, the TI may indicate a TEPT-Ins discovery is needed. In comparison, in Scenario 1, the TI needs to fill in a TEPT and create its own TEPT-Ins, which describes its specific needs regarding how the trust of a TP shall be evaluated.

In Scenario 3, TMF provides TP identification functionality for the TI. For a given TI, it may want to assign a task to a TP and the TI has not identified any desired TP yet. The TI asks the TMF for both TP identification and PreTA trust evaluation.

Scenario 1: TI Indicates a TP Candidate and a Preferred TEP

The general workflow of PreTA trust evaluation in Scenario-1 is that a TI may first obtain a TEPT from TMF when TI wants TMF to initiate PreTA trust evaluation. The TI may fill in the TEPT and creates corresponding TEPT-Ins using two forms (which may be not mutually exclusive): The TI may fill in certain parts of TEPT in order to provide information that is needed by TMF; or TMF may list candidate/standard TEP solutions in TEPT for TI to select, such as: trust indicators; algorithm(s) for calculating trust indicator or trust index, weights for different trust indicators, etc. By providing standard TEP solutions to TI(s) for selection, it saves TIs' effort to come up with their own TEP solutions. This is also beneficial for TEP sharing and re-use. If different TIs adopt different TEPs, the trust evaluation result on a TP (which was produced based on TI-1's desired TEP) may not have any meaningful reference value to another TI, e.g., TI-2 (who is desired to use a different TEP to evaluate the trust of the same TP). A TI may have freedom to come up with its own TEP solution and override the original solutions listed in a TEPT (which may be recommended by TMF).

Figure 12:
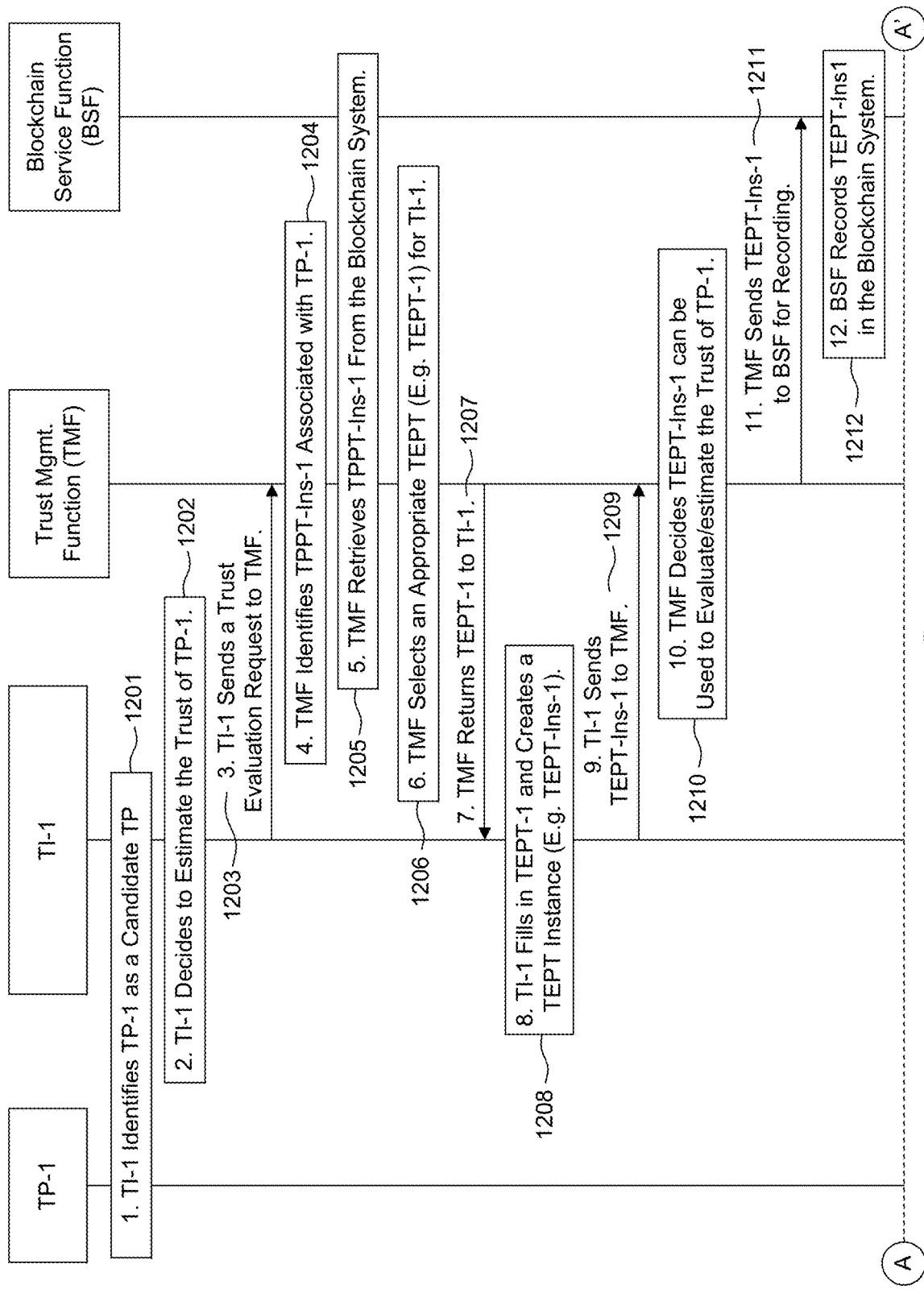
FIG. 12 illustrates an example of a call flow for a PreTA trust evaluation procedure for Scenario-1.
Figure 12:
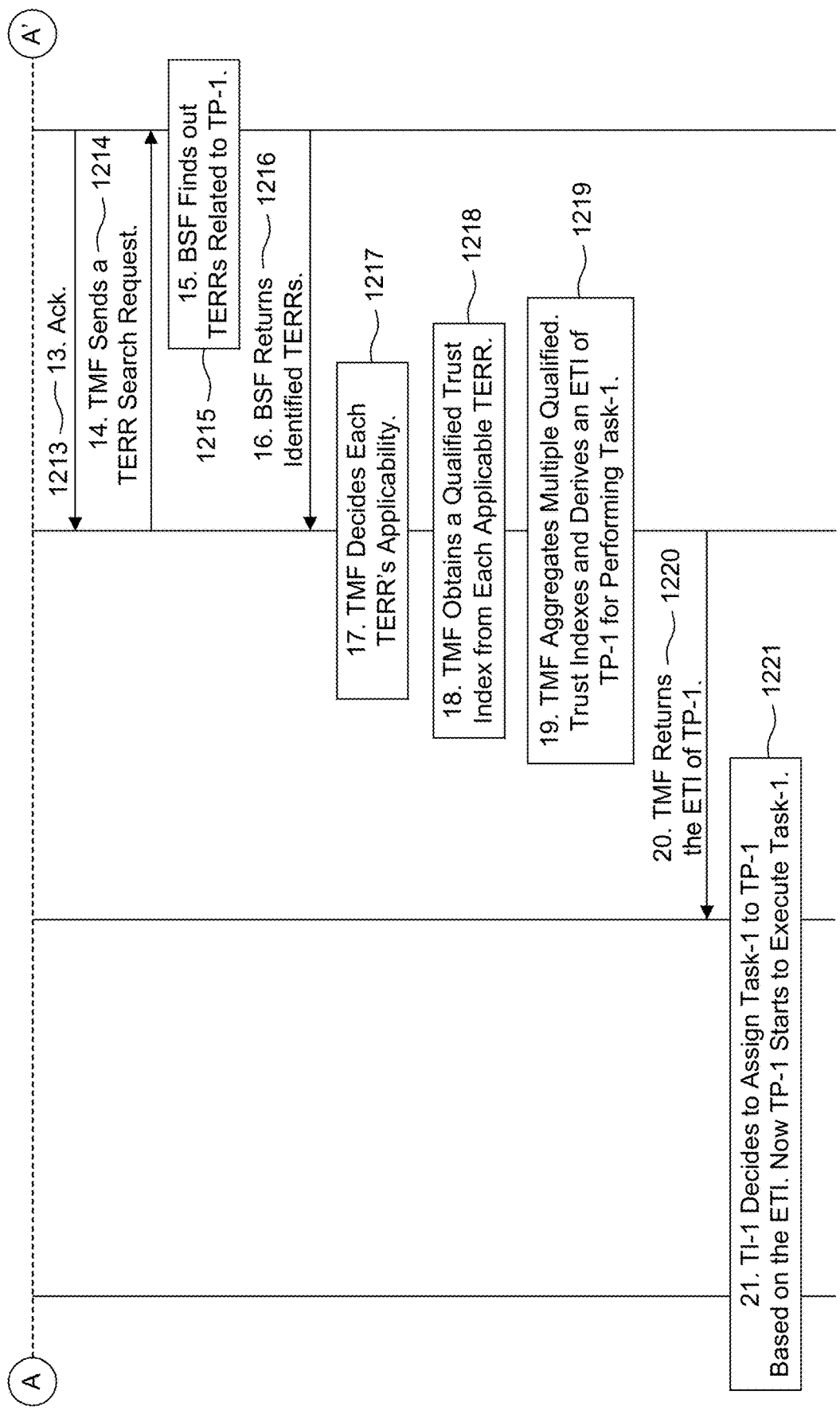

FIG. 12 illustrates an example of a call flow for a PreTA trust evaluation procedure for Scenario-1.

Step 1. TI-1 has identified TP-1 as a candidate TP 1201. TI-1 may use any existing approaches for discovering a potential TP. For example, TI-1 may identify TP-1 by itself, or another existing task assignment function, or a task orchestrator may suggest to TI-1 that TP-1 is a desired TP for executing Task-1.

Step 2. TI-1 has not utilized TP-1 for performing Task-1. TI-1 may want to make sure TP-1 has the desired trust for performing Task-1 before TI-1 assigns Task-1 to TP-1 1202.

Step 3. TI-1 may send a trust evaluation request to TMF 1203. Examples of parameters included are one or more of: an indication that TI-1 requires TMF to initiate a trust evaluation; the TP identifier, such as TP-1; the task identifier, such as Task-1; the identifier of TI initiating the trust evaluation, such as TI-1; the type of trust evaluation, e.g., PreTA trust evaluation; the focused GOT type; the focused GOT sub type; TERR discovery granularity indication; the resource requirement for performing the task (e.g., Task-1); the potential workload of Task-1; the maximum acceptable time cost for trust evaluation.

The focused GOT type may indicate what kinds of GOT operations may be required by Task-1, such as GOT-2. In other words, the trust evaluation initiated by this request may focus on this GOT type. This information is useful for TMF to select an appropriate TEPT for TI-1.

The focused GOT sub type may further indicate the specific sub type of GOT operations required by Task-1, such as AI/ML-related operations.

TERR discovery granularity indication may indicate the preferred TERR discovery granularity as specified by TI-1. Based on business logic or requirement, TI-1 may want to adopt a "coarse granularity" approach to TERR discovery, in which GOT type of identified TERRs shall be the same as the one described in the "The focused GOT type" parameter listed above. This approach is more applicable to the case that there may be limited TERRs in the blockchain system. In other words, TI-1 does not have very strict requirements on the specific GOT sub-types. If so, it may imply that as long as the associated GOT type of TERRs is the same as the GOT type described in the "The focused GOT type" parameter listed above, the trust index information included in those TERRs may be leveraged by TMF as a valuable reference for estimating the trust of TP-1 for performing Task-1. Alternatively, based on business logic or requirement, TI-1 may want to adopt a "fine granularity" approach to TERR discovery. In this approach, it is required that the GOT sub type of the identified TERRs needs to be as same as the one described in "The focused GOT sub type" parameter. This approach is more applicable to the case where TI-1 has a very strict requirement on the specific GOT sub-type. For example, if Task-1 asks TP-1 to conduct image analysis/processing operations (e.g., GOT type is GOT-2, and GOT sub type is image processing), TMF may only identify and leverage TERRs whose GOT sub type is image analysis/processing.

The resource requirement for performing the task (e.g., Task-1) may indicate how many resources shall be allocated to Task-1 in order to guarantee a normal operation of Task-1. This parameter may reflect the execution complexity of Task-1. This parameter may be used during the TERR discovery.

The potential workload of Task-1 may indicate the potential workload of Task-1. This parameter will be used during the TERR discovery. For example, when TP-1 is performing the Task-1, multiple requests may need to be processed. One of the approaches to model the workload of Task-1 is to measure the amounts/size of requests that have been received by TP-1 and need to be processed by executing Task-1.

TI-1 may include multiple value-setting combinations for the two parameters, i.e., "The resource requirement for performing the task" and "The potential workload of Task-1". Accordingly, for each combination of those two parameters with a specific value-setting, the TMF may determine a corresponding ETI. In other words, TMF may return a list of ETIs and each of them may correspond to one specific value-setting combination.

The maximum acceptable time cost for trust evaluation may indicate the maximum tolerable time cost that TMF may spend for completing the required trust evaluation of TP-1. Other performance related parameters may also be included.

Upon receiving the trust evaluation request from TI-1 1203, TMF may initiate PreTA trust evaluations on multiple TPs at the same time (e.g., TP-1 may be one of them). For example, TI-1 may have two planned task assignments, e.g., TI-1 may want to assign Task-1 to TP-1 and assign Task-2 to TP-2. Accordingly, TI-1 may ask TMF to conduct PreTA trust evaluations for both TP-1 and TP-2. Each of involved TPs may have the same set of parameters as listed above. All procedural steps described may be conducted for each of the involved TPs. TP-1, is used as a representative example for illustration purposes.

Step 4. TMF may receive the request and first may check whether TP-1 has already registered with it. For example, if TP-1 has not registered with TMF, the TMF may reject this trust evaluation request since it may be not capable of evaluating the trust of TP-1 (then all later steps may not be needed). If TP-1 has already registered with TMF, then TMF may check the corresponding TPPT of TP-1 (e.g., TPPT-Ins-1) 1204 that was generated by TP-1 and sent to TMF during the TP registration stage.

Step 5. In case TPPT-Ins-1 is not stored locally at TMF, TMF may need to retrieve TPPT-Ins-1 from another location. For example, TPPT-Ins-1 may be retrieved from a blockchain system via BSF 1205.

Step 6. Based on the "focused GOT type" parameter, TMF may select a TEPT (e.g., TEPT-1) for TI-1 in order to collect useful information 1206. For example, TMF may be pre-configured (by a network operator) with one or more standard or popular TEPTs. Alternatively, those TEPTs may be described as certain policies. For example, a policy may describe that a given TEPT may be used to evaluate the trust of a TP for performing a particular type of GOT operation.

Step 7. TMF may send the selected TEPT (such as TEPT-1) to TI-1 1207. In particular, a given TEPT may contain specific parameters since not all of the parameters defined in Table 3 may be mandatory. As an alternative implementation choice, the parameters defined in Table 3 may be sent as a list of individual parameters in this step. For example, mandatory parameters and one or more optional parameters defined in Table 3 may be contained in the request sent to TI-1 during this step.

Step 8. TI-1 reviews TEPT-1, and may fill in TEPT-1 regarding e.g., what kinds of trust indicators it would like to consider, what kinds of data shall be collected for trust evaluation, how to calculate trust indicators and the final trust index, etc. For a given selected trust indicator, TI-1 may fully adopt a standard solution listed in Part 1 of TEPT-1, which may be recommended by TMF. Or, if a standard solution originally listed in Part 1 of TEPT-1 is not preferred by TI-1, TI-1 may propose its own solution, which may override the original standard solution listed in Part 1. Once TI-1 selects and/or fills in details in TEPT-1, a TEPT-Ins (e.g., TEPT-Ins-1) may be created 1208. TEPT-Ins-1 includes the TEP desired by TI-1 to evaluate TP-1.

Step 9. TI-1 may send TEPT-Ins-1 to TMF 1209. In particular, a given TEPT-Ins may contain specific parameters since not all of the parameters defined in Table 4 may be mandatory. In addition to that, one or more optional parameters defined in Table 4 may also be included in TEPT-Ins-1. As an alternative implementation choice, the parameters defined in Table 4 may be sent as a list of individual parameters in this step. For example, mandatory parameters and one or more optional parameters defined in Table 4 may be contained in the request sent to TMF during this step.

Alternatively, it may be possible that this may not be the first time TI-1 contacts TMF for trust evaluation, meaning that TI-1 may have already obtained TEPT-1 from TMF during a previous trust evaluation. In that case, steps 5-7 may not be needed. Instead, TI-1 may directly create TEPT-Ins-1 and send it to TMF during step 3. In addition, TI-1 may also choose to indicate whose trust needs to be evaluated by TMF (e.g., TP-1) during this step, instead of in step 3.

The TPPT-Ins-1 (filled by TP-1) describes the capabilities of TP-1 and available data sources that may be collected for evaluating the trust of TP-1 for performing a task. The TEPT-Ins-1 (created by TI-1) describes how TI-1 would like to evaluate the trust of TP-1.

Using both the TPPT-Ins-1 and TEPT-Ins-1, the TMF may decide whether the GOT operation included in TEPT-Ins-1 (indicated by "Applicable GOT" parameter) may be supported by TP-1 (The "Supported GOT list" parameter in TPPT-Ins-1 may provide such information). Using both the TPPT-Ins-1 and TEPT-Ins-1, the TMF may also decide the data inputs (required by TEPT-Ins-1) for evaluating TP-1's trust may be provided by the available data sources listed in TPPT-Ins-1.

Step 10. If the above requirements are met, it may imply the TEP as defined in TEPT-Ins-1 may be used to evaluate the trust of TP-1 for performing Task-1 1210. Otherwise, it may imply the trust evaluation as defined in TEPT-Ins-1 cannot be used to evaluate the trust of TP-1 for performing Task-1 and TMF may send a rejection response to TP-1 indicating that the TEP desired by TI-1 (described in TEPT-Ins-1) cannot be used to evaluate the trust of TP-1 for performing Task-1.

Step 11. TMF may send TEPT-Ins-1 to BSF for recording 1211. Since TEPT-Ins-1 represents a specific TEP, which may not be associated with a specific task or TP, e.g., it may be referred and re-used by other TIs.

Step 12. BSF records TEPT-Ins-1 in the blockchain system as blockchain transactions 1212.

Step 13. BSF may send an acknowledgement to TMF by indicating that TEPT-Ins-1 has already been recorded 1213.

Step 14. TMF may use TEPT-Ins-1 to identify one or more existing TERRs, which may be leveraged by TMF to estimate whether TP-1 may be trusted. For example, TP-1 may have not conducted any task for TI-1 before, but TP-1 did perform many tasks for other TIs in the past. During executions of those tasks, some TERRs may have been generated, which may be as references for TMF to estimate the trust of TP-1 for performing Task-1. TMF may send a request to BSF for searching TERRs that are about TP-1 1214. One or more of the following parameters for TERR search criteria may be indicated: the purpose of this request, e.g., TERR discovery; the focused TP; the focused GOT type; the focused GOT subtype.

Focused TP may indicate which TP may be focused, e.g., TP-1. If this parameter is present and refers to TP-1, it may imply that only TERRs associated with TP-1 may be leveraged. This may be applicable to the case where there may be sufficient TERRs associated with TP-1, e.g., TP-1 has already performed many other tasks in the past. If this parameter is not present, it may imply that TERRs related to any TP (similar to TP-1) may be leveraged. This may be applicable to the case where there may not be sufficient TERRs associated with TP-1 and therefore TERRs associated with other TPs (which may have similar capacity/capability and workload as TP-1) may also be leveraged. In reality, TMF may start with including this parameter in the request, and if it turns out that there are not sufficient TERRs may be identified, TMF may update this request and choose not to include this parameter in the request.

Focused GOT type may indicate what GOT type may be focused. In other words, only TERRs associated with focused GOT may be identified. This may be obtained from the "Involved GOT" parameter of TERRs.

Focused GOT subtype may indicate what GOT sub type may be focused. If TI-1 has indicated TMF to use a fine granularity approach to TERR discovery in the "TERR discovery granularity indication" parameter, the TMF may include this parameter.

The minimum average rank of TERR may indicate the minimum level of accuracy required of a TERR for the TERR to be considered a valid TERR.

Step 15. BSF may find all the valid TERRs about TP-1 based on the search criteria received from the TMF 1215. For each identified TERR (e.g., TERR-X may be one of them and TERR-X may be used as a representative example for illustration in the later steps), BSF may further identify one or more TERRRRs associated with TERR-X and those TERRRRs reflect the ranks of the accuracy or usefulness of TERR-X in historical PreTA trust evaluation jobs (This may be because over time, the trust index included in TERR-X may not be always accurate). BSF may aggregate multiple ranks (reported by different TIs) to obtain an average rank of TERR-X. If the average rank of TERR-X is above the minimum average rank as indicated in the search criteria, TERR-X may be returned to TMF for future processing.

Step 16. BSF returns a list of identified TERRs to TMF 1216. In case no TERR was identified, it may imply that at this time, TMF may not be able to estimate the trust of TP-1 for performing Task-1. Then, during step 20, TMF may indicate to TI-1 that there may not be sufficient information available for estimating TP-1's trust at this time.

Step 17. For each of returned TERRs (e.g., TERR-X may be one of them and TERR-X may be used as a representative example for illustration in the later steps), TMF may check the content to extract the identifier of its associated TEPT-Ins (describing what specific TEP was adopted for generating this TERR). Then, TMF may retrieve the corresponding TEPT-Ins if it is stored locally or may retrieve the TEPT-Ins from a remote storage, such as a blockchain system. After that, TMF may decide TERR-X's applicability based on the corresponding TEPT-Ins of TERR-X, e.g., whether TERR-X may be used to estimate the trust of TP-1 for performing Task-1 1217.

In general, TERR (e.g., TERR-X) is deemed to be applicable for estimating the trust of TP-1 for performing Task-1 if TERR-X meets all one or more of the similarity requirements. Examples of similarities requirements include:

TP requirement: The TP involved in the TERR-X may be TP-1 or a TP that may be similar to TP-1.

GOT equality requirement: The involved GOT operation of TERR-X may be the same as the GOT operation required by Task-1. In a stricter setting, the GOT subtype indicated in TERR-X shall be as the same as the GOT subtype of Task-1.

Task execution similarity requirement: Whether Task-1 and the task associated with TERR-X have the similar execution complexity may depend on several aspects, including but not limited to: 1) The resource requirement for performing Task-1 is similar to the value of "The resource requirement for performing the associated task" parameter in TERR-X or similar to the value of "The actual amount of resource being allocated" parameter in TERR-X; 2) The potential workload of Task-1 (as indicated in Step 3) is similar to the value of "The potential workload of the associated task" parameter in TERR-X or similar to the value of "The actual workload of the associated task" parameter in TERR-X.

Task execution context similarity requirement: The current task execution context of TP-1 may be similar to the value of "The current task execution context" parameter in TERR-X. This may make sure TP-1 and the associated TP of TERR-X have the similar resource capacity and have a similar workload. In other words, the task associated with TERR-X was performed in an execution environment/context that may be similar to the current execution environment/context of TP-1 where Task-1 may be planned to be executed. If TI-1 knows such information, TI-1 may indicate such information to TMF. Alternatively, during this step, TMF may contact TP-1 to collect such runtime information.

Trust evaluation pattern similarity requirement: The adopted TEP of TERR-X (denoted as TEPT-Ins-X) may be similar to the TEP defined in TEPT-Ins-1, which was created by TI-1. In other words, TMF needs to evaluate whether the TEP defined in TEPT-Ins-X may be comparable to the TEP defined in TEPT-Ins-1. The following conditions may exist, which may be mutually exclusive (e.g., only one of them may apply):

The TEPT-Ins-X may be the same as TEPT-Ins-1. In this case, TMF may immediately deduce that TERR-X may be used to estimate the trust of TP-1 for performing Task-1 since the adopted TEPs may be the same.

The trust indicators covered by TEPT-Ins-X may be at least no less than the trust indicators covered by TEPT-Ins-1.

Case-1: The trust indicators covered by TEPT-Ins-X may be the same as the trust indicators covered by TEPT-Ins-1. In this case, all the trust indicators covered by TEPT-Ins-X may be re-used by TEPT-Ins-1.

Case-2: The trust indicators covered by TEPT-Ins-X may be more than the trust indicators covered by TEPT-Ins-1. In this case, TMF may need to do some tailoring operations so that only the trust indicators that are overlapped with TEPT-Ins-1 may be leveraged.

For each trust indicator (covered by both TEPT-Ins-X and TEPT-Ins-1), the adopted trust evaluation instructions and the parameter setting of TEPT-Ins-X (indicated by the "needed data inputs" parameter, the "applied calculation algorithms" parameter and the "parameter value settings" parameter as defined in Table 3) may be at least as strict as those ones defined in TEPT-Ins-1.

Case-1: The adopted trust evaluation instructions and the parameter setting in TEPT-Ins-X for calculating the trust indicator as same as the one defined in TEPT-Ins-1. In this case, the value of this particular trust indicator included in TERR-X may be directly re-used TI-1.

Case-2: The adopted trust evaluation instructions and the parameter setting in TEPT-Ins-X for calculating the trust indicator may be stricter than the one defined in TEPT-Ins-1. In this case, TMF may choose to re-use the runtime data inputs stored in TERR-X but re-apply the desired trust evaluation instructions and parameter setting defined in TEPT-Ins-1, in order to calculate a new value for this particular trust indicator.

If TEPT-Ins-X and TEPT-Ins-1 cover the same trust indicators and TEPT-Ins-X and TEPT-Ins-1 use the same trust evaluation instructions and the same parameter setting for each of those trust indicators, it may imply the trust index of TERR-X may be re-used:

Case-1: the adopted trust evaluation instructions and the adopted parameter setting in TEPT-Ins-X for calculating the trust index may be the same as the ones defined in TEPT-Ins-1. In this case, the value of the trust index included in TERR-X may be directly re-used.

Case-2: The adopted trust evaluation instructions and the adopted parameter setting in TEPT-Ins-X for calculating the trust index may be different than the ones defined in TEPT-Ins-1. In this case, TMF may choose to re-use the values of involved trust indicators (included in TERR-X) but then re-apply the desired trust evaluation instructions and parameter setting as defined in TEPT-Ins-1, in order to drive a new value of the trust index.

Step 18. TMF may obtain a list of trust indexes produced from the TERRs filtered out in the previous step, and those trust indexes may be defined as qualified trust indexes 1218. The following conditions may exist, which may be mutually exclusive:

The original trust index included in a particular TERR may be used directly.

For a given TERR (e.g., TERR-X, which may be associated with TEPT-Ins-X), some of the information stored in TERR-X may be re-used but a new trust index may be produced during step 17. For example, In case TEPT-Ins-1 needs fewer trust indicators used by TEPT-Ins-X (associated with TERR-X), only the trust indicators selected by TEPT-Ins-1 may be re-used and a new trust index may be produced, which only aggregates the trust indicators covered by TEPT-Ins-1 (as specified by TI-1).

For a given trust indicator, TEPT-Ins-1 uses a different calculation algorithm or has a different parameter setting compared to those adopted in TEPT-Ins-X (associated with TERR-X). If so, the value of the trust indicator may be recalculated and consequently, the trust index in TERR-X may also be recalculated.

All the trust indicators included in TEPT-Ins-X may be reused. However, TEPT-Ins-1 uses a specific calculation algorithm or parameter setting to calculate the trust index, which may be different from the one adopted by TEPT-Ins-X (associated with TERR-X). In this case, the trust index may also be recalculated.

Step 19. TMF aggregates all the qualified trust indexes obtained and produces an Estimated Trust Index (ETI) of TP-1, which estimates how TP-1 may be trusted for performing Task-1 1219. A simple aggregation may be to use a weighted average approach. How to calculate the ETI may depend on various implementation choices.

Step 20. TMF returns the ETI of TP-1 to TI-1 1220. In the meantime, TMF may also indicate the following parameters: the identifier of TI, such as TI-1; the identifier of a task, such as Task-1; the identifier of involved TP, such as TP-1; the value of ETI.

Step 21. TI-1 may determine whether Task-1 should be assigned to TP-1 based on the ETI of TP-1 1221. TI-1 may formally assign Task-1 to TP-1 for execution. Once TP-1 gets the task assignment, it may start to execute the Task-1.

A few alternatives to the steps in FIG. 12 are listed below (note that, those alternatives may be independent to each other):

Overall, there may be multiple ways to split steps 17-19 (1217-1219) among BSF, TMF and TI-1. For example, in the example shown in FIG. 12, 17-19 (1217-1219) are done by TMF. Other options may be also possible. For example, in step 14 (1214), TMF may also send the identifiers of TPPT-Ins-1 (describing TP-1) and TEPT-Ins-1 (describing how TI-1 may want to evaluate the trust of TP-1) to BSF. Then, all steps 15 (1215), 17-19 (1217-1219) may be conducted by BSF (instead of being conducted by TMF as shown in FIG. 12). BSF may be responsible for generating an ETI of TP-1. After that, BSF may return the generated ETI to TMF.

In case there are certain privacy concerns on the TPPT-Ins and TEPT-Ins, the BSF may choose to store TPPT-Ins and TEPT-Ins in a permissioned blockchain system or in a private blockchain system. This may also applies to other information elements.

Step 15 (1215) may also be done by TMF. In this case, BSF may return all the identified TERRs and associated TERRRRs to TMF and let TMF complete all the processing as discussed above.

In case TI-1 is a powerful TI, it may interact with the BSF to conduct TERRs discovery by itself, e.g., certain steps such as step 14 (1214) and steps 17-19 (1217-1219) may be conducted by TI-1. For this case, it adds more implementation complexity to TI-1 since it has to implement some of the functions of TMF.

It may be possible that the blockchain system may not be used. If that is the case, all the TPPT-Ins and TEPT-Ins may be maintained by a storage repository or maintained TMF locally. Steps 11-19 may be the internal processing of TMF if TERR is stored locally.

All alternatives as listed above may also be applicable to any of the procedures that will be discussed in the following paragraphs.

Scenario 2: TI Indicates a TP Candidate but TI May Re-Use an Existing TEP

Figure 13:
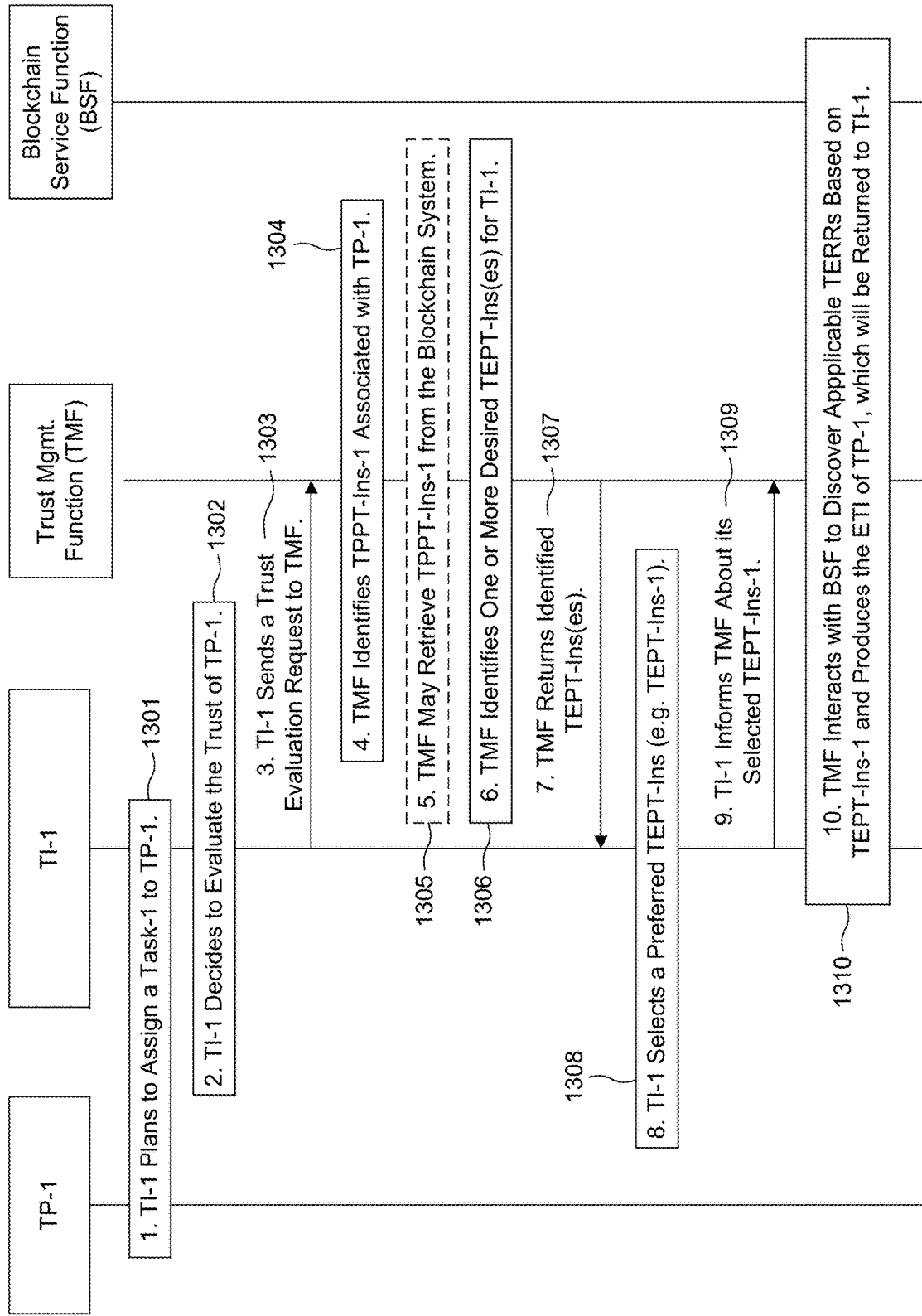
FIG. 13 illustrates an example of a call flow for a PreTA trust evaluation procedure for Scenario-2.

FIG. 13 illustrates an example of a call flow for a PreTA trust evaluation procedure for Scenario-2.

Step 1: TI-1 has identified TP-1 as a candidate TP and would like to assign a Task-1 to TP-1 1301.

Step 2. TI-1 may decide that it needs to first evaluate the trust of TP-1 1302. Same as step 2 of FIG. 12 1202.

Step 3. TI-1 may send a trust evaluation request to TMF 1303. The parameters included in step 3 of FIG. 12 1203 may be included, and a new indication may be included for requiring TEPT-Ins discovery. It may imply that TI-1 does not have its own preferences regarding how the trust of TP-1 shall be evaluated. Instead, TI-1 may want to leverage existing TEPs. Therefore, this indication may trigger a TEPT-Ins discovery at TMF.

Step 4. TMF may check whether TP-1 has already registered with it 1304. If so, TMF may determine the corresponding TPPT-Ins of TP-1 (e.g., TPPT-Ins-1). Same as step 4 of FIG. 12 1204.

Step 5. This may be an optional step if TMF stores TPPT-Ins-1 locally 1305. Otherwise, TMF may need to retrieve TPPT-Ins-1 from a blockchain system via BSF. Same as step 5 of FIG. 12 1205.

Step 6. TEPT-Ins discovery may be conducted by TMF during this step and one or more existing TEPT-Ins(es) may be identified 1306. TMF may store TEPT-Ins(es) locally, or TEPT-Ins(es) may be stored in a blockchain system. For both cases, TMF conducts a search and identifies one or more desired TEPT-Ins(es) for TI-1. For example, TMF may identify some of the existing TEPT-Ins(es) that were used by other TIs recently. Another example, TMF may be pre-configured with some TEPT-Ins(es) by network administrator. For example, TEPT-Ins(es) may be described in certain policies. Another example, TMF may maintain a statistic summary about which TEPT-Ins(es) have been used most and those popular TEPT-Ins(es) may be as the candidate TEPT-Ins(es) for TI-1.

Step 7. TMF may send the identified TEPT-Ins(es) to TI-1 for its selection 1307.

Step 8. TI-1 may check the contents of each received TEPT-Ins candidate, examining details regarding e.g., what trust indicators may be covered by each TEPT-Ins, what data may be collected for trust evaluation, what algorithms or customized parameter values may be adopted for calculating the trust indicators or the trust index, etc. TI-1 may select a preferred TEPT-Ins (e.g., TEPT-Ins-1), which best fits its needs 1308. For example, TI-1 may want to focus on scalability and reliability, it may select a particular TEPT-Ins which mainly focus on those two trust indicators. In addition, certain modifications may be needed in case the selected TEPT-Ins may not 100% fit the needs of TI-1. For example, the weights of different trust indicators for calculating the trust index may be adjusted based on TI-1's preference.

Step 9. TI-1 may send a notification to TMF about its selection, e.g., the identifier of the selected TEPT-Ins (e.g., TEPT-Ins-1) 1309. If a modification to TEPT-Ins-1 has been made, TI-1 may also send an updated version of TEPT-Ins-1 to TMF.

Step 10 (1310). This is equivalent to the steps 10-21 in FIG. 12.

Scenario 3: TI Needs TMF to Identify a Candidate TP

Figure 14:
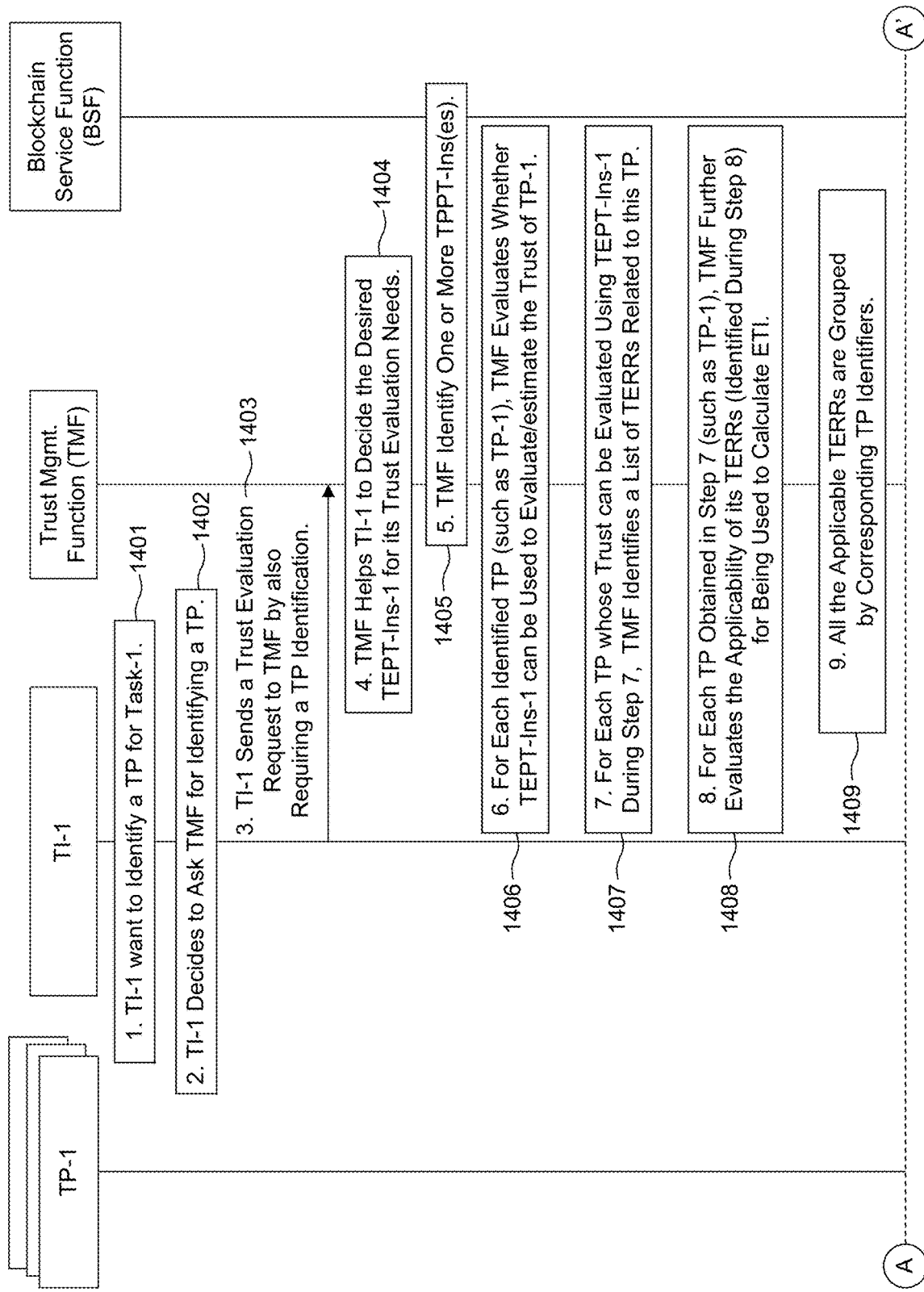
FIG. 14 illustrates an example of a call flow for a PreTA trust evaluation procedure for Scenario-3.
Figure 14:
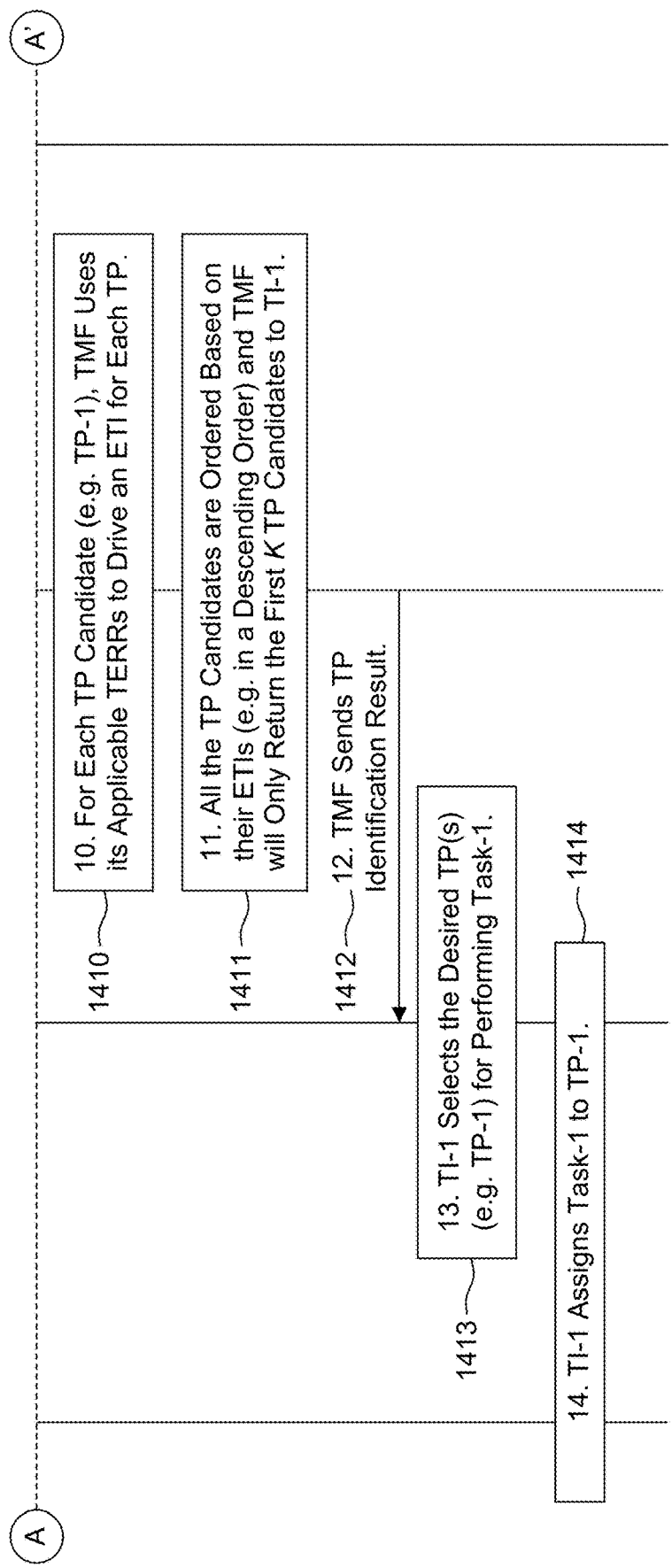

FIG. 14 illustrates an example of a call flow for a PreTA trust evaluation procedure for Scenario-3.

Step 1. TI-1 would like to assign Task-1 to a TP 1401. However, at this time point, the desired TP has not been identified by TP-1.

Step 2. TI-1 may decide that it needs to ask TMF to not only identify some TP candidates but also estimate the trust of those TPs for performing Task-1 1402. In this step, TI-1 may decide whether it has its own preferences regarding how to evaluate the trust of the desired TP or whether TI-1 may want to leverage existing TEPs.

Step 3. TI-1 may send a trust evaluation request to TMF 1403. The parameters may include:

An indication that TI-1 needs to rely on TMF to complete two tasks: 1) first identify one or more TP candidates; 2) estimate the trust for each identified TP candidate.

The identifier of TI who initiates this request, such as TI-1.

Maximum tolerable time cost for processing this request. This may indicate the maximum tolerable time cost that TMF may spend for processing this request.

Non-trust-related search filtering criteria to be used for TP identification, which may include:

The desired TP type, such as a smartphone, a gateway, a mobile vehicle, or any other entity.

The desired TP location or a planned mobility path.

The desired TP capabilities, such as what kinds of GOT type or sub type of operations may be supported by TP.

The desired TP work schedule. For example, an entity may only want to act as a TP during certain time period.

Any Other Desired TP Characteristics

The maximum number of TP candidates (K) shall be returned to TI-1 for its selection.

Information on how TI-1 may want the TMF to evaluate TP trust for performing Task-1, which may have the following cases:

Case 1: If TI-1 has its own preferences regarding how to evaluate the trust of a desired TP, the following two cases are possible:

Case 1.1: TI-1 does not have a TEPT in hand and needs to get one from TMF. In this case, TI-1 may not include any further parameters.

Case 1.2: TI-1 already has a TEPT in hand, e.g., due to a previous PreTA trust evaluation. In this case, TI-1 may directly create a TEPT-Ins and include its TEPT-Ins in this request.

Case 2: TI-1 may want to leverage existing TEPs, the following parameter may be included:

An indication that TI-1 does not have its own preferences and may want to leverage existing TEPs, TI-1 may include another indication, which triggers a TEPT-Ins discovery at TMF.

To be more general, TI-1 may send a trust evaluation request to TMF, which may initiate TP identification and PreTA trust evaluations for multiple tasks (e.g., not only for Task-1 as mentioned earlier). For example, TI-1 may have two planned tasks and TI-1 may want TMF to identify the desired TPs for both tasks respectively. Accordingly, in this step, each of task may have the same set of parameters as listed above and all the later steps may be also conducted for each of tasks.

Step 4. TMF helps TI-1 to decide a TEPT-Ins (e.g., TEPT-Ins-1) for its trust evaluation needs 1404. There are the following cases:

When Case 1.2 (as described in step 3) happens, TMF may be ready to do TP identification and PreTA trust evaluation.

When Case 1.1 (as described in step 3) happens, TMF may send a TEPT to TI-1 and ask TI-1 to fill in a TEPT. Then, TI-1 may create a TEPT-Ins (e.g., TEPT-Ins-1), which may be returned to TMF. To realize this step, steps 7-9 of FIG. 12 may be reused here.

When Case 2 (as described in step 3) happens, TI-1 may use some popular TEPs. For example, TMF may select a list of existing TEPT-Ins(es) and ask TI-1 to choose which one may be preferred and should be selected for its use. To realize this step, steps 6-9 of FIG. 13 may be reused here.

The result of step 4 may be a specific TEPT-Ins (such as TEPT-Ins-1) that may be used for conducting the trust evaluation required by TI-1.

Step 5. This step may be for TP identification. TMF conducts a TPPT-Ins search to identify one or more TPPT-Ins(s) 1405. For example, based on the information included in the "The desired TP capabilities" parameter in step 2, TMF may identify a list of TPPT-Ins(es). The corresponding TPs of those identified TPPT-Ins(es) may be the TP candidates. For example, TMF may examine the "Supported GOT list" parameter in TPPT-Ins(es) in order to see which TP(s) have the desired capabilities. Furthermore, this parameter may further indicate the desired application-specific capabilities. Similarly, TMF may examine the "Supported GOT sub type list" parameter in TPPT-Ins(es) in order to see which TP(s) have the desired application-specific capabilities, such as AI/ML-related, AR/VR/XR-related, or metaverse-related operations/capabilities.

The following approaches may be involved for TP identification:

Case 1: The blockchain technology may not be used, all the TPPT-Ins(es) may be maintained by TMF locally or stored in a traditional storage medium or other repositories. In this case, TMF may search in the local storage of TMF or search in a traditional storage in order to identify one or more TP candidates.

Case 2: Blockchain (or a remote repository) may be used for storing TPPT-Ins(es). In this case, TMF may send all the non-trust-related search filtering criteria (as described in step 3) to BSF and ask BSF to identify one or more TPPT-Ins(es).

Step 6. For each identified TP (e.g., TP-1 may be one of them and TP-1 may be used as a representative example for illustration in the later steps), TMF may decide whether each TP's trust may be estimated using TEPT-Ins-1 1406. Step 10 of FIG. 12 may be reused.

Step 7. For each TP whose trust may be evaluated using TEPT-Ins-1 during step 6, TMF contacts BSF to identify a list of TERRs that may be related to each TP, e.g., TP-1 1407. Steps 14-16 of FIG. 12 may be reused.

Step 8. For each of identified TERRs related to the same TP (e.g., TERR-1 may be one of them, which may be related to TP-1), TMF further may decide whether it (e.g., TERR-1) may be used to estimate the trust of the related TP (e.g., TP-1) for performing Task-1 1408. This may be realized by comparing the TEP defined in TEPT-Ins-1 (desired by TI-1) and the adopted TEP associated with this TERR. If so, such a TERR may be an applicable TERR for TP-1. Step 17 of FIG. 12 may be reused.

Step 9. All the applicable TERRs may be grouped by their corresponding TP identifiers 1409. For example, TP-1 may be a candidate TP and three TERRs (TERR-1, TERR-2, and TERR-3) have been identified by TMF, which may be applicable TERRs for TP-1.

Step 10. For each candidate TP (e.g., TP-1), TMF aggregates the trust indexes produced by all the applicable TERRs related to this TP (e.g., TERR-1, TERR-2, and TERR-3) 1410. Then, TMF derives an ETI for this TP. Steps 18-19 of FIG. 12 may be reused.

Step 11. TMF creates a rank list of TP candidates, which may be ordered based on their respective ETIs (e.g., in descending order) 1411. Only the first K TP candidates may be returned to TI-1, where K may be a parameter included in step 3, which describes how many TP candidates (K) shall be returned to TI-1 for its selection. For example, K may be 1.

Step 12. TMF may send the TP identification result to TI-1 1412. In this response, the identifiers of K TP candidates may be included, along with other information. For example, for each identified TP candidates, the following parameters may be included:

The identifier of the TP (such as TP-1)

The ETI of the TP (produced by TMF)

The associated TPPT-Ins of the TP, e.g., TPPT-Ins-1 (which may be associated with TP-1).

Step 13. Based on the TP identification result sent from TMF, TI-1 may select the desired TP (e.g., TP-1) for performing Task-1 1413. In other words, TI-1 may decide to assign Task-1 to TP-1. Note that, TI-1 may not always choose the TP having the highest ETI. Instead, given K TP candidates, TI-1 may consider various aspects during TP selection, such as ETI, and/or other information described in TPPT-Ins, such as TP's type, mobility, characteristics, etc.

Step 14. TI-1 may assign Task-1 to TP-1 1414.

Figure 15:
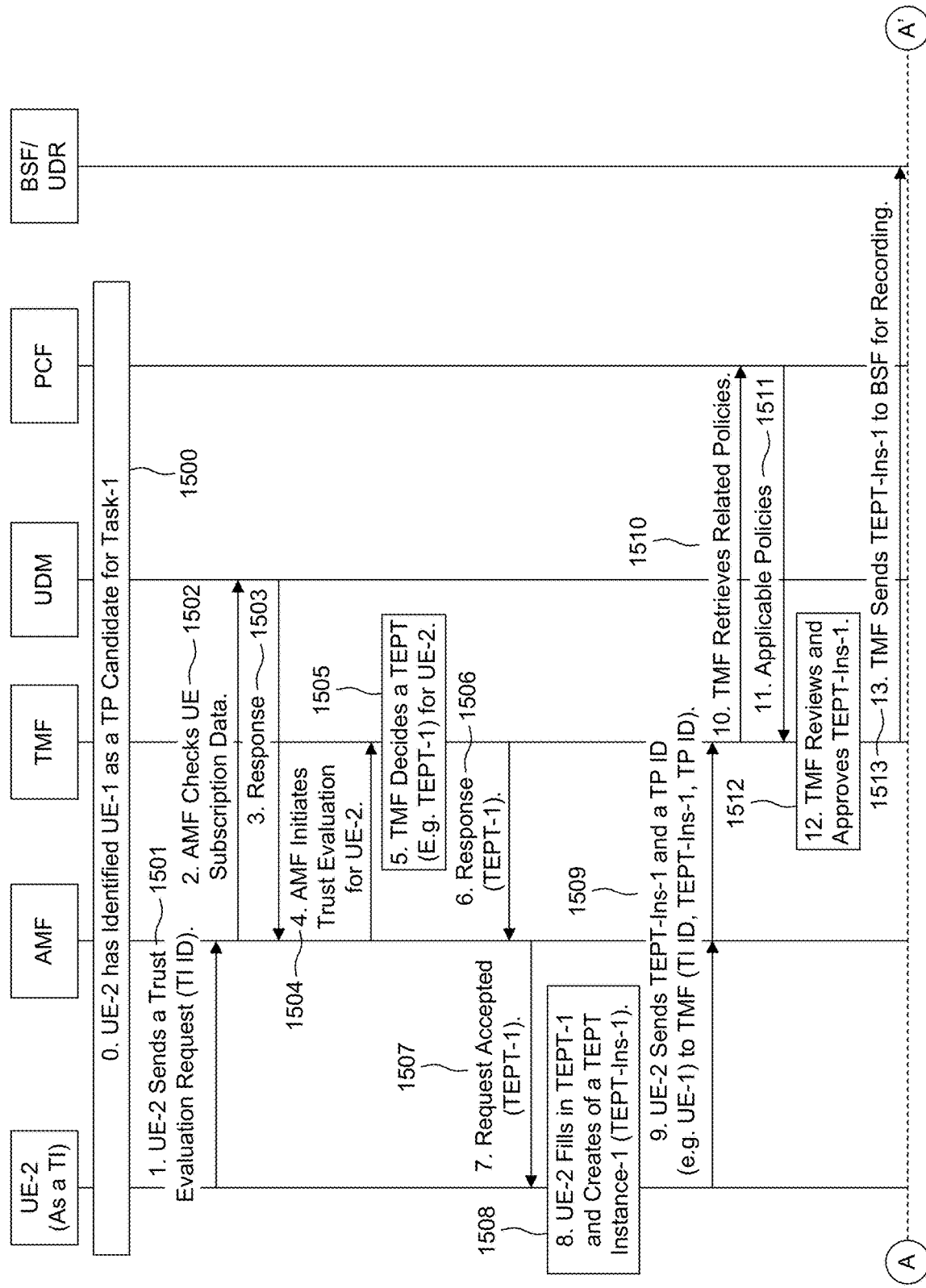
FIG. 15 illustrates an example of a call flow for a PreTA trust evaluation procedure when a TI is implemented in a 3GPP UE.
Figure 15:
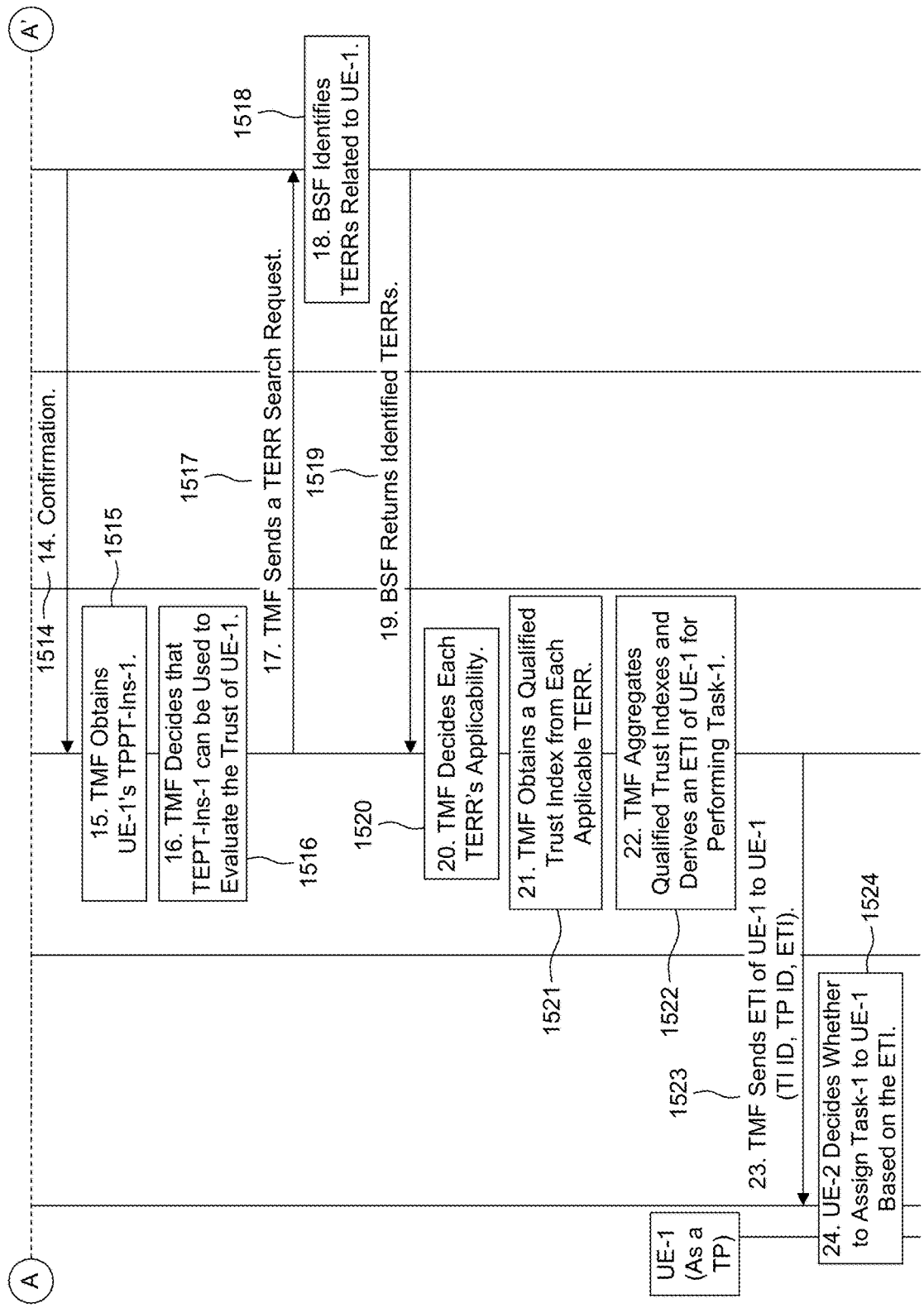

FIG. 15 illustrates an example of a call flow for a PreTA trust evaluation procedure when a TI is implemented in a 3GPP UE.

The TI may be the same as the one in FIG. 12.

TMF may be a new 3GPP network function in the core network.

BSF may be a new 3GPP network function in the core network, or as part of UDR.

Precondition (step 0). UE-2 has identified a candidate UE-1 as a TP candidate for Task-1.

Step 1. UE-2 may send a trust evaluation request to AMF 1501. This step may be the same as step 3 in FIG. 12.

Accordingly, all the parameters included in step 3 of FIG. 12 may also be included in this step. In addition, a TI ID included in this step may be a UE ID plus a TI Role ID or a role indicator. The Role ID may indicate that UE-2 may be a TI.

Step 2. AMF may send a request UDM to check if the UE-2 is allowed to act as a TI and to use trust management services provided by TMF 1502. In this step, the AMF may send the TI ID to the UDM.

Step 3. The UDM may check UE-2's subscription data and may send a response 1503 to the AMF by indicating whether UE-2 may be allowed to use the services provided by TMF. If UE is not allowed to use TMF or UE may not be allowed to act as a TI, then the remaining steps may not be needed.

Step 4. AMF forwards the trust evaluation request (received during step 1) to TMF 1504. All the parameters included in step 1 may also be included in this step.

Step 5. TMF may decide a TEPT (e.g., TEPT-1) for UE-2 1505. This step may be the same as step 6 in FIG. 12.

Step 6. TMF may send a response to AMF 1506, in which TEPT-1 may be included.

Step 7. AMF further may send a response to UE-2 by indicating that its trust evaluation request was accepted by TMF and a TEPT-1 may be attached, which needs to be filled by UE-2 1507.

Step 8. UE-2 may fill in TEPT-1 and creates a TEPT Instance-1 (TEPT-Ins-1) 1508. This step may be the same as step 8 in FIG. 12.

Step 9. UE-2 may send TEPT-Ins-1 to TMF via AMF 1509. This step may be the same as step 9 in FIG. 12. In addition, UE-2 may also include a TP ID (TP ID may be a UE ID plus a TP Role ID), which describes which TP's trust that UE-2 may evaluate, e.g., UE-1. Alternatively, UE-2 may also include the TP ID in step 1.

Step 10. TMF may send a request to PCF to retrieve policies related to PreTA trust evaluation 1510. In this request, the TMF may include the TI ID in the message.

Step 11. PCF finds related policies applicable to the UE-2 as indicated in step 10, then the policies may be returned to TMF 1511.

Step 12. TMF may check whether TEPT-Ins-1 meets the corresponding requirements or certain policies/rules retrieved from PCF. If so, TMF may approve TEPT-Ins-1 1512. For example, a policy may be that the "Applied calculation algorithms of TIndex" described in TEPT-Ins-1 may be supported/recommended by the network administrator.

Step 13. TMF may send TEPT-Ins-1 to BSF for recording 1513. In this request, the following information may be included, such as:

A blockchain system ID, which describes which underlying blockchain system shall be used A chain ID, which describes which chain should be used to store TEPT-Ins-1

A copy of TEPT-Ins-1. Alternatively, in case the original version of TEPT-Ins-1 is in a large size and may only be stored locally at TMF, a hash value of TEPT-Ins-1 may be included in this request, e.g., only the hash of TEPT-Ins-1 may be recorded in the blockchain system. The same processing may apply to other types of information elements.

Step 14. BSF may send a confirmation to TMF by indicating that TEPT-Ins-1 has already been recorded 1514.

Step 15. Based on the TP ID received in step 9 (e.g., UE-1 may be a TP), TMF obtains UE-1's corresponding TPPT-Ins, e.g., TPPT-Ins-1 1515.

Step 16. TMF may decide that TEPT-Ins-1 may be used to evaluate the trust of UE-1 (which may be associated with TPPT-Ins-1) 1516. This step may be same as step 10 in FIG. 12.

Step 17. TMF may send a request to BSF for querying TERRs that may be about UE-1 1517. This step may be same as step 14 in FIG. 12. All the parameters included in step 14 in FIG. 12 may also be included in this step.

Step 18. BSF identifies TERRs related to UE-1 1518. This step may be the same as step 15 in FIG. 12. Step 19. BSF returns identified TERRs to TMF 1519. This step may be the same as step 16 in FIG. 12.

Step 20. TMF may decide each TERR's applicability 1520. This step may be the same as step 17 in FIG. 12.

Step 21. TMF obtains a qualified trust index from each applicable TERR 1521. This step may be same as step 18 in FIG. 12.

Step 22. TMF aggregates qualified trust indexes and derives an ETI of UE-1 for performing Task-1 1522. This step may be same as step 19 in FIG. 12.

Step 23. TMF may send the ETI of UE-1 to UE-2 1523. This step may be the same as step 20 in FIG. 12. All the parameters included in step 20 in FIG. 12 may also be included in this step.

Step 24. UE-2 may decide whether to assign Task-1 to UE-1 based on the ETI sent from TMF 1524.

In the example in FIG. 15, UE-2 communicates with TMF (and other NFs) via AMF. Alternatively, UE-2 may communicate with TMF (or other NFs) directly, e.g., not via AMF. For example, in case UE-2 may be a Service-Based Architecture (SBA) UE, UE-2 may communicate with NFs (such as TMF) using the SBI interface.

Figure 16:
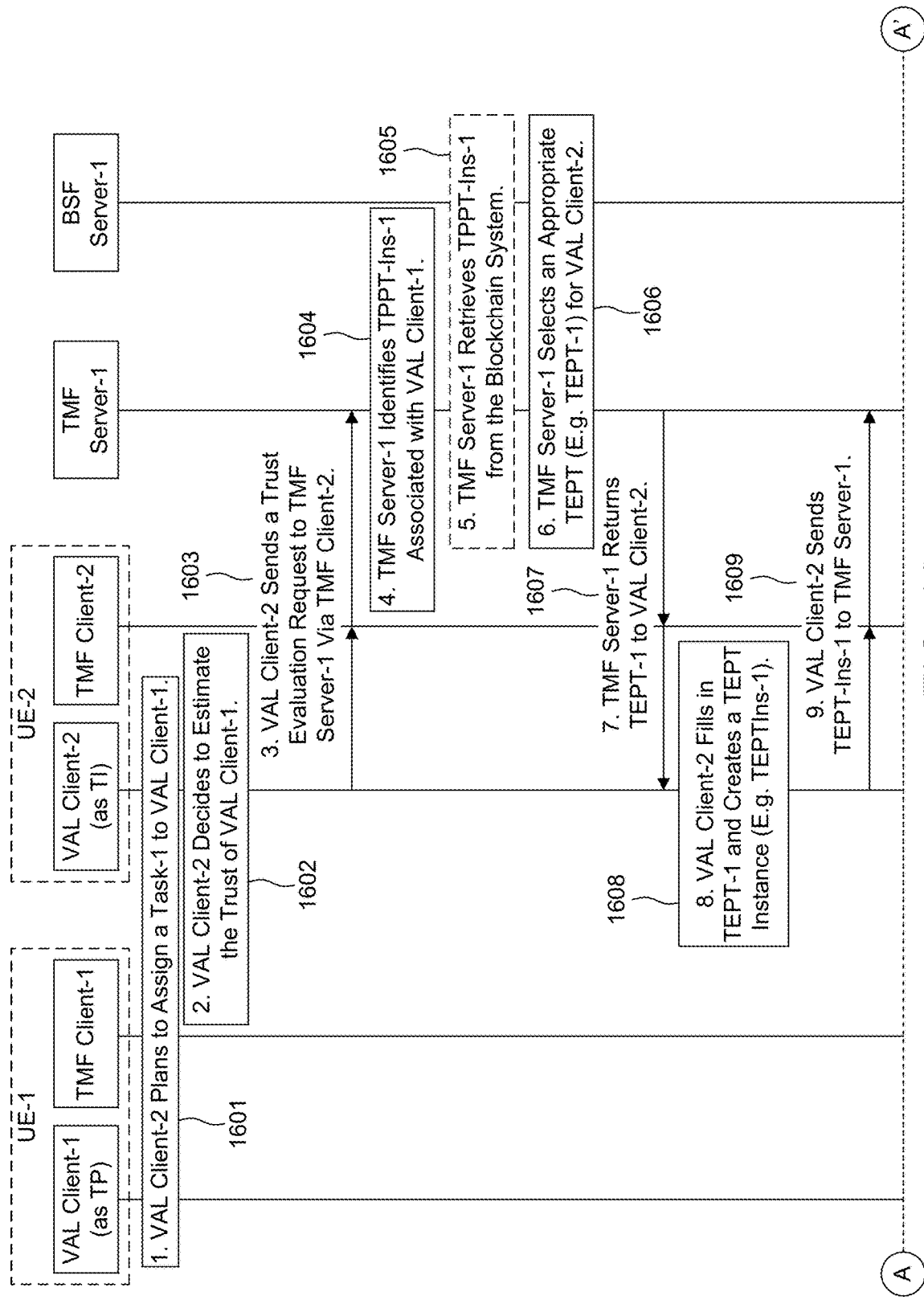
FIG. 16 illustrates an example of a call flow for a PreTA trust evaluation procedure when TMF is realized using a client/server architecture.
Figure 16:
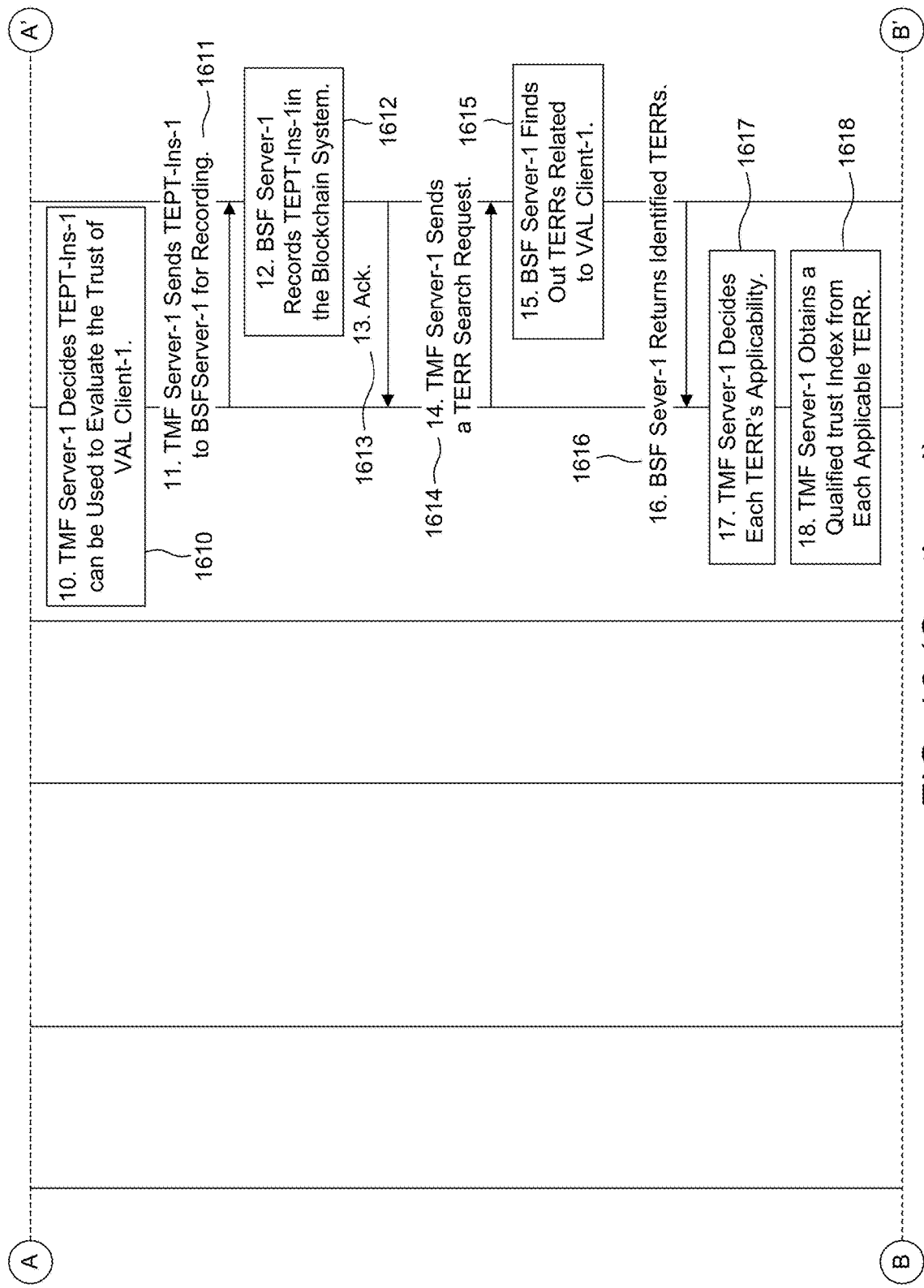
Figure 16:
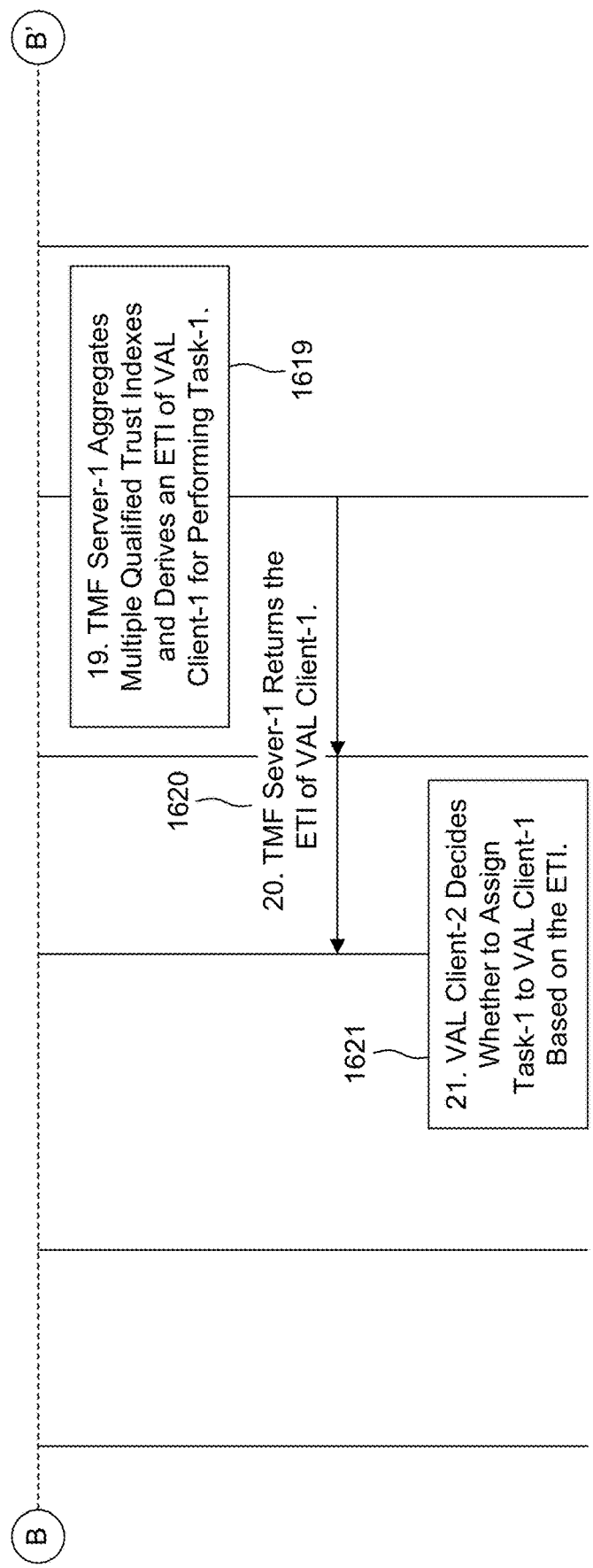

FIG. 16 illustrates an example of a call flow for a PreTA trust evaluation procedure when TMF is realized using a client/server architecture.

In this example, a client/server architecture is used. The TMF may be embodied as a new SEAL service. In particular, TP-1 may be implemented as a VAL client hosted on a 3GPP UE (e.g., UE-1). Alternatively, a TP may also be implemented as a VAL server hosted on an entity/node on the network side. TI-1 may be implemented as a VAL client hosted on a 3GPP UE (e.g., UE-2). Alternatively, a TI may be implemented as a VAL server hosted on an entity/node on the network side.

Each UE (e.g., UE-1 and UE-2 in FIG. 16) may host a TMF client which may interact with a TMF server on the network side. For example, a VAL client (as a TP) hosted on UE-1 may rely on the TMF client hosted on the same UE in order to interact with the TMF server, which may be the major entity to provide various trust management functions/features as described herein.

BSF may be realized using a client/server architecture. Each UE may host a BSF client (when needed) which may allow this UE to interact with a BSF server on the network side. For example, VAL client (as a TP) hosted on UE-1 may rely on the BSF client hosted on the same UE in order to interact with the BSF server, which may be the major entity to provide various blockchain capabilities (such as submitting new transactions or access existing transactions to an underlying blockchain system). Alternatively, if UE is not configured to have blockchain capability (e.g., BSF client may not be installed on the UE), the UE may rely on TMF to conduct all the blockchain interactions. For example, the TMF server may directly interact with the BSF server (as the example shown in FIG. 16).

All the steps, i.e., steps 1 to 21, in FIGS. 16 (1601 to 1621) may be the same as the corresponding steps in FIGS. 12 (1201 to 1221).

ETSI PDL Embodiment

The PreTA trust evaluation may be implemented under the framework of ETSI PDL-024 in the following way:

TMF in FIG. 12, FIG. 13, and FIG. 14 may be implemented as a DLAF in ETSI PDL-024.

BSF in FIG. 12, FIG. 13, and FIG. 14 may be implemented as a DLE in ETSI PDL-024.

TI in FIG. 12, FIG. 13, and FIG. 14 may be implemented as a PDL request originator (e.g., PDL service consumer) in ETSI PDL-024.

Task Aggregation

Task aggregation may occur in a single TP. For example, a TP may need to conduct a complex or an aggregated task, which may include a number of individual tasks (e.g., each individual task requires the TP to conduct a specific type of GOT operation). For example, in a service-based architecture, the TP is a service provider and may run a service instance or a network function which provide certain service(s). Accordingly, a service consumer may send a request to the TP by calling the service-based API exposed by the TP, in order to ask TP to provide certain service(s). The TP may process the request and return the corresponding response to the service consumer. For example, in an AI/ML data collection application, a TP may expose a "data capture and pre-processing" service, which may capture the desired data using TP's on-board sensors, and then pre-process the data using the processing approaches desired/indicated by a service consumer.

In general, a TI may be a different entity from the service consumer. The TI performs the task assignments to different TPs. Once the tasks are assigned to the various TPs, the TPs may start to execute the assigned tasks. The TP may receive request from service consumers and process the requests.

In another example, an entity may operate as both a TI and a service consumer. In this case, the entity, acting as a TI, may assign tasks to TPs. Once the TPs are assigned the tasks, the entity may act as a service consumer. The roles of the TI and the service consumer are different, therefore there is always a logical separation, even though the functionality may be implemented in the same entity or network function (NF).

Figure 17:
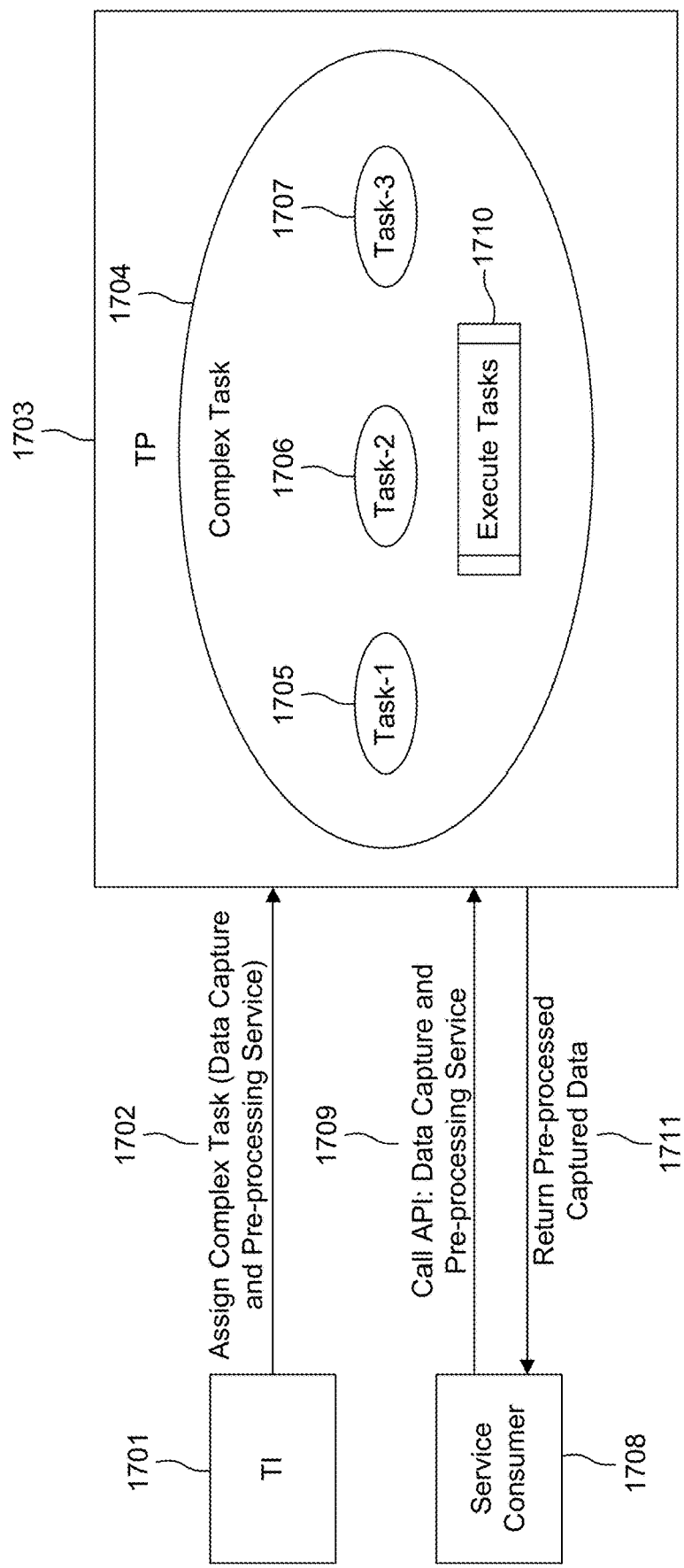
FIG. 17 illustrates an example of execution of a complex task by a single TP.

FIG. 17 illustrates an example of execution of a complex task by a single TP.

In this example, a TI 1701 may assign a complex task 1702 to a TP 1703. Once receiving the request, the TP may model the complex task 1704 as three individual tasks: Task-1 1705, Task-2 1706 and Task-3 1707. A service consumer 1708 may send a request the complex task to the TP 1703 by calling the "data capture and pre-processing" service API 1709. The API may contain input parameters related to the type of data that is to be captured and the type of pre-processing approach that should be used. The TP may then process each of the tasks 1710 and return the pre-processed data to the service consumer 1711.

In this example, the three tasks assigned to the TP (e.g., by a TI) may be as follows:

Task-1: This task may involve GOT-1 operations (e.g., communication-related operations) as described in the previous paragraphs. For example, this task may require the TP (serving as a service provider) to receive request(s) from a service consumer and return a response to the consumers via communication channel (e.g., supported by a wireless cellular link). A counterpart task may also be assigned to the consumer, which may initiate and send request(s) to TP-1 and receive response(s) from TP-1.

Task-2: This task may involve GOT-3 operations (e.g., sensing-related operations) as described in the previous paragraphs. For example, this task may require the TP to capture the desired data using its on-board sensors.

Task-3: This task may involve GOT-2 operations (e.g., computing-related operations) as described in the previous paragraphs. For example, this task may require the TP to pre-process the data captured from on-board sensors.

Task aggregation may also be provided by multiple TPs, in a chain fashion. Assuming the "data capture and pre-processing" service as an example, TP-1 may be a service provider and may run a service instance or a network function related to data capture and pre-processing. Accordingly, a service consumer may send a request by calling the service-based API exposed by TP-1 to ask TP-1 to provide the service. However, TP-1 may only have the capability to capture raw data from its on-board sensors and TP-1 does not have the capability to conduct data pre-processing.

Another TP, TP-2, is also a service provider and may be running a service instance or a network function related to data pre-processing. Accordingly, when TP-1 is serving the request received from the consumer, TP-1 may further act as a TI and send a request by calling the service-based API exposed by TP-2 and request the data pre-process service (in which the captured data and desired pre-processing approaches are indicated). TP-2 may process the request and then return the pre-processed data to TP-1 in a response. TP-1 may further return a response to the original service consumer, in which the pre-processed data is included. In this example, the aggregation occurs via a chain of TPs.

Figure 18:
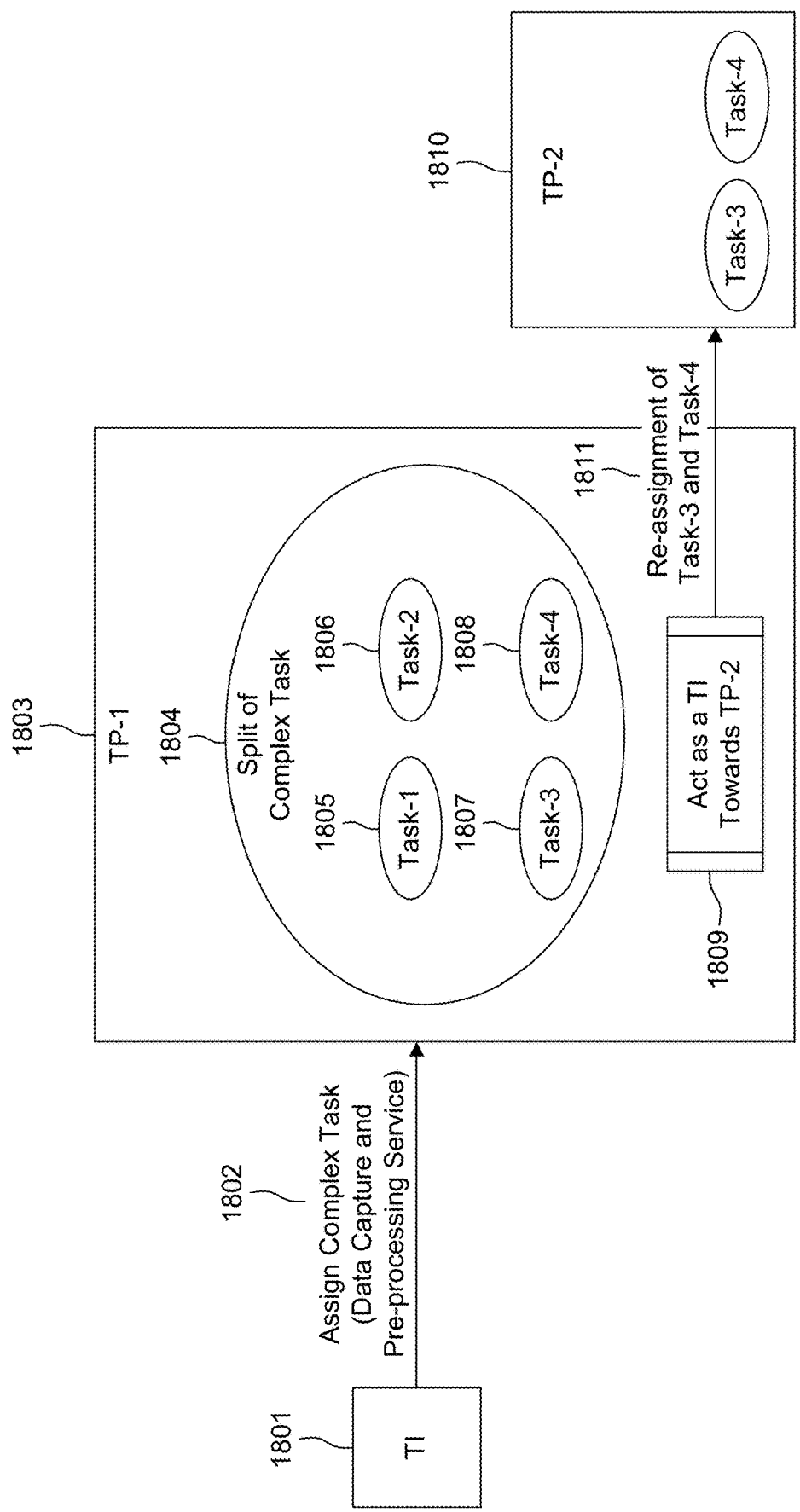
FIG. 18 illustrates an example where a TP re-assigns tasks to another TP.

FIG. 18 illustrates an example where a TP re-assigns tasks to another TP.

In this example, a TI 1801 may assign a complex task 1802 to a TP, TP-1 1803. Once receiving the request, the TP may model the complex task 1804 as four individual tasks: Task-1 1805, Task-2 1806, Task-3 1807 and Task-4 1808. Tasks 1 to 3 may be the same as described above, and Task-4 may be similar to Task-1, i.e., Task-1 it may involve GOT-1 operations (e.g., communication-related operations). Task-4 This may require TP-2 (serving as a service provider) to receive request(s) from a service consumer (in this case TP-1) and return a response to the consumer, which is also associated with GOT-1 operations.

TP-1 1803 may not have the capabilities to perform data processing, due to processing limitations. It may only have the capability to capture raw data from its on-board sensors, but not to conduct data pre-processing. TP-1 1803 may then determine to re-assign some of the tasks to another TP, TP-2 1810. TP-1 1803 may act as a TI 1809 towards TP-2 1810.

TP-1 1803, acting as a TI, may assign the tasks (Task-3 and Task-4) 1811 to TP-2 1810. Once the tasks are assigned, TP-1 1803 may be ready to provide the "data capture and pre-processing" service. A service consumer may send requests to TP-1 for such service.

Figure 19:
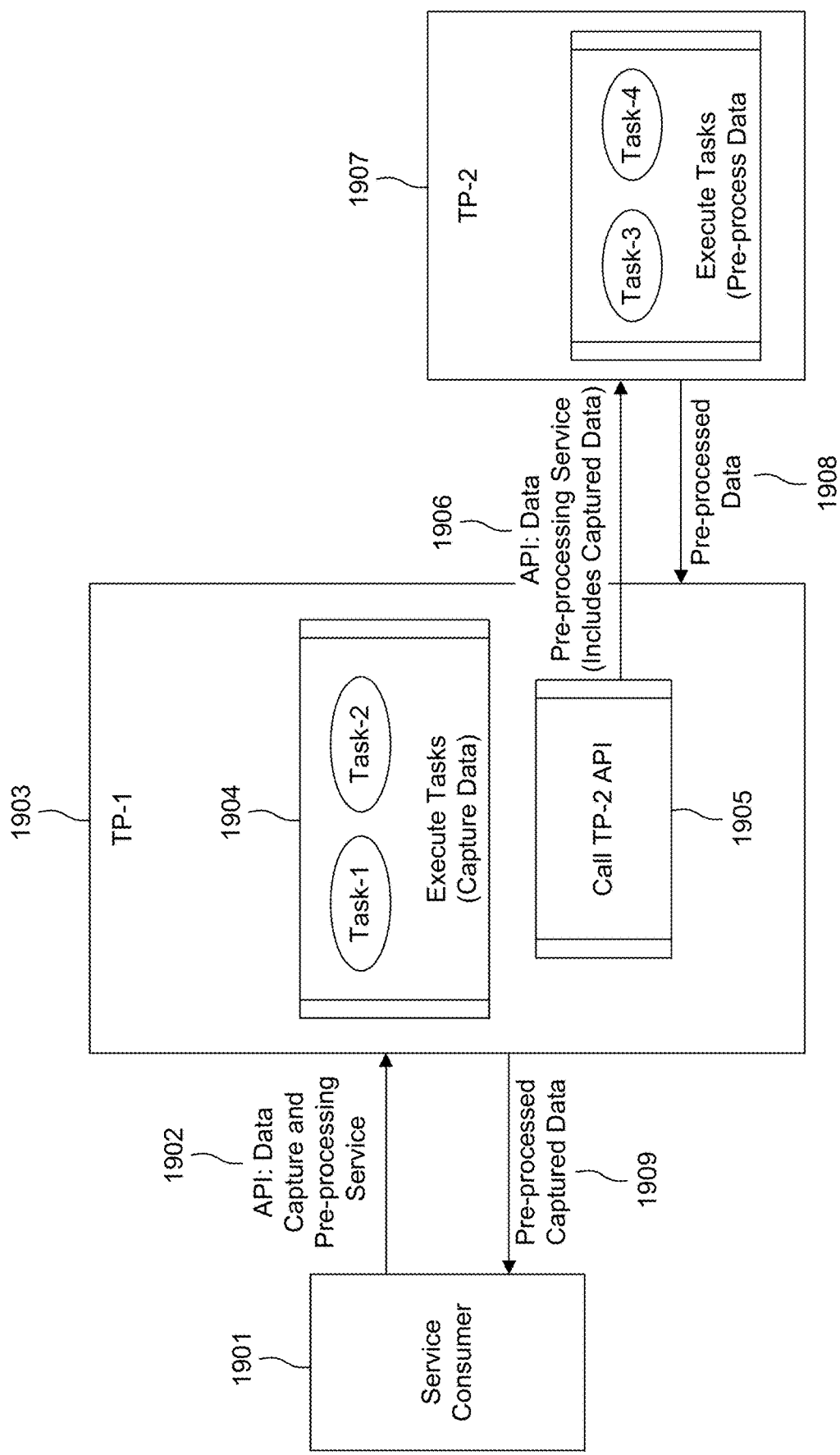
FIG. 19 illustrates the processing of a request from a service consumer assuming the re-assignment example from FIG. 18.

FIG. 19 illustrates the processing of a request from a service consumer assuming the re-assignment example from FIG. 18.

In this example, the service consumer 1901 may call the "data capture and pre-processing" service API 1902. The API may contain input parameters related to the type of data that is to be captured and the type of pre-processing approach that should be used. TP-1 1903 may process the request and execute Task-1 and Task-2 1904, i.e., TP-1 may capture the data 1904. TP-1 1903 may call TP-2's API 1905 for the "data pre-processing" service. The service requires Task-3 and Task-4, which were previously assigned to TP-2 1907, as described in FIG. 18. The API may include the captured data 1906 to TP-2 1907. TP-2 1907 may pre-process the received data and provide the results, i.e., the pre-processed data 1908, to TP-1 1903. TP-1 may then provide the pre-processed captured data 1909 to the service consumer 1901. In this case, the service consumer is unaware of the chain of TPs, i.e., the service consumer receives the results directly from TP-1 and the split of tasks between TP-1 and TP-2 is transparent to the service consumer.

Figure 20:
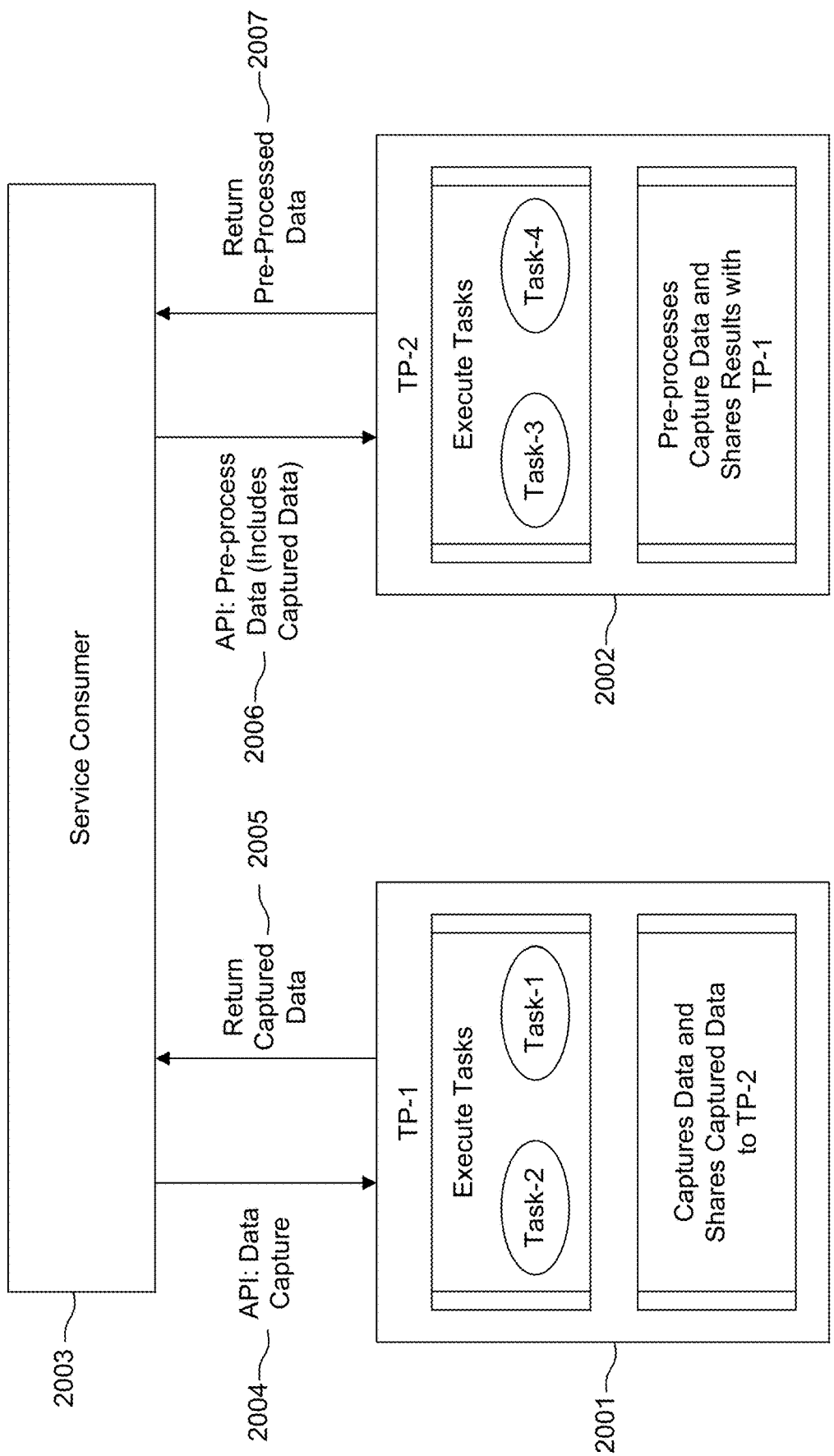
FIG. 20 illustrates an example where a complex task is split into multiple tasks by a TI.

FIG. 20 illustrates an example of an execution of a complex task which split into multiple tasks by a TI.

In this example, TI may split the complex task and assign Task-1 and Task-2 to TP-1 2001 and Task-3 and Task-4 to TP-2 2002. After the TI's task assignments, TP-1 2001 and TP-2 2002 may be ready to execute the tasks.

The service consumer 2003 may call the individual tasks in each TP. For example, the service consumer 2003 may call TP-1's API to capture data 2004. The API may contain details on the type of data to be captured and any associated parameters needed by TP-1. Upon receiving the data captured 2005, the service consumer 2003 may call TP-2's API to pre-process the data that was captured 2006. The service consumer 2003 may include in the request 2006 the captured data that was provided by TP-1 2004. The API may also include information on the pre-processing approach to be used by TP-2 2002. After executing the tasks, TP-2 2002 may provide the pre-processed results to the service consumer 2007.

When task aggregation occurs, as described in the previous paragraphs, the trust index aggregation may reflect it. If the task aggregation occurs in a single TP, the TP may need to conduct a complex or an aggregated task, which may comprise a number of individual tasks (e.g., each individual task may require the TP to conduct a specific type of GOT operations). In an AI/ML data collection application, a TP may expose a "data capture and pre-processing" service, which may be implemented by assigning three tasks to the TP (i.e., Task-1, Task-2, and Task-3, similar to the task aggregation case with a single TP described above). The TP may have a corresponding trust index associated with each task, which describes the trust level of the TP when performing a specific task. Accordingly, the trust index of different tasks may be aggregated.

For example, the trust indexes of TP for performing Task-1, Task-2 and Task-3 may be aggregated and the aggregated trust index may be regarded as the trust index of the TP for providing the "data capture and pre-processing" service (which was modeled as a complex task and split into three tasks). The weight setting for trust index aggregation may depend on specific application scenarios. In a simple example, the trust indexes associated with Task-1, Task-2 and Task-3 may have the same weight when they are aggregated, i.e., each has 33.33% weight. Furthermore, if TP-1 provides multiple services, the trust index of the TP for providing each specific service may be further aggregated, which can be used to reflect the trust index of the TP (as a service node). In other words, a service-level trust index can be obtained from task-level trust index aggregation, and a node-level trust index can be obtained from service-level trust index aggregation.

Alternatively, if the communication channel between the service consumer/TI and service provider/TP is consistently good (e.g., never causing any issue and can be fully trusted), the trust index of the TP for performing Task-1 (which requires the TP to conduct communication-related operations, e.g., receiving requests from service consumers and returning responses to them) may be set to only take a very small weight during trust index aggregation (e.g., 5%, or even 0%). In this case the trust of "data capture and pre-processing" service will be mainly decided by Task-2 and/or Task-3.

As previously described, task aggregation may also occur across different TPs. In this case, a complex or an aggregated task (which may be constituted by a number of individual tasks and each individual task requires a TP to conduct a specific type of GOT operations) may be jointly conducted by multiple TPs.

Using the same example as the task aggregation with multiple TPs, TP-1 may expose a "data capture and pre-processing" service, which may be executed by two TPs, i.e., TP-1 and TP-2, with Task-1 and Task-2 assigned to TP-1 and Task-3 and Task-4 assigned to TP-2. In this case, due to cross-TP task aggregation, cross-TP trust index aggregation may be used.

For example, the trust indexes of TP-1 for performing Task-1 and Task-2 may be aggregated with the trust indexes of TP-2 for performing Task-3 and Task-4. In other words, such a trust index aggregation uses the trust indexes of different TPs. From a service consumer's perspective (who sends service requests to TP-1), the final result is what matters, i.e., whether the service can be trusted. Therefore, the cross-TP trust aggregation and the aggregated trust index can be regarded as the trust index of the whole "data capture and pre-processing" service (which was modeled as a complex task and was jointly operated by TP-1 and TP-2). However, from TP-1 perspective, the trust it may still view the trust of TP-2

Alternatively, since TP-1 is the endpoint entity exposing the "data capture and pre-processing" service to consumers, such an aggregated trust index may be associated with TP-1, which indicates the trust of TP-1 for providing the service. The fact that TP-1 utilizes the services of TP-2 is transparent to the service consumer and the aggregated trust index includes all TPs in the chain, and the aggregated trust index is the trust index of TP-1 providing that service. The details of how the service is operated may be transparent to the consumers, i.e., the consumers of TP-1 may not be aware of the existence of TP-2. The chain may be transparent to the consumer.

Similar procedure that was described in the example illustrated in FIG. 12 may be generalized for the case of task aggregation. TP-1 acts as a service provider and may expose/provide a "data capture and pre-processing" service, which is a complex task and can be implemented by assigning three individual tasks to TP-1 (e.g., Task-1, Task-2, and Task-3). Before TI-1 decides to assign the complex task to a single TP, TI-1 may send a trust evaluation request to TMF in order to estimate the trust of TP-1 for performing the complex task.

In step 3 of FIG. 12, TI-1 may send a trust evaluation request to TMF to estimate the aggregated trust index of TP-1 for performing the complex task. This may include a number of individual tasks (e.g., Task-1, Task-2, Task-3). The information included in the request may be similar to the one for a single task:

An indication that TI-1 requires TMF to initiate a trust evaluation.

The type of trust evaluation, e.g., PreTA trust evaluation.

The identifier of TI who initiates the trust evaluation, such as TI-1.

The task identifiers, e.g., Task-1, Task-2, Task-3.

The focused GOT type and sub-type for each Task TERR discovery granularity indication.

The identifier of the involved TPs whose trust needs to be evaluated by TMF, e.g., TP-1.

The resource requirement for performing each of the tasks.

The potential workload of each Task.

Maximum tolerable time cost for trust evaluation.

In step 9 of FIG. 12, TI-1 may specify a set of preferred trust evaluation criteria, which may indicate how the aggregated trust of TP-1 should be evaluated when TP-1 is executing the complex task (TI-1 may also indicate such information in the step 3 above). In particular, for each individual task contained in the complex task, TI-1 may specify which trust indicator(s) should be considered and how to set their weights when calculating the trust index of TP-1 for performing each individual task. TI-1 may also specify how to aggregate the estimated trust indexes (i.e., ETIs) of TP-1 for performing each individual task to calculate an aggregate trust index, which describes the estimated trust of TP-1 for performing the whole complex task, i.e., the service.

In steps 11-19 of FIG. 12, TMF may identify all applicable TERRs recorded in blockchain or distributed ledger systems via BSF. For example, for each of individual task contained in the complex task, one or more TERRs may be identified using the solutions described in previous paragraphs (i.e., paragraphs with FIG. 12 description). Also, during each round of trust evaluation, one TERR may be generated for each of individual task contained in the same complex task. All the TERRs of individual tasks contained in the same complex task may be aggregated and an aggregated TERR may be generated, which may contain the trust index of TP-1 for performing the complex task. Such aggregated TERRs may also have reference values in certain scenarios. For example, TP may provide a service to its consumers and the service may be implemented by the execution of a complex task. Accordingly, the trust index of the TP for performing the complex task may be regarded as the trust index of the TP for providing the service to the consumers. TMF may conduct trust evaluation on the TP (e.g. analyzing historical TERRs or aggregated TERRs) to help service consumers in determining whether this TP is a desired TP that can provide service with good trust. If so, the consumers may decide to send service access requests to the TP for consuming the service. Once TMF generates an ETI of TP-1 for performing each individual task, those ETIs may be further aggregated based on the trust evaluation criteria as indicated in steps 11-19, so that an aggregated ETI of TP-1 for performing the complex task is generated, which will be returned to TI-1 during step 20.

In another example of task aggregation, a TI may split the complex task and select the TPs that are to execute each task. In this case, TI-1 may send a trust evaluation request to TMF, which may initiate PreTA trust evaluations on multiple TPs at the same time. For example, TI-1 may have two planned task assignments, e.g., TI-1 may want to assign Task-1 to TP-1 and assign Task-2 to TP-2. Accordingly, in this step, TI-1 may ask TMF to conduct PreTA trust evaluations for both TP-1 and TP-2 respectively. Each of involved TPs may have the same set of parameters as listed above. Similarly, all of the later steps may be conducted for each of the involved TPs.

Using the same example described in FIG. 12, TP-1 may expose/provide a "data capture and pre-processing" service, which is a complex task and can be implemented in four individual tasks to TP-1 and TP-2. In one example, TI-1 may assign Task-1 and Task-2 to TP-1 and Task-3 and Task-4 to TP-2. In another example, TI-1 may assign all four tasks to TP-1 and TP-1 further decides to offload or re-assign Task-3 and Task-4 to TP-2. TI-1 may send a trust evaluation request to TMF in order to estimate the aggregated trust of TP-1 and TP-2 regarding whether they have sufficient trust for performing the complex task.

In this case, in step 3 of FIG. 12, TI-1 may send a trust evaluation request to TMF to estimate the aggregated trust of two TPs (e.g., TP-1 and TP-2) for jointly performing a complex task, which is constituted by a number of individual tasks (i.e., Task-1, Task-2, Task-3 and Task-4). In order to do so, for each individual task, the same set of parameters as listed in Step 3 of FIG. 12 can be contained in the request. A single request may be sent to TMF including the two TPs and their respective assigned tasks. Optionally, one request may be sent per TP, listing only the tasks for that TP.

In step 9 of FIG. 12, TI-1 may specify a set of preferred trust evaluation criteria, which indicates how the aggregated trust of TP-1 and TP-2 should be evaluated when multiple TPs are jointly executing the complex task (TI-1 may also indicate such information in the step 3 of FIG. 12). In particular, for each individual task contained in the complex task, TI-1 may specify which trust indicator(s) shall be considered and how to set their weights when calculating the trust index of TP-1 for performing each individual task. TI-1 may indicate that the estimated aggregated trust index associated with the complex task may be calculated by aggregating the trust indexes of different TPs.

For example, since TI-1 plans to assign Task-1 and Task-2 to TP-1, two ETIs of TP-1 will be used: one is the ETI of TP-1 for performing Task-1 while the other trust index is the ETI of TP-1 for performing Task-2. Similarly, TP-2 is to conduct Task-3 and Task-4, so two trust indexes of TP-2 will be used: one is the ETI of TP-2 for performing Task-3 while the other trust index is the ETI of TP-2 for performing Task-4. As a result, the aggregated ETI associated with the complex task will be calculated by aggregating the four ETIs (two are related to TP-1 and the other two are related to TP-2).

In steps 11-19 of FIG. 12, TMF may identify all applicable TERRs recorded in blockchain or distributed ledger systems via BSF. For example, for each of individual task contained in the complex task, one or more TERRs can be identified based on the solutions described in steps 11-19 of FIG. 12. Once TMF generates all the ETIs for all the involved TPs as mentioned earlier, those ETIs could be further aggregated based on the trust evaluation criteria as indicated in step 11-19 of FIG. 12, so that an aggregated ETI will be returned to TI-1 during step 20, which estimate whether TP-1 and TP-2 could jointly perform the complex task with sufficient trust.

Similar procedure that was described in the example illustrated in FIG. 14 may also be generalized for the case of task aggregation.

A complex task may comprise a number of individual tasks, which may be assigned to a single TP (TP-1 shown in FIG. 12) or to multiple TPs. In particular, TMF also needs to help TI-1 to conduct both TP identification and trust evaluation.

In general, a requesting entity may be a TI, a TP, a client or a service consumer of a TI, a client or service consumer of a TP, a network manager, a network controller, a network administrator, a network orchestrator, or any other entities. The requesting entity may send a request to TMF to conduct data analytics and estimate the trust of a target entity. In general, a target entity may be a TI, a TP, a client or consumer of a TI, a client or consumer of a TP, or any other entities. The TMF may use data analysis of any existing/ historical logs, records, information to estimate the trust.

In one example, a service consumer (the requesting entity) of a TP (the entity providing services) may ask TMF to estimate the trust of a TP (the target entity) for providing specific service(s) before the consumer determines whether to access the service(s) provided by the TP. Here, providing specific services (by a TP) could be realized by the execution of one or more tasks (i.e. implementing a service may be regarded as executing a complex task). TMF may return the trust index of the target entity, which may be an estimated value and may be referred and considered by the requesting entity to support decision making.

In another example, when a consumer of a TP sends a service access request to the TP, the TP (acting as a requesting entity) may ask TMF to estimate the trust of the consumer (acting as the target entity) before the TP makes determines whether to accept the service access request sent from the consumer.

In step 3 of FIG. 14, TI-1 may send a request to TMF in order to ask TMF to identify one or more TP(s) for the complex task. In order to do so, for each individual task, the same set of parameters as described in step 3 of FIG. 14 may be contained in the request. In other words, the goal is to ask TMF to identify a TP for each of induvial tasks. In addition, TI-1 may also indicate that the individual tasks contained in the same complex task are to be assigned to a single TP (i.e., TP identification is to identify a single TP) or multiple TPs (i.e., TP identification is to identify multiple TPs).

In Step 4 of FIG. 14, the generalization of this step is that TI-1 may specify a set of preferred trust evaluation criteria, which indicates how to estimate the trust of TP(s) for performing the complex task (Note that, if TI-1 already knows its preferred trust evaluation criteria, it can also indicate it in the Step 3).

In case TI-1 wants to assign all the individual tasks to a single TP, TI-1 may specify its preferred trust evaluation as follows: For a specific TP-X identified by TMF during TP identification, TMF may estimate the trust of TP-X. For example, for each individual task contained in the complex task, TI-1 may specify which trust indicator(s) should be considered and how to set their weights when calculating the trust index of TP-X for performing each individual task. TI-1 may also specify how to aggregate the trust indexes of TP-X for performing each individual task in order to calculate an aggregate trust index, which describes the estimated trust of TP-X for performing the whole complex task.

In case TI-1 wants to assign the individual tasks contained in the same complex tasks to multiple TPs, TMF may conduct TP identification to identify a TP for each individual tasks. For example, TMF may identified TP-Y for Task-1 and Task-2 and identified TP-Z for Task-3 and Task-4. In this case, TI-1 may specify which trust indicator(s) should be considered and how to set their weights when calculating the trust index of involved TPs (e.g., TP-Y and TP-Z) for performing each individual task (e.g., Task-1, Task-2, Task-3 and Task-4). TI-1 may indicate that the aggregated estimated trust index associated with the complex task may be calculated by aggregating the estimated trust indexes of different TPs.

For example, the two ETIs of TP-Y may be used: one is the ETI of TP-Y for performing Task-1 while the other trust index is the ETI of TP-Y for performing Task-2. Similarly, two trust indexes of TP-Z may be used: one is the ETI of TP-Z for performing Task-3 while the other trust index is the ETI of TP-Z for performing Task-4. As a result, the aggregated ETI associated with the complex task will be calculated by aggregating the four ETIs (two are related to TP-Y and the other two are related to TP-Z).

In steps 5-11 of FIG. 14, TMF may identify TP(s) and at the same time estimate the trust of the identified TP(s) for performing the complex task.

In case TI-1 wants to assign all the individual tasks to a single TP (e.g., TP-X may be identified by TMF to conduct all the individual tasks contained in the complex task), TMF may identify a list of TP candidates, and each of them is associated with an aggregated ETI for performing the complex task.

In case TI-1 wants to assign all the individual tasks to multiple TPs (e.g., TP-Y and TP-Z may be identified by TMF to jointly conduct the individual tasks contained in the complex task), TMF may identify multiple sets of TPs for the complex task. Each set of TPs (e.g., TP-Y and TP-Z forms one set) is a candidate solution to assigning the complex task to multiple TPs in the set and each set is also associated with an aggregated ETI, which describe the estimate trust level of those TPs for jointly performing the complex task. All the identified TP(s) candidates for performing the complex task may be sent to TI-1 for its selection, as shown in step 12. To minimize the number of possible combinations, rules may be in place limiting the number of combinations to try. Optionally, specific criteria may be implemented for the allowed combinations.

In one example, TI may have already decided to assign a task to a specific TP and sent a task assignment request to the TP. Once the TP receives the task assignment request from the TI, the TP may also need to ask TMF to estimate whether the TI has a good potential of trust, based on which the TP may make a decision regarding whether or not to accept the task assignment from the TI.

For example, in FIG. 12, TP-1 has received a task assignment of Task-1 from TI-1, TP-1 now needs to evaluate whether TI-1 can be trusted before accepting this task assignment. TP-1 may consult with TMF to estimate the trust of TI-1. The procedure shown in FIG. 12 may be re-used with the TP (e.g., TP-1) now sending a request to TMF in order to ask TMF to estimate the trust of a TI (e.g., TI-1):

In step 3 or step 9 of FIG. 12, TP-1 may send a trust evaluation request to TMF in order to ask TMF to estimate the trust of TI-1. In particular, during step 3 or step 9 of FIG. 12, TP-1 may specify a set of trust evaluation criteria based on its personalized need, which defines how TI-1's trust should be evaluated. This evaluation may be different from how TI-1 wants to evaluate TP-1's trust, as this evaluation is not associated with task execution.

For example, TI-1's trust may be evaluated based on the latest reputation of TI-1 (e.g., whether TI-1 has any past or recent bad behavior, e.g., whether TI-1 was involved in recent fraudulent or malicious activities, whether TI-1 has a good level of trust when it has initiated other historical task(s) similar to Task-1, etc.).

After TMF conducts a trust evaluation on a TI, a TERR of the TI may be generated. A TERR of a TI may include, for example: the current trust of the TI, how the trust was evaluated, e.g., based on credit score or recent behaviors, etc. TERRs of TIs may also be recorded in distributed ledger system, so that it can be leveraged during future task assignment. For example, when TP-1 asks TMF to estimate TI-1's trust, TMF may analyze the historical TERRs related to TI-1 and then produce an ETI of TI-1. The estimated trust of TI-1 may be returned to TP-1 (step 20 of FIG. 12). Based on the estimated trust index of TI-1, TP-1 may decide whether or not to accept the task assignment request from TI-1.

Similar modifications also apply to FIGS. 13-16.

Besides TPs and TIs, various other entities may interact with TMF; TMF may serve different entities for different purposes.

A requesting entity (e.g., a TI, a TP, a client or a consumer of a TI, a client or a consumer of a TP, a network manager, a network controller, a network administrator, a network orchestrator, or any other entities) may send a request to TMF and ask TMF to conduct data analytics and estimate the trust of a target entity (which could be a TI, a TP, a client or consumer of a TI, a client or consumer of a TP, or any other entities), based on data analysis on any existing/historical logs, records, information.

The requested trust evaluation on the target entity may be one time or periodically. Accordingly, TMF may conduct the required trust evaluation (e.g., required/preferred by the requesting entity) and return the trust evaluation result(s) to the requesting entity or other involved entities, if needed. For example, a network administrator, or a network orchestrator (the requesting entity) may ask TMF to conduct one-time or periodical trust evaluation on a TP (the target entity) after the TI has assigned a task to the TP for execution. While the TP is executing the task, the TMF may conduct trust evaluation to calculate the actual trust of TP while performing the task.

For instance, a consumer of a TP may send request(s) to the TP (e.g., for accessing certain services), and in order to process the requests, the TP may execute one or more tasks. Accordingly, the consumer of the TP may ask TMF to conduct one-time or periodical trust evaluation on the TP to monitor whether the TP has the desired level of trust while providing the services to the consumer. Vice versa, the TP may also ask TMF conduct one-time or periodical trust evaluation on a consumer of the TP in order to monitor whether the consumer has the desired level of trust when the TP is providing the services to the consumer.

A requesting entity (which could be a TI, a TP, a client or consumer of a TI, a client or consumer of a TP, a network manager, a network controller, a network administrator, a network orchestrator, or any other entities) may send a trust index inquiry to TMF and ask TMF about the latest trust index of a target entity (which could be a TI, a TP, a client or consumer of a TI, a client or consumer of a TP, or any other entities). Depending on whether TMF already has such a trust index (e.g., due to a previous trust evaluation), TMF's actions may be varied.

If TMF already has a trust index of the target entity and the trust index is still valid and up-to-date, TMF may directly send the trust index back to the requesting entity. If TMF does not have such a trust index or the trust index maintained by the TMF is expired, TMF may start a new round of trust evaluation and produce a new trust index, which reflects the latest trust index of the target entity. For example, a consumer of a TP is interacting with the TP (e.g., which is executing one or more tasks for providing services to the consumer). During this interaction, both the consumer and the TP may check each other's latest trust index before service provisioning can be started. For example, the TI may want to know TP's latest trust index in order to decide whether this TP is a good service provider with sufficient trust. Similarly, the TP may also want to know the consumer's trust before accepting the service access requests sent from the consumer. Accordingly, both of entities may inquire TMF on each other's latest trust index.

When a requesting entity (which could be a TI, a TP, a client or consumer of a TI, a client or consumer of a TP, a network manager, a network controller, a network administrator, a network orchestrator, or any other entities) may send a request to TMF for obtaining a trust index of a target entity (which could be a TI, a TP, a client or consumer of a TI, a client or consumer of a TP, or any other entities), TMF may adopt different approaches to process the received request in order to produce the needed trust index.

In one example, TMF may maintain a trust index of the target entity, which is still valid. Then, TMF may directly return the trust index to the requesting entity.

In one example, TMF may determine that a trust index of the target entity is already expired. TMF may conduct a new round of trust evaluation in order to calculate the latest trust of the target entity. This may be applicable to the scenario where the trust of target entity changes quickly over time, or the scenario where Zero-Trust-Architecture (ZTA) needs to be supported. After a new trust index is produced based on a real-time trust evaluation, it will be returned to the requesting entity.

In another example, TMF does not maintain a trust index of the target entity, or it is expired, and TMF is not able to conduct a new round of trust evaluation, due to various reasons. For example, TMF is not able to collect the needed data at this time for calculating trust index (e.g., the data sources are not available now or collecting real-time data for a new round of trust evaluation at this time costs too much overhead, etc.). TMF may choose to conduct data analytics on any historical logs, records, information about the target entity (those historical data may be stored locally at TMF or those historical data may be stored in a storage, such as distribute ledgers), to produce an estimated trust index of a target entity. The estimated trust index of the target entity may be returned to the requesting entity.

The calculation of trust index may be based on real-time trust evaluation and based on historical data. For example, based on a real-time trust evaluation (using certain new data that was collected in real-time), the TMF may produce a first trust index T_RT. In the meantime, TMF may conduct data analytics on any historical logs, records, information about the target entity and may produce a second trust index T_HIS. Then, the trust index of the target entity will be calculated using the weighted sum of T_RT and T_HIS, e.g., a*T_RT+b*T_HIS, where a and b are weights. When a=0.5 and b=0.5, it means that the two type of trust index (T_RT and T_HIS) have the same weight. For example, T_RT could be a value based on ZTA-based trust evaluation, which may not always be accurate (e.g., one or more data sources are not available now for ZTA-based trust evaluation or TMF failed to collect data from one or more important data sources due to network congestion). Accordingly, T_HIS could be regarded as a complemental or calibration part for T_RT. Another example, when a=1 and b=0, it means that the trust index of the target entity will fully depend on the value of T_RT.

When the trust index of the target entity is returned to the requesting entity, the TMF may also indicate how the category of the trust index, e.g., the trust index is based on a new round of trust evaluation, or based on data analytics on historical data, or the returned trust index is an aggregated value that leverages both real-time trust evaluation and data analysis on historical information.

There are various way to implement a TMF.

The functionalities of TMF may be implemented as a native 3GPP function, e.g., as a new Network Function (NF)

in the core network, or a new function inside the access network of the cellular system.

The functionalities of TMF may be implemented as an enhanced feature of an existing NF in the core network of the 3GPP cellular system, such as 5G network data analytics function (NWDAF) and/or the Security Function deployed by the mobile network operator (MNO). Operations such as sending a request to TMF and receiving a response from TMF may be implemented as SBA-based messaging using 3GPP standard service operation interfaces defined for the NF (existing interfaces may be reused or new interfaces could be defined).

The functionalities of TMF may be implemented by any entity, such as a device, a UE, a gateway, a router, a terminal, a vehicle UE, etc. Distributed ledger may also be leveraged as 1) a repository for storing various data for supporting trust evaluation and management traceability; and 2) an intermediate medium for supporting messaging and data sharing/exchange between TMF and other entities.

A requesting entity may send a direct request to the TMF. Alternatively, the entity may generate a distributed ledger transaction to describe the request. TMF may subscribe to the distributed ledger so that once a transaction containing a new request becomes available, TMF may be notified. After that, TMF may start to process the request and conduct the needed processing.

After TMF process the request, TMF may send a response to the requesting entity. Alternatively, the TMF may generate another distributed ledger transaction to contain the response and store such a transaction into a distributed ledger. Assuming that the requesting entity has also subscribed to the transactions containing a response, the requesting entity may be notified once a response becomes available so that the requesting entity may retrieve it.

A service layer platform may be built on top of underlying distributed ledger systems. For example, ETSI PDL may be regarded as a service layer platform for managing and supporting permissioned distributed ledgers-based services to users. Various platform services have been defined in ETSL PDL service layer platform.

For example, in case TMF is implemented by a device, a network function, a UE, a gateway, a router, a terminal, a vehicle UE, etc., those entities implementing TMF functionalities may leverage existing common PDL platform services to interact with underlying distributed ledger systems, such as sending or receiving distributed ledger transactions. For example, those entities implementing TMF functionalities may leverage the existing PDL platform service, such as Storage Platform Service (SPS) or Transaction Management Service defined by ETSI PDL, to store/send/retrieve various data records to/from distributed ledgers.

As another example, TMF may be implemented inside the PDL platform, e.g., TMF may be defined as a new PDL platform service for supporting trust evaluation management on target entities. In this case, any entity may leverage TMF platform service for various purposes. TMF may process the request and TMF may also log all the related data into distributed ledger in order to support trust evaluation and management traceability. For example, any of historical TMF trust evaluation and management history (e.g., how a trust evaluation was conducted and how a trust index was calculated) may be audited when needed. Similarly, the TMF platform service may also leverage the existing PDL platform services, such as Storage Platform Service (SPS) or Transaction Management Service defined by ETSI PDL to store/send/retrieve various data records to/from underlying distributed ledgers.

The functionalities of TMF may be implemented using smart contract(s) deployed in a distributed ledger system, i.e., TMF may be a software program deployed in a blockchain system and can automatically conduct trust evaluation and management. Accordingly, sending a request to TMF may be embodied as sending a transaction containing the request (as a smart contract trigger) to the TMF smart contract. After TMF smart contract's execution, TMF smart contract may create another transaction containing a response. Assuming that the requesting entity has also subscribed to the transactions containing a response, the requesting entity may be notified once a response becomes available so that the requesting entity may retrieve it. In addition, when creating/deploying/managing TMF smart contract using ETSI PDL platform, the existing PDL platform service provided by the ETSI PDL platform may also be leveraged. For example, assuming that ETSI PDL platform has a specific service related to smart contract management, the smart contract implementing the TMF functionalities may be created and deployed (e.g., by a network administrator, a network controller, a mobile operator, or any other entity) with the assistance of such a common service.

Various entities may act in the role of TMF, meaning that in a system, there may be multiple TMF instances. For example, a powerful UE residing in a geographical area may be as a TMF to support trust evaluation/management and provide trust indexes of different entities residing the same area. By leveraging distributed ledgers, different TMFs may record trust evaluation and management data into the distributed ledgers, such as trust index results of different target entities and how the trust indexes were produced. This may enable the trust evaluation and management traceability.

For each trust index published by a specific TMF instance and recorded in a distributed ledger system, various stakeholders may care about whether the specific TMF instance can be relied on for providing high-quality trust evaluation (such as low-delay, efficient and low-cost trust data collection and trust index calculation process, and/or accurate/up-to-date trust evaluation results, i.e., the trust index could truly reflect the trustworthiness status of a target entity). As an example, here the stakeholders may be those who need to leverage and consume various services provided TMF e.g., using trust indexes produced by TMF for supporting their decision makings or any other entity. Any service/data/information provided by TMF, such as a calculated trust index of a target entity, a stakeholder (e.g., a consumer of the trust index information) may rank the accuracy of the trust index provided by TMF. For example, a high rank means that the stakeholder made a positive endorsement to the trust/reputation/credibility of TMF.

Individual rankings from different stakeholders on the same service (e.g., Service-A)/data/information provided by TMF may be recorded in the distributed ledger system. Accordingly, the aggregated ranking (aggregated from individual rankings) on the same service (e.g., Service-A) may be used to measure a specific trust level of TMF for providing Service-A (meaning that TMF may have a different trust level for providing Service-B). Individual rankings from different stakeholders on all the services (Service-A, Service-B, Service-C, . . . , etc.) provided by the same TMF may be aggregated, such an aggregated ranking may be used to measure the trust/reputation/credibility of a specific TMF instance (i.e., on the whole TMF level, not on a service level). For example, such information related to trust/reputation/credibility of a specific TMF instance may be useful for any entity who wants to select a TMF instance during the TMF discovery and selection process.

The approaches used to implement TMF may be a combination of such various approaches. For example, when TMF is implemented as a new NF (or as an enhanced feature of an existing NWDAF) in the 3GPP network, the distributed ledger may also be leveraged, e.g., to store various data records in order to support trust evaluation traceability.

A wireless transmit and receive unit (WTRU) may be configured to operate as task initiator (TI). The WTRU may send a request for a trust evaluation to a task management function (TMF), including a first candidate task participant (TP) and a first task and a second candidate TP and a second task. The WTRU may send trust indicators for the first candidate TP to perform the first task and trust indicators for the second candidate TP to perform the second task. The TMF may perform the trust evaluation and determine a first estimated trust index (ETI) and a second ETI. Upon receiving the ETIs, the WTRU may determine an aggregated ETI. The WTRU may determine whether to assign the first task to the first candidate TP and the second task to the second candidate TP based on the aggregated ETI. The TMF, TI and TPs may each be implemented as part of a network function in the core network, a function in the RAN, an edge application, or a UE.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit and receive unit (WTRU) configured to operate as a task initiator (TI), the method comprising:
    sending, to a network, a request for trust evaluation, wherein the request includes information of a first candidate task participant (TP) and a first task, and a second candidate TP and a second task;
    sending, to the network, information on first trust evaluation criteria to be used by the network for trust evaluation of the first candidate TP to perform the first task, and information on second trust evaluation criteria to be used by the network for trust evaluation of the second candidate TP to perform the second task;
    receiving, from the network, results of the trust evaluation, wherein the results include a first estimated trust index (ETI) of the first candidate TP to perform the first task, and a second ETI of the second candidate TP to perform the second task;
    determining an aggregated ETI based on the first ETI and the second ETI; and
    determining, based on the aggregated ETI, whether to assign the first task to the first candidate TP and the second task to the second candidate TP.

2. The method of claim 1, wherein the request for trust evaluation further comprises a first generic operation type (GOT) required by the first task and a second generic operation type (GOT) required by the second task.

3. The method of claim 1, wherein the request for trust evaluation further comprises one or more of: requirement for resources needed to perform the first task, potential workload of the first task, requirement for resources needed to perform the second task, or potential workload of the second task.

4. The method of claim 1, wherein the information on first trust evaluation criteria comprises first trust indicators including one or more of: security, privacy, resilience, performance, robustness, scalability, availability, accuracy, reliability, or consistency; and wherein the information on second trust evaluation criteria comprises second trust indicators including one or more of: security, privacy, resilience, performance, robustness, scalability, availability, accuracy, reliability, or consistency.

5. The method of claim 4, wherein the information on first trust evaluation criteria further comprises first weights to be applied to the first trust indicators and the information on second trust evaluation criteria further comprises second weights to be applied to the second trust indicators.

6. The method of claim 1, wherein the aggregated ETI is determined using a weighted average of the first ETI and the second ETI.

7. A wireless transmit and receive unit (WTRU) for implementing a task initiator (TI) functionality, the WTRU comprising:
    at least one processor, and
    a transceiver, wherein the least one processor and transceiver are configured to:
        send, to a network, a request for trust evaluation, wherein the request includes information of a first candidate task participant (TP) and a first task, and a second candidate TP and a second task;
        send, to the network, information on first trust evaluation criteria to be used by the network for trust evaluation of the first candidate TP to perform the first task, and information on second trust evaluation criteria to be used by the network for trust evaluation of the second candidate TP to perform the second task;
        receive, from the network, results of the trust evaluation, wherein the results include a first estimated trust index (ETI) of the first candidate TP to perform the first task, and a second ETI of the second candidate TP to perform the second task;
        determine an aggregated ETI based on the first ETI and the second ETI; and
        determine, based on the aggregated ETI, whether to assign the first task to the first candidate TP and the second task to the second candidate TP.

8. The WTRU of claim 7, wherein the request for trust evaluation further comprises a first generic operation type (GOT) required by the first task and a second generic operation type (GOT) required by the second task.

9. The WTRU of claim 7, wherein the request for trust evaluation further comprises one or more of: requirement for resources needed to perform the first task, potential workload of the first task, requirement for resources needed to perform the second task, or potential workload of the second task.

10. The WTRU of claim 7, wherein the information on first trust evaluation criteria comprises first trust indicators including one or more of: security, privacy, resilience, performance, robustness, scalability, availability, accuracy, reliability, or consistency; and wherein the information on second trust evaluation criteria comprises second trust indicators including one or more of: security, privacy, resilience, performance, robustness, scalability, availability, accuracy, reliability, or consistency.

11. The WTRU of claim 10, wherein the information on first trust evaluation criteria further comprises first weights to be applied to the first trust indicators and the information on second trust evaluation criteria further comprises second weights to be applied to the second trust indicators.

12. The WTRU of claim 1, wherein the aggregated ETI is determined using a weighted average of the first ETI and the second ETI.

13. A method implemented by a network function configured to operate as a trust management function (TMF), the method comprising:
   receiving, from a wireless transmit and receive unit (WTRU), a request for trust evaluation, wherein the request comprises:
      information of a first candidate task participant (TP) and a first task,
      information on first trust evaluation criteria for trust evaluation of the first candidate TP to perform the first task;
      information of a second candidate TP and a second task; and
      information on second trust evaluation criteria for trust evaluation of the second candidate TP to perform the second task;
   determining, based at least on the information on first trust evaluation criteria, a first estimated trust index (ETI) for the first TP to perform the first task;
   determining, based at least on the information on second trust evaluation criteria, a second ETI for the second TP to perform the second task; and
   sending, to the WTRU, the first ETI and the second ETI.

14. The method of claim 13, wherein the request for trust evaluation further comprises one or more of: requirement for resources needed to perform the first task, potential workload of the first task, requirement for resources needed to perform the second task, or potential workload of the second task.

15. The method of claim 13, wherein the request for trust evaluation further comprises a first generic operation type (GOT) required by the first task and a second GOT required by the second task.

16. The method of claim 13, wherein the information on first trust evaluation criteria comprises first trust indicators including one or more of: security, privacy, resilience, performance, robustness, scalability, availability, accuracy, reliability, or consistency; and wherein the information on second trust evaluation criteria comprises second trust indicators including one or more of: security, privacy, resilience, performance, robustness, scalability, availability, accuracy, reliability, or consistency.

17. The method of claim 13, wherein determining the first ETI is further based on trust evaluation results records (TERR) retrieved by the TMF from a distributed ledger system, wherein the TERR comprises historical data associated with trust of the first TP for performing a task.

18. The method of claim 13, wherein determining the first ETI is further based on information received from the first TP during first TP registration, and determining of the second ETI is further based on information received from the second TP during second TP registration.

19. The method of claim 18, wherein the information received from the first TP during first TP registration includes capabilities of the first TP or data sources available to the first TP, and the information received from the second TP during second TP registration includes capabilities of the second TP or data sources available to the second TP.

20. The method of claim 18, wherein the information received from the first TP during first TP registration includes at least one GOT supported by the first TP, wherein a GOT comprises an operation associated with communication, an operation associated with processing data, or an operation associated with capturing data.

* * * * *